US009909644B2

(12) United States Patent
Cegar et al.

(10) Patent No.: US 9,909,644 B2
(45) Date of Patent: Mar. 6, 2018

(54) TUNED MASS DAMPER

(71) Applicant: ZF FRIEDRICHSHAFEN AG, Friedrichshafen (DE)

(72) Inventors: Stojan Cegar, Waigolshausen (DE); Michael Wirachowski, Würzburg (DE); Kyrill Siemens, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 206 days.

(21) Appl. No.: 14/778,551

(22) PCT Filed: Feb. 19, 2014

(86) PCT No.: PCT/EP2014/053204
§ 371 (c)(1),
(2) Date: Sep. 18, 2015

(87) PCT Pub. No.: WO2014/146849
PCT Pub. Date: Sep. 25, 2014

(65) Prior Publication Data
US 2016/0298721 A1 Oct. 13, 2016

(30) Foreign Application Priority Data
Mar. 18, 2013 (DE) .................. 10 2013 204 713

(51) Int. Cl.
*F16F 15/14* (2006.01)
*F16H 45/02* (2006.01)

(52) U.S. Cl.
CPC .......... *F16F 15/145* (2013.01); *F16H 45/02* (2013.01); *F16H 2045/0226* (2013.01); *F16H 2045/0263* (2013.01)

(58) Field of Classification Search
CPC .......... F16F 15/14; F16F 15/145; F16F 15/20; F16H 45/02; F16H 2045/0026; F16H 2045/0263; F16H 2045/0226
See application file for complete search history.

(56) References Cited

U.S. PATENT DOCUMENTS 6,089,121 A * 7/2000 Lohaus ............... F16F 15/1407
464/68.4
9,638,283 B2 * 5/2017 Wirachowski ........ F16F 15/145
(Continued)

FOREIGN PATENT DOCUMENTS

DE 198 08 731 9/1999
DE 199 54 278 3/2001
(Continued)

OTHER PUBLICATIONS

Machine translation of DE 102011100895 A1 obtained on Jun. 2, 2017.*
(Continued)

Primary Examiner — Adam D Rogers
(74) Attorney, Agent, or Firm — Cozen O'Connor

(57) ABSTRACT

A tuned mass vibration damper for damping a vibration component of a rotational movement, has at least one guide component part configured to movably guide the damper masses such that the damper masses are offset along a circumferential direction, and a dimensionally stable spacer component part that is rotatable relative to the guide component part and which has a positive engagement connection with clearance with the damper masses that are configured such that, starting from a center position of the damper masses with respect to the spacer component part, when one of the damper masses executes an oscillation which overcomes a clearance in the connections of two of the damper masses with respect to the spacer component part, the spacer component part is rotated along the circumferential direction
(Continued)

such that it drives the other damper mass of the two damper masses along the circumferential direction.

11 Claims, 31 Drawing Sheets

(56) References Cited

U.S. PATENT DOCUMENTS

| | | | | |
|---|---|---|---|---|
| 2015/0285332 A1* | 10/2015 | Kram | .................... | F16F 15/145 |
| | | | | 74/574.2 |
| 2016/0033003 A1* | 2/2016 | Siemens | ................. | F16F 7/108 |
| | | | | 188/379 |
| 2016/0131220 A1* | 5/2016 | Siemens | ............... | F16F 15/145 |
| | | | | 188/378 |
| 2016/0208886 A1* | 7/2016 | Siemens | ............... | F16F 15/145 |
| 2016/0208887 A1* | 7/2016 | Kram | .................... | F16F 15/145 |

FOREIGN PATENT DOCUMENTS

| | | |
|---|---|---|
| DE | 10 2011 100 895 | 12/2011 |
| DE | 10 2011 004 443 | 8/2012 |
| WO | WO 2012175213 A1 * 12/2012 | ............ F16F 15/145 |

OTHER PUBLICATIONS

Machine translation of WO 2012175213 A1 obtained on Jun. 2, 2017.*

* cited by examiner

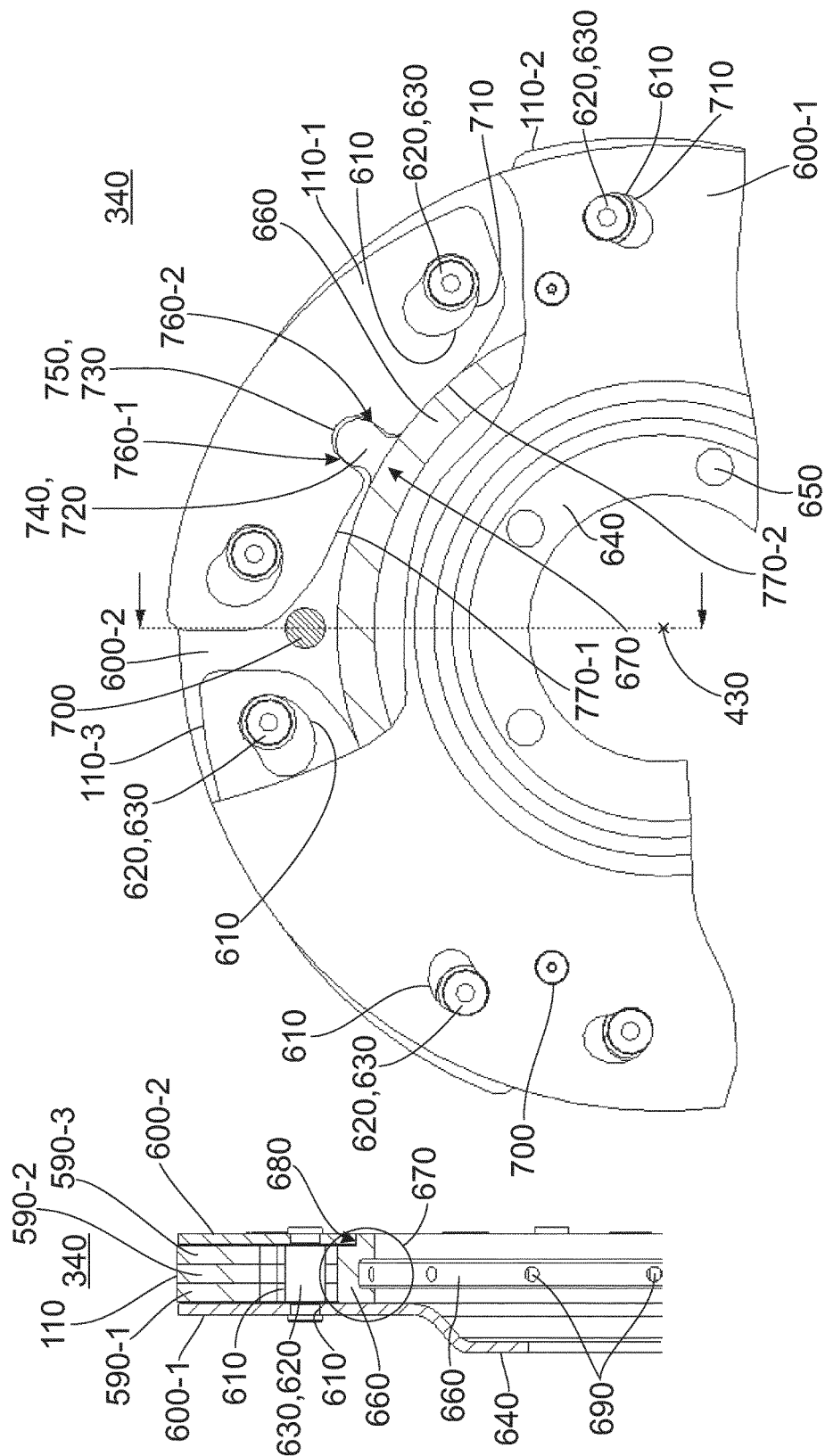

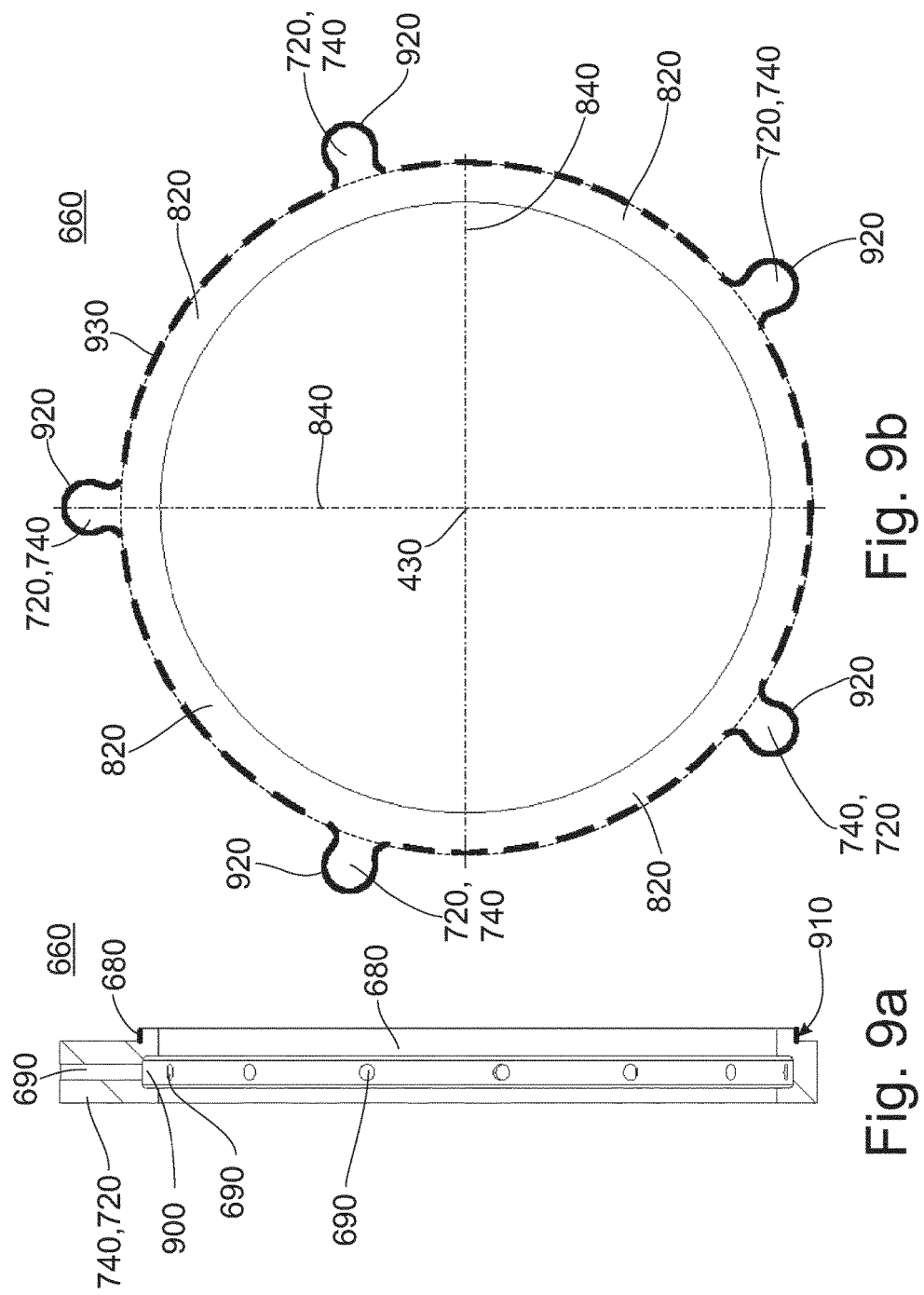

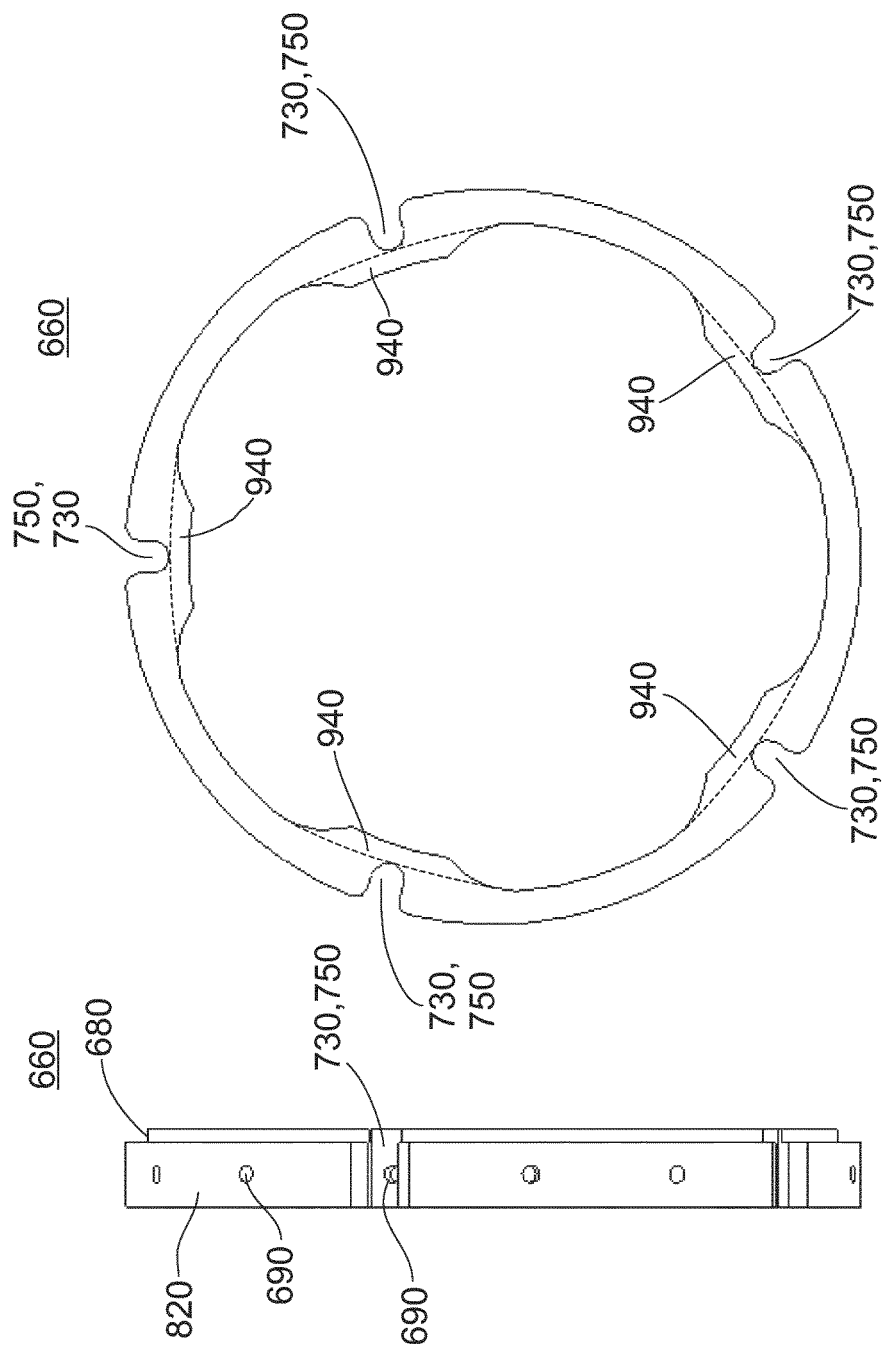

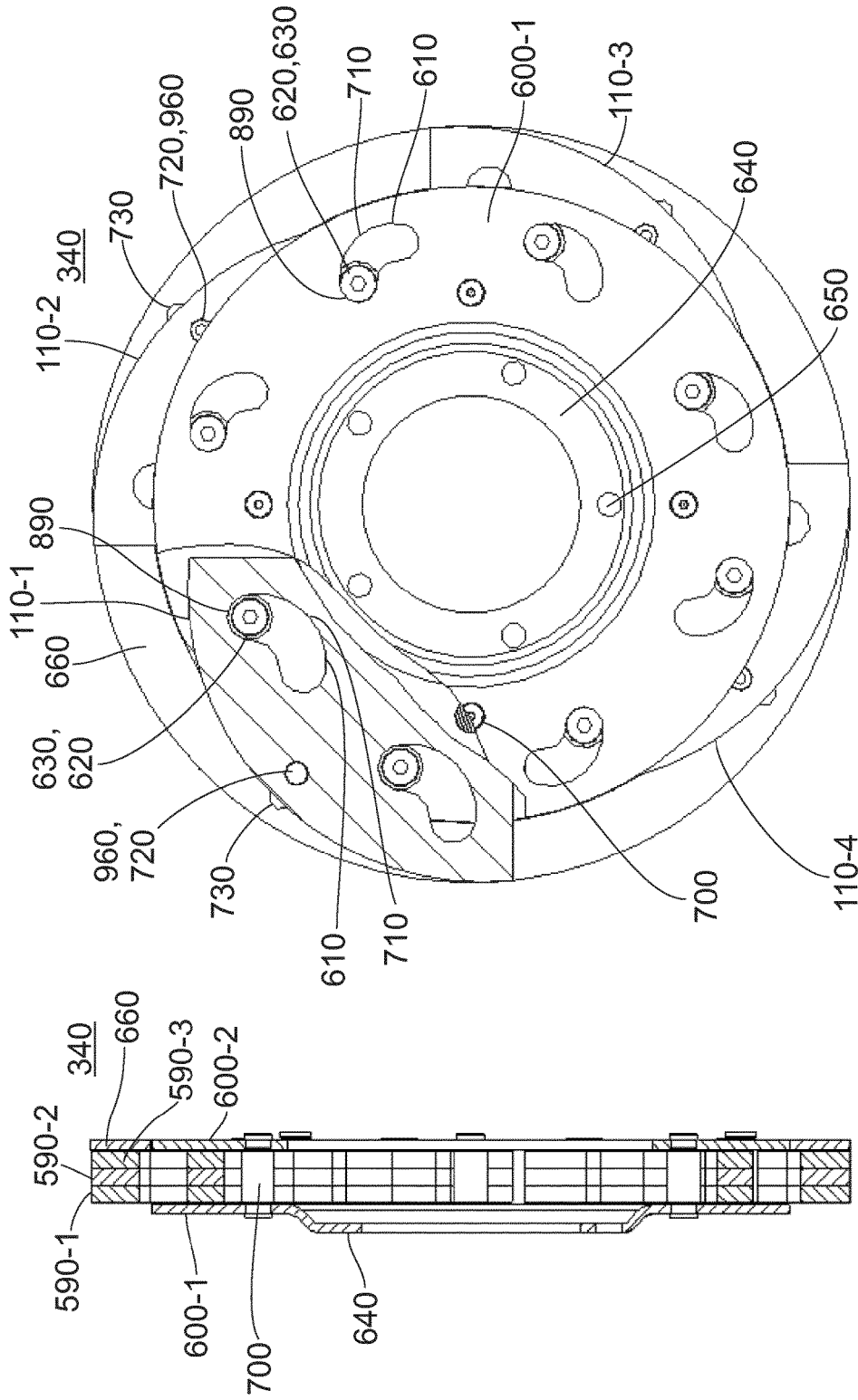

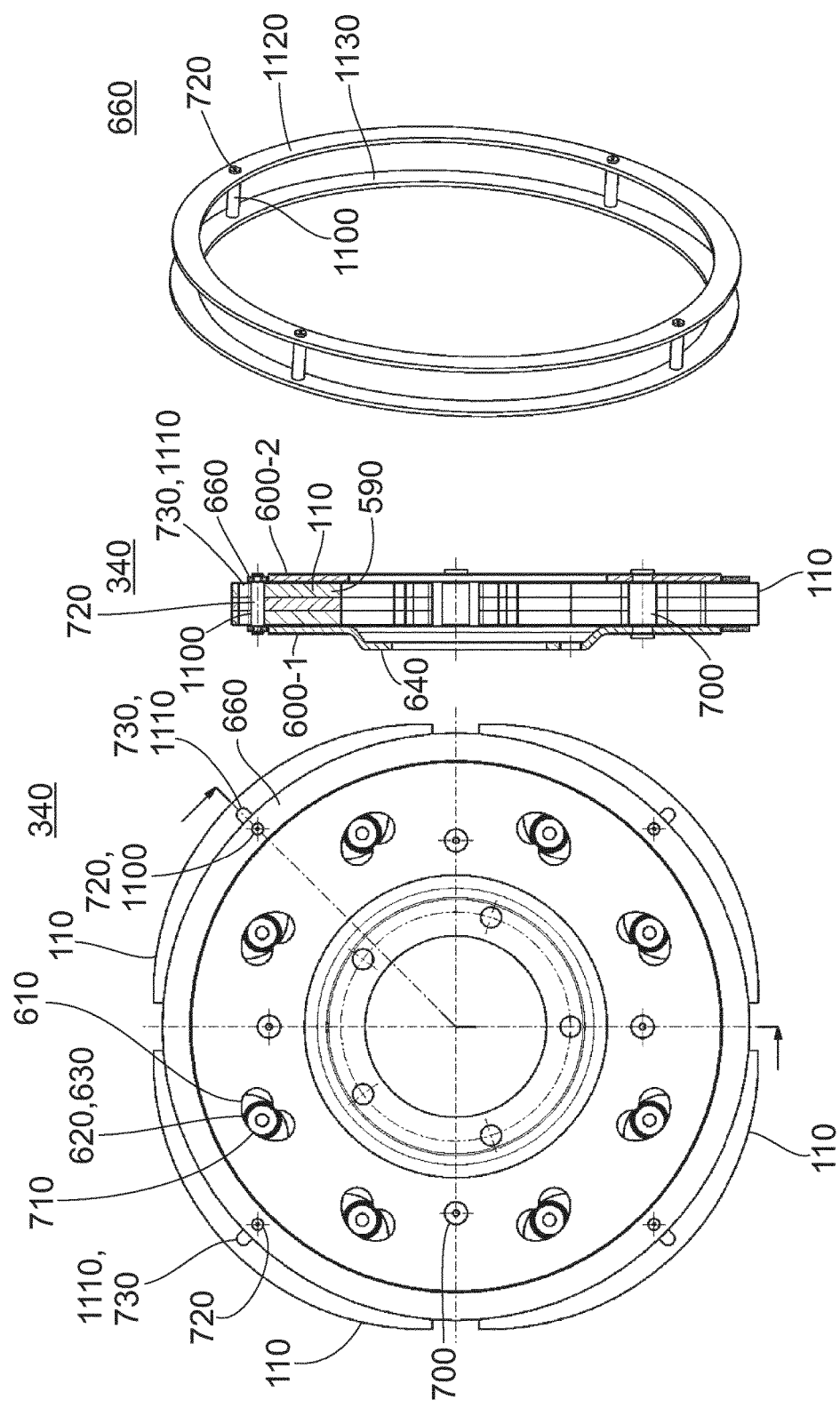

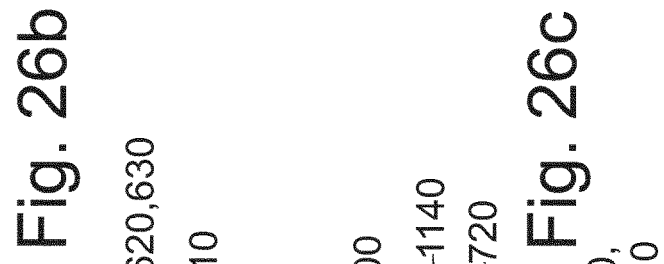
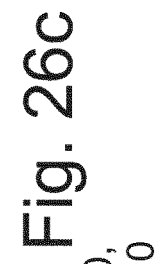
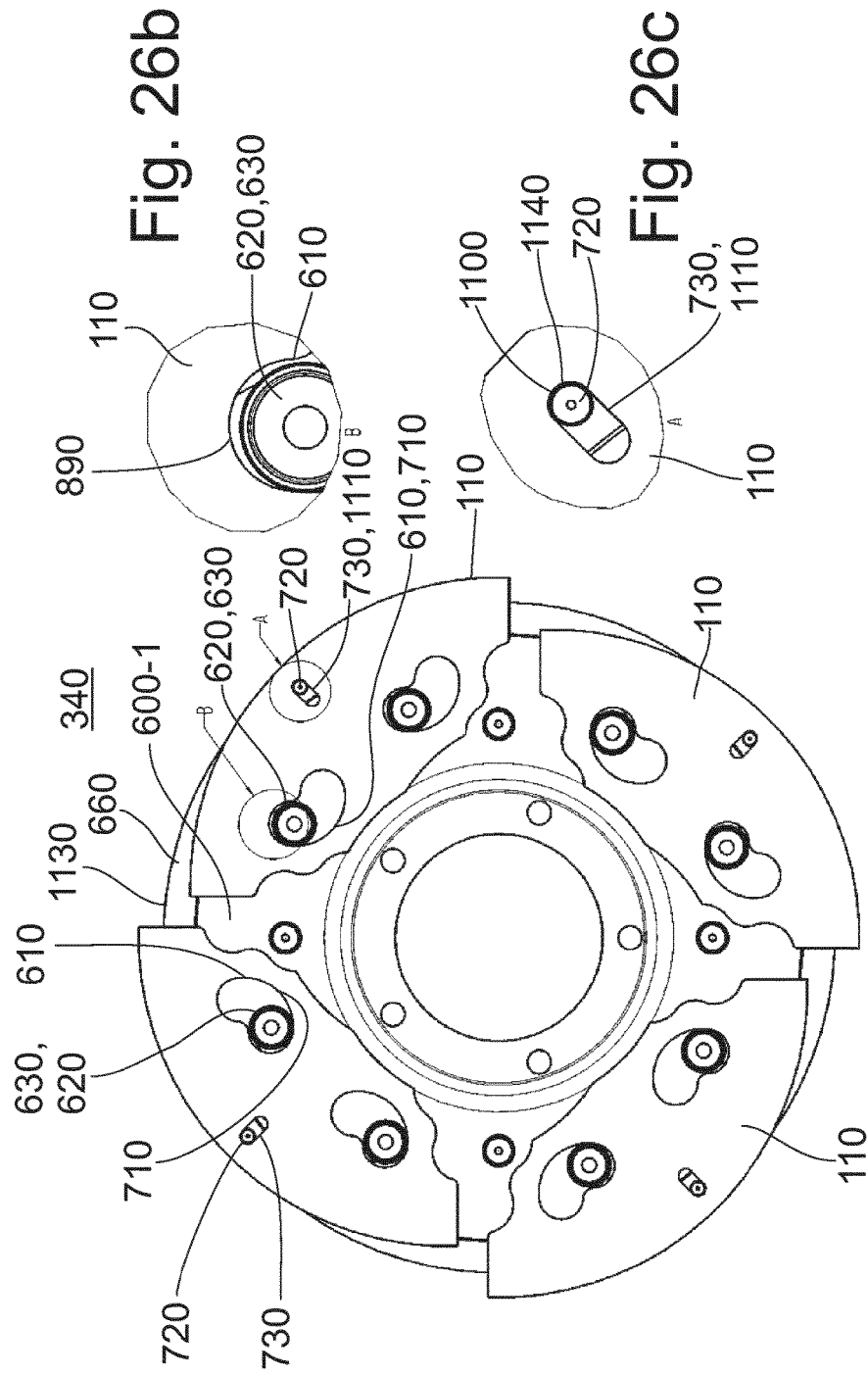

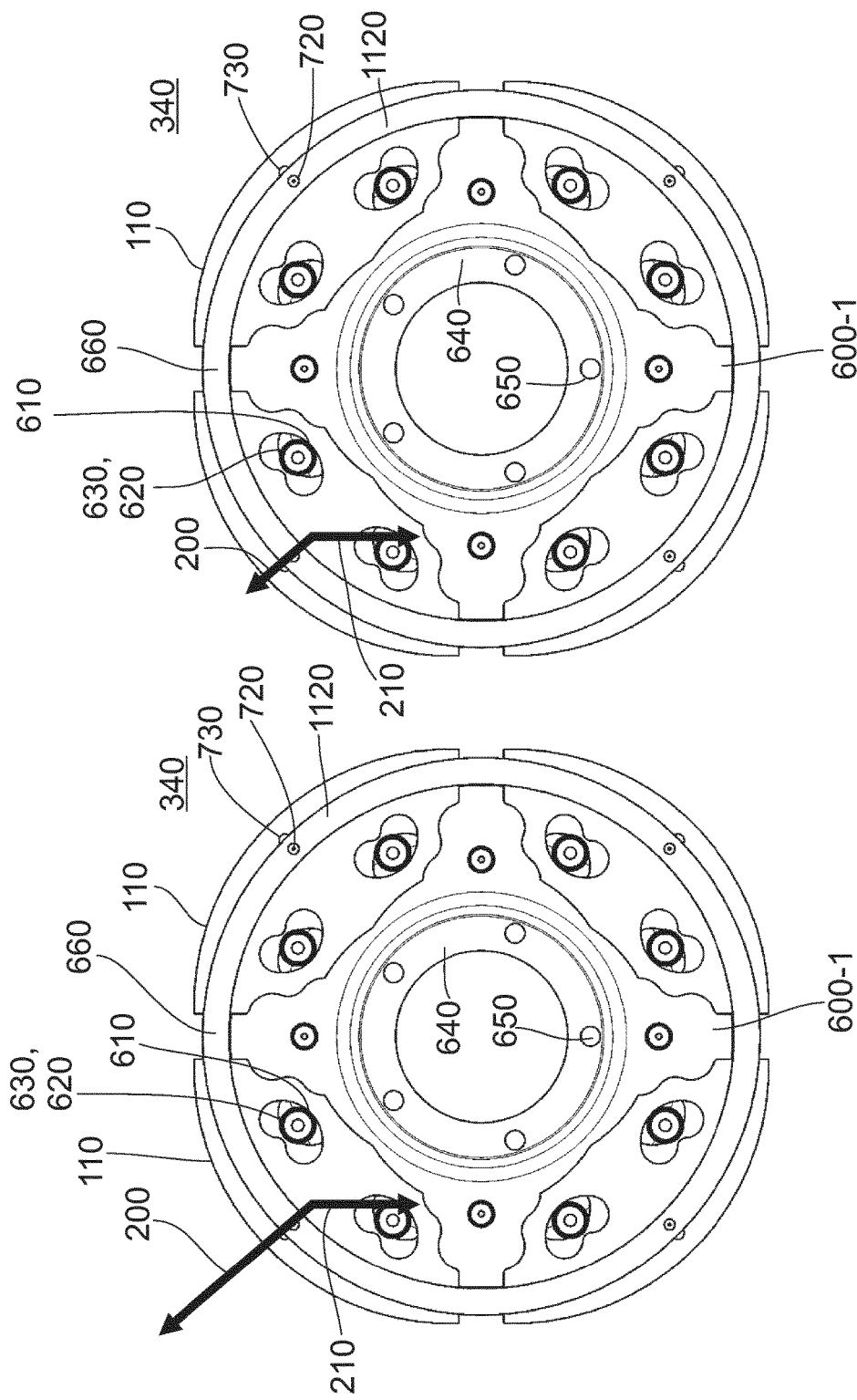

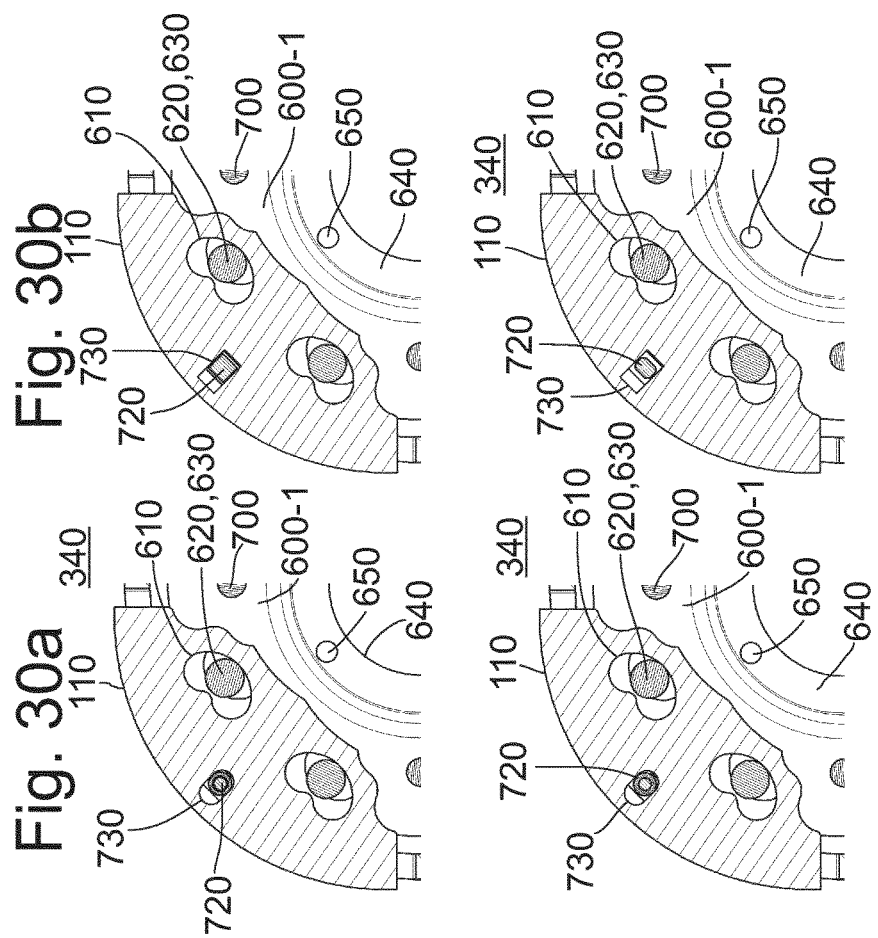
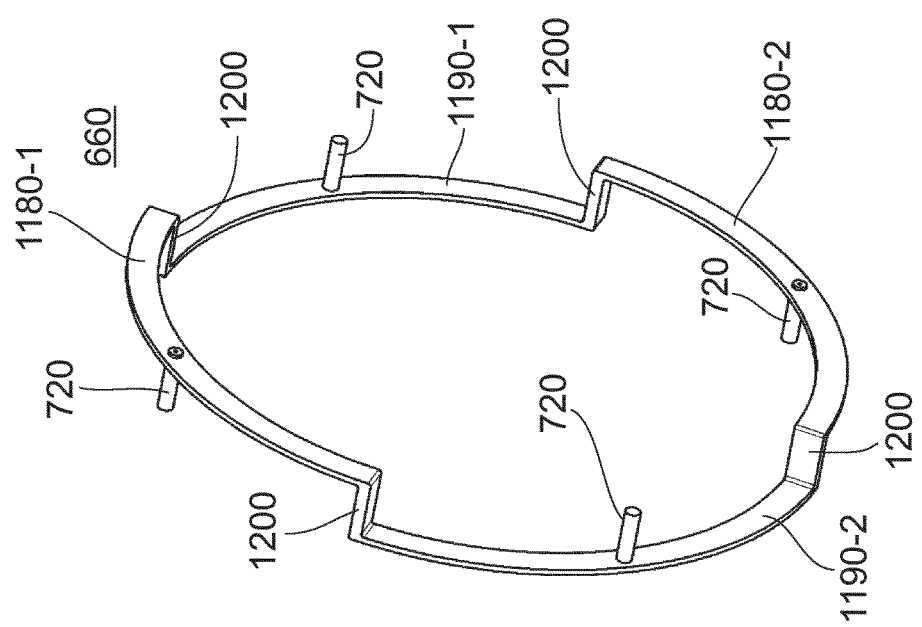

TUNED MASS DAMPER

CROSS REFERENCE TO RELATED APPLICATIONS

This is a U.S. national stage of application No. PCT/EP2014/053204, filed on Feb. 19, 2014. Priority is claimed on German DE102013204713, filed Mar. 18, 2013, the content of which is incorporated herein by reference.

BACKGROUND OF THE INVENTION

1. Field of the Invention

The present disclosure relates to a tuned mass vibration damper for a drivetrain of a motor vehicle, for damping a vibration component of a rotational movement. Tuned mass vibration dampers can be used within the framework of starting elements in a hydrodynamic torque converter in a motor vehicle.

2. Detailed Description of Prior Art

In many starting elements, also referred to as starting clutches, tuned mass vibration dampers are used to damp rotational irregularities originating in an internal combustion engine. Torque shocks transmitted via the crankshaft to an input of a starting element of this type occur operationally in internal combustion engines due to energy being released in bursts. To keep these torque shocks away from an output of the starting element which is itself often coupled to an input of a transmission, or at least to damp them, vibration dampers can be used to damp these and other vibration components of the rotational movement of the crankshaft.

To this end, vibration dampers often have an oscillatory system or a system having the capability of temporarily storing energy by energy accumulators. Depending on the specific implementation of a corresponding vibration damper, spring elements or other energy accumulators can be used for this purpose.

In tuned mass vibration dampers, oscillating pendulum masses, also referred to as damper masses, are used to store energy spikes in a corresponding rotational movement. In contrast to many other vibration dampers in which the rotational movement to be transmitted and, therefore, the torque to be coupled into an input side of the vibration damper and coupled out again at the output side, tuned mass vibration dampers typically have only one connection by which they are coupled to the rotational movement to be transmitted. In other words, in tuned mass vibration dampers the spring elements, i.e., damper masses, are not typically arranged in the torque path. Rather, the connection of the tuned mass vibration damper serves to absorb the above-mentioned energy spikes and to deliver the buffered energy.

Currently, there are many additional requirements for tuned mass vibration dampers apart from the basic function of the tuned mass vibration damper, namely, to damp a vibration component of a rotational movement. For example, it should be possible to produce them as simply as possible. They should also utilize the total available installation space as efficiently as possible. Often, there is only a predetermined total installation space available for a starting element that must be shared by the individual components of the starting element. In mechanical systems for vibration damping, the size of a component often has an important influence on its function. However, in view of the limited available installation space, constraints may arise with respect to the most efficient possible utilization of the installation space available for the tuned mass vibration damper.

There are also efforts being made to construct a corresponding tuned mass vibration damper by the simplest possible technical means, and using as few resources as possible, and to integrate it in a corresponding starting element. Accordingly, in this respect also, there is a demand for the most efficient and simplest possible production of a tuned mass vibration damper, for which purpose a compromise could be made between use of material and the actual production resources expended on installation.

Due to the fact that corresponding damper masses used in tuned mass vibration dampers themselves execute oscillations in order to damp a vibration component of the rotational movement, it can possibly come about under certain operating conditions that the damper masses produce noises found annoying by the driver and the passengers of a vehicle in which the starting element is integrated, as well by other persons and passers-by. Depending on the specific implementation of a tuned mass vibration damper of this type, metallic noises, for example, can be produced which may occur, for example, during the starting of the engine or when switching it off.

During operation of a tuned mass vibration damper, centrifugal forces in particular also occur in addition to the weight force, which centrifugal forces act on the damper masses. Due to the centrifugal force brought about by the engine rotating speed, the damper masses, also referred to as weights, of a tuned mass vibration damper of this type are pressed radially outward. The centrifugal force depends on the speed, the center of gravity radius and the mass of the damper masses. In this connection, speed is the variable that is easily influenced during operation. When switching off the engine, for example, the engine speed decreases until the engine finally stops (0 rpm).

When switching off the engine, an engine speed is reached at which the magnitude of the weight force acting on the damper masses exceeds in that of the centrifugal forces acting on the damper masses. At this point, it may happen that the individual damper masses collide with one another and produce the annoying noises mentioned above.

Such noises can also be generated by the rollers on which the damper masses can be supported. When these rollers strike the stops in their path curves, this can also be accompanied by an annoying noise. Thus as a result of the momentum of the damper masses, a noise can be produced that is unaccustomed and therefore bothersome to the driver, the passengers of the vehicle, or other persons. Therefore, efforts are also made to reduce, minimize or possibly even completely eliminate occurrence of noises during operation of a tuned mass vibration damper.

Apart from starting elements such as can be used in a drivetrain of a motor vehicle, tuned mass vibration dampers can also be used in other rotating systems in which damping of a vibration component of the rotational movement is necessary or advisable. Examples can be found in the field of machine tool engineering as well as in other fields of machine building and automotive engineering in which corresponding rotational irregularities occur, or can occur, in a rotational movement.

DE 10 2011 004 443 A1 relates to a vibration damping device in a vehicle having a deflection mass support rotatable around a rotational axis and at least one deflection mass supported at the deflection mass support so as to be displaceable with respect to it. A deflection of the at least one deflection mass out of a basic relative position with respect to the deflection mass support changes a radial position of the at least one deflection mass with respect to the rotational axis. A restoring or return arrangement is associated with at least one deflection mass and exerts a force oriented in direction of its basic relative position on the deflection mass at least in a partial range of the deflecting movement of the relevant deflection masses.

DE 10 2011 100 895 A1 is directed to a centrifugal pendulum absorber, particularly in a drivetrain of a motor vehicle, with a pendulum flange that is rotatable around an axis of rotation and with a plurality of pendulum masses distributed along the circumference on both sides of the pendulum flange. Two axially opposed pendulum masses are connected to one another in each instance by connection elements extending through the pendulum flange to form pairs of pendulum masses. The pairs of pendulum masses are spaced apart from one another in circumferential direction. In order to achieve an elastic limiting of the pendulum masses without resorting to stop bumpers and cutouts made for the latter in the pendulum flange, an elastic limiting of a swiveling movement of the pendulum masses is implemented by an annular spring provided radially within the pendulum masses.

SUMMARY OF THE INVENTION

Therefore, there is a need for a better compromise between simplifying the production of a tuned mass vibration damper, reducing noises occurring during operation, efficient use of the available installation space, and the performance of the vibration damper. This need is met through a tuned mass vibration damper as disclosed.

A tuned mass vibration damper according to one embodiment example which can be used, for example, in a drivetrain of a motor vehicle and serves to damp a vibration component of a rotational movement comprises at least three damper masses configured to carry out an oscillation depending on the rotational movement in order to damp the vibration component of the rotational movement. It further comprises at least one guide component part configured to movably guide the damper masses such that the damper masses are arranged so as to be offset along a circumferential direction perpendicular to an axis of rotation or rotational direction of the rotational movement and can carry out the oscillations. The tuned mass vibration damper further comprises a dimensionally stable spacer component part rotatable relative to the at least one guide component part around the axis of rotation of the rotational movement and which has a positive engagement connection with clearance with the damper masses configured such that, starting from a center position of the damper masses with respect to the spacer component part, when one of the two damper masses executes an oscillation which overcomes a clearance in the connections of two of the damper masses with respect to the spacer component part, the spacer component part is rotated along the circumferential direction in such a way that it drives the other damper mass of the two damper masses along the circumferential direction.

Embodiment examples are based on the insight that a compromise between simplifying production, reducing noises generated during operation, a more efficient use of the available installation space, and the performance of the vibration damper can be achieved by providing a dimensionally stable spacer component part which guides the damper masses with a positive engagement connection with clearance and drives them along the circumferential direction during a corresponding deflection. Accordingly, owing to the dimensional stability of the spacer component part and the driving of the damper masses along the circumferential direction, contact between the damper masses, for example, can be extensively or completely eliminated. In this way, the noises occurring during operation, i.e., during the operating states of the tuned mass vibration damper which include increasing and reducing the speed of the rotational movement, can be reduced. Beyond this, as will be explained later, a corresponding spacer component part can be implemented in a space-saving manner because of its dimensional stability and, in so doing, can possibly take on additional functions. For example, when appropriately configured, a spacer component part of this type can possibly offer further noise reduction potential. Finally, a tuned mass vibration damper according to one embodiment example can be produced in a simplified manner in that the spacer component part mechanically couples more than only two, i.e., at least three, damper masses.

In other words, the damper masses and the spacer component part engage one inside the other with clearance to provide the positive engagement connection with clearance. By "clearance" is meant the free space in which the relevant components or relevant object, i.e., the damper masses in the present case, can move freely relative to the spacer component part. The relevant components have a geometry or shape such that at least one surface of the objects involved makes contact in each instance along a direction in the mathematical sense of a vector such that a force can be exerted between them along the aforementioned direction and/or along an opposite direction.

By "frictional engagement connection" is meant, broadly, a connection brought about through static friction. A bonding connection is brought about through molecular or atomic interactions and forces, and a positive engagement connection is brought about through a geometric connection of the relevant parts to be connected. Static friction generally presupposes a normal force component between the two parts to be connected.

A frictional engagement contact exists when two objects, i.e., the relevant receiving element and the sliding surface, enter into frictionally engaging contact with one another such that a force is formed therebetween in case of a relative movement perpendicular to a contact surface between them. In this case, there can be a difference in rotational speed, i.e., slip. But apart from this type of frictionally engaging contact, a frictional engagement contact also includes a frictional or non-positive engagement connection between the relevant objects in which a corresponding difference in rotational speed, or slip, essentially does not occur.

By "dimensionally stable component part" is meant a component part having no mechanical elastic deformability or only a slight—in proportion to its dimensions—and therefore essentially negligible mechanical elastic deformability. Accordingly, while an elastic deformation occurs in virtually all component parts when acted upon by a corresponding force, this elastic deformation typically ranges in orders of magnitude that are negligible when the dimensions of the component part in question are taken into account. Corresponding changes in shape are often in the range of less than 0.1%, less than 1‰, or less than 1%. This applies to all forces acting on the relevant component part, i.e., in the case of an elongate or longitudinal component part, for example, along this longitudinal direction as well as perpendicularly within the meaning of shearing forces.

Optionally, in a tuned mass vibration damper according to one embodiment example the damper masses and the spacer component part can be configured in such a way that the damper masses are rotatable with respect to the spacer component part by a predetermined angle starting from their center positions relative to the spacer component part. In other words, the damper masses can optionally be rotated by the spacer component part individually or collectively by a predetermined angle. Accordingly, depending on the specific implementation of a damper mass, in addition to a mere parallel offset along the circumferential direction, a rotation and, therefore, possibly a change in the distance of the center of gravity from the axis of rotation, also referred to as axial direction, can also be caused by the rotation. In this way, it can be possible optionally to implement a speed-adaptive tuned mass vibration damper, as it is called, in which the center of gravity is changed relative to the axis of rotation of the rotational movement depending on the movement of the damper masses, i.e., depending on their deflections.

Additionally or alternatively, in the tuned mass vibration damper according to one embodiment example the damper masses and the spacer component part are configured such that the clearances in the connections between the damper masses and the spacer component part prevent a contact between two damper masses adjacent along the circumferential direction in all operating states of the tuned mass vibration damper. The operating states also include stopping and starting of the tuned mass vibration damper. Accordingly, it can also be possible to reduce or even completely prevent generation of noise brought about by two or more damper masses striking one another.

Additionally or alternatively, in the tuned mass vibration damper according to one embodiment example the clearances of the connections between the damper masses and the spacer component part can be configured in such a way that the damper masses are guided substantially parallel to one another by the spacer component part. Guiding in parallel is not limited herein to a linear movement meaning a movement along a straight line. Parallel guidance can also take place on curves, paths or other curved contours. Paths can be parallel when their tangents are parallel at every point. This also applies, of course, to portions which may include more than one point in the mathematical sense. Accordingly, it can be possible optionally to prevent a collision of two or more damper masses in the operating states of the tuned mass vibration damper.

Additionally or alternatively, in a tuned mass vibration damper according to one embodiment example the at least one guide component part can have at least partially a circular or cylinder surface-shaped contour extending at least partially or completely around the axis of rotation. The spacer component part can be configured to be mounted radially at the circular or cylinder surface-shaped contour. Accordingly, the at least one guide component part can have an inner contour and/or outer contour which is completely and/or partially circular or cylinder surface-shaped. The cylinder surface-shaped contour extends parallel to and around the axis of rotation, i.e., the axial direction of the rotational movement. Accordingly, it can be possible to implement the rotatable arrangement of the spacer component part relative to at least one of the guide component parts by simple constructional means. This makes it possible to further simplify the production of the tuned mass vibration damper.

Additionally or alternatively, in a tuned mass vibration damper according to an embodiment example at least 50% of a mass of the spacer component part can be arranged entirely radially outwardly or inwardly of at least one guide component part. In other embodiment examples, this can be at least 60%, at least 70%, at least 80%, or at least 90% of the mass of the spacer component part. In other words, the mass of the spacer component part can be arranged substantially radially outwardly of or radially inwardly of at least one guide component part.

"At least one guide component part" means exactly this when the tuned mass vibration damper comprises exactly one such guide component part. However, if it comprises a plurality, then this applies to at least one of the guide component parts in question. Accordingly, it can be possible optionally to arrange and configure the spacer ring precisely such that it is arranged substantially radially outwardly of or radially inwardly of one or more guide component parts so that it can be possible, as the case may be, to realize a more efficient use of the available installation space.

Additionally or alternatively, in a tuned mass vibration damper according to an embodiment example the spacer component part can be configured to limit a movement of the damper masses along a radial direction, and/or to limit a maximum oscillation angle of the damper masses, by making contact with the damper masses outside of the positive engagement connection thereto with clearance. Accordingly, in a tuned mass vibration damper according to an embodiment example the spacer component part can limit the radial movement of the damper masses and/or the oscillation angle of the damper masses with respect to a maximum value and can accordingly reduce or even completely prevent a development of annoying noises. This can be carried out by further structures of the spacer component part that do not serve the positive engagement connection with clearance for driving the damper masses.

In a tuned mass vibration damper of this type according to one embodiment example, the spacer component part can optionally be formed as an inner spacer ring or as an outer spacer ring in order to intercept at least one of the damper masses during a radially inwardly directed or radially outwardly directed movement thereof beyond a predetermined distance. The spacer component part can perform this for exactly one damper mass, for more than one damper mass or for all damper masses of the at least three damper masses. It can possibly be sufficient to realize this also for fewer than all of the damper masses or even for only one individual damper mass because, as a result of the driving of the damper masses by the spacer component part, a mechanical coupling can exist between them. Accordingly, in addition to or as an alternative to the limiting described above, it can be possible for the spacer component part to reduce or even prevent generation of noise by the damper masses.

Because of the configuration as inner spacer ring or outer spacer ring, the spacer component part is also often referred to as spacer ring. It can be formed of one or more parts, e.g., constructed in a segmented manner, or in some other way. The segments can be mechanically connected to one another with or without clearance. Also, it is not necessary that the spacer ring completely surrounds the axis of rotation of the rotational movement by 360° in the manner of a full circle. In such a case, the spacer ring need merely guide or drive the at least three damper masses, or all of the damper masses as the case may be, via the above-described positive engagement connection with clearance. Also, a ring of this type can have a structure that deviates from the typical annular shape when it extends radially inward and/or radially outward over the basic annular structure. Therefore, "ring" is also understood to mean a structure having, for example, deviations in radial direction, possibly also along the axis of rotation. This may be possible or even advisable, for example, to economize on mass or weight, to absorb mechanical loads or for selective shaping in the interest of the most uniform possible moment of inertia.

Additionally or alternatively, in a tuned mass vibration damper according to one embodiment example the damper masses and the spacer component part can be configured in such a way that a maximum oscillation angle of the damper masses and/or a movement thereof along the radial direction is limited by the positive engagement connection with clearance. Accordingly, the positive engagement connection with clearance can also be made use of in embodiment examples optionally to reduce or even completely eliminate noise generation.

Accordingly, additionally or alternatively, in a tuned mass vibration damper according to one embodiment example a pairing of materials of the components making contact with one another when limiting the radial movement or maximum oscillation angle can be selected such that that less noise occurs compared to a pairing of metallic materials. For example, one of the components in question can have a plastic, i.e., for example, a thermosetting plastic, an elastomer or a thermoplastic, in limited areas or throughout, while the other component can have a metallic material in the relevant area or throughout, i.e., for example, a metal, an alloy or another comparable metallic material to which, e.g., non-metallic components can be added.

Additionally or alternatively, in a tuned mass vibration damper according to one embodiment example the positive engagement connection with clearance between the spacer component part and at least one of the damper masses can have a connection structure and a connection recess, wherein the connection structure engages in the connection recess, and wherein the connection structure and the connection recess are configured to enable a radial movement of the connection structure and connection recess relative to one another and/or to enable a rotation of the connection structure and connection recess relative to one another. Accordingly, it can be possible to produce a tuned mass vibration damper according to one embodiment example by simple technical means and in a simplified manner. The connection structure can comprise, for example, a tenon or a tongue of a tongue-and-groove joint, and the connection recess can comprise a bore hole, an elongated hole, a groove of a tongue-and-groove joint or a slot-shaped recess. When the connection recesses are implemented, for instance, in the spacer component part, they can be substantially radially oriented, for example. Accordingly, if it is an elongated hole, a slot-shaped recess or a groove, for example, it can be substantially radially oriented. If the connection recess is implemented in one or more damper masses, the same holds true in this case, for example, if the damper mass is arranged in the center position around which it executes its oscillations. In this regard, the damper masses and joints can be realized individually, severally or in their entirety by a positive engagement connection with clearance of the type mentioned above. It should be mentioned here merely for the sake of completeness that a linear movement, for example, along the radial direction, can also be superimposed on the rotational movement of a rotation during swiveling.

Additionally or alternatively, in a tuned mass vibration damper according to one embodiment example, the connection structure can have at least partially a circular and/or at least partially elliptical outer contour perpendicular to the axis of rotation, this outer contour extending over a predetermined aperture angle of greater than 0°. The aperture angle in this regard is the angle had relative to one another by the tangents to both sides of the connection structure at an edge area in which the circular or elliptical outer contour transitions into a diverging contour.

Additionally or alternatively, in a tuned mass vibration damper according to one embodiment example the connection recess can be configured to receive the connection structure so as to enable a rotation of the relevant damper mass around the aperture angle and to allow a movement of the connection structure along the radial direction. Accordingly, in a tuned mass vibration damper according to an embodiment example an outer contour of the connection recess can have, for example, two opposed straight portions which are arranged between an open end of the connection recess and a closed end of the connection recess. The two straight portions can optionally extend parallel to one another. Additionally or alternatively, the spacer component part can also be at least partially guided axially by the at least one guide component part.

Additionally or alternatively, in a tuned mass vibration damper according to one embodiment example the connection structure can have at least partially a cylinder-shaped outer contour, the center axis of which, also referred to as axis of symmetry, extends parallel to the axis of rotation. In this case, the outer contour of the connection recess can have two straight portions opposite one another which are arranged between an open end of the connection recess and a closed end of the connection recess. In so doing, the connection recess can be configured to receive the connection structure so as to enable a rotation of the relevant damper mass and a movement of the connection structure along the radial direction. A cylinder-shaped outer contour is one that is formed completely circumferentially in a plane perpendicular to the axis of rotation or perpendicular to its center axis.

Optionally, in a tuned mass vibration damper according to an embodiment example the connection structure can be mechanically fixedly connected to the relevant damper mass, the connection structure and at least one guide component part being configured to limit a movement of the relevant damper mass along the radial direction by a connection structure making contact with the at least one guide component part. In this regard, "mechanically fixed connection" means a connection which is substantially free from play in all linear spatial directions. Such a connection can be provided, for example, by a friction engagement connection, positive engagement connection and/or bonding connection.

Optionally, in a tuned mass vibration damper according to an embodiment example the connection structure can be configured to make contact with the at least one guide component part via the cylinder-shaped outer contour. For this purpose, the connection structure can optionally be made of a metallic material, while the portion of the cylinder-shaped outer contour making contact with the at least one guide component part can be enclosed by a sleeve made of a plastic, for example, a thermosetting plastic, an elastomer or a thermoplastic. In this case, the connection structure can optionally comprise a rivet that is connected to the relevant damper mass and by which the spacer component part is guided along the rotational direction at least partially by a rivet head of the rivet.

Additionally or alternatively, in a tuned mass vibration damper according to one embodiment example the connection structure can be connected to at least one of the damper masses, wherein the connection structure is configured in the spacer component part to limit a movement of the relevant damper mass along the radial direction by the connection structure making contact with the spacer component part. Optionally, in a tuned mass vibration damper of this type the connection structure can be configured to make contact with a slot-shaped recess of the spacer component part via the cylinder-shaped outer contour in order to limit the movement of the relevant damper mass along the radial direction.

In this type of embodiment example of a tuned mass vibration damper, the connection structure can optionally also be made of a metallic material, and the portion of the cylinder-shaped outer contour which makes contact with the at least one guide component part can be enclosed by a sleeve made of a plastic, for example, a thermosetting plastic, an elastomer or a thermoplastic. In a tuned mass vibration damper, the connection structure can optionally comprise a rivet which is connected to the relevant damper mass and by which the spacer component part is guided along the rotational direction at least partially by a rivet head of the rivet.

Regardless of the exact implementation of the sleeve, this sleeve can be a separate component part, but can also be formed integrally with the rivet. The sleeve can be joined to the rivet, for example, by vulcanizing, gluing or by another joining technique. Different process techniques may be advisable depending on the material employed. In case of an elastomer, the rivet can be rubberized.

In a tuned mass vibration damper according to an embodiment example, the spacer component part can optionally comprise the connection structure which has a guide portion. In this case, at least one of the damper masses can have the connection recess comprising an elongated hole and/or a slot-shaped recess in which the guide portion engages. The guide portion can optionally have a cylindrical or polygonal, e.g., rectangular or square, outer contour.

Optionally, in this kind of embodiment example the spacer component part can have an annular portion connected to the connection structure extending along the axis of rotation. Optionally, in a tuned mass vibration damper of this type according to an embodiment example the spacer component part can have, arranged so as to be offset parallel to the annular portion along the axis of rotation, a further annular portion is also connected to the connection structure. The statements made above with regard to the ring apply correspondingly to the annular portion. For example, to name only one modification, the annular portion and/or the further annular portion can be formed of one or more parts.

Alternatively, in a tuned mass vibration damper according to one embodiment example the spacer component part can comprise at least one ring segment-shaped portion and a further annular portion which is offset parallel to the ring segment-shaped portion along the axis of rotation and is connected to the ring segment-shaped portion, wherein the connection structure extends along the axis of rotation and is connected to the ring segment-shaped portion and/or to the further ring segment-shaped portion.

Optionally, in this embodiment example or also in other embodiment examples of a tuned mass vibration damper the connection structure and the connection recess can be configured to limit a movement of the relevant damper mass along the radial direction by the connection recess making contact with an end of the connection recess. Optionally, in this type of embodiment examples of a tuned mass vibration damper the connection structure can be made of a metallic material, and the portion of the cylinder-shaped outer contour making contact with the end of the connection recess is enclosed by a sleeve made of a plastic, for example, a thermosetting plastic, an elastomer or a thermoplastic. The remarks made above in connection with the sleeve also apply again in this case.

Additionally or alternatively, in a tuned mass vibration damper according to an embodiment example the spacer component part can have a stop structure which is configured to limit a rotation of the spacer component part with respect to the at least one guide component part. Accordingly, it can be possible optionally to relieve the positive engagement connection with clearance in a simple manner with respect to construction. In this case, it can be possible, for example, to transfer the limiting of rotation from the positive engagement connection to the stop structure.

Accordingly, in a tuned mass vibration damper according to an embodiment example the stop structure of the spacer component part can optionally comprise a stop projection or a stop recess which is configured to engage in a complementary stop recess or complementary stop projection, respectively, of at least one guide component part and accordingly to limit a rotation of the spacer component part with respect to the at least one guide component part. In this way, in a simple manner with respect to construction, noise in a tuned mass vibration damper during the operation or during the operating states thereof can be reduced or completely prevented while making efficient use of the available installation space.

Optionally, a pairing of materials, as previously described, can be used in connection with the stop projection and corresponding complementary stop recess or with the stop recess and complementary stop projection, respectively. Accordingly, the spacer component part or the guide component part can be made of a metallic material, for example, while the other of the component parts can be made of a plastic, i.e., for example, a thermosetting plastic, an elastomer or a thermoplastic.

Additionally or alternatively, in a tuned mass vibration damper according to an embodiment example the damper masses can have at least one guide path in each instance. Further, the at least one guide component part for the damper masses can also have in each instance at least one guide path corresponding to the guide paths of the damper masses. In this case, the tuned mass vibration damper has in each instance at least one rolling body for the damper masses, which rolling body is configured to roll along the guide paths of the at least one guide component part and along those of the damper masses in order to guide them in such a way that a deflection of the damper masses out of their respective center positions leads to a radial displacement of the centers of gravity of the respective damper masses. It can be possible to implement a speed-adaptive damper in this way.

Optionally, in this type of embodiment example of a tuned mass vibration damper a limiting of the movement of the at least one damper mass in radial direction can be brought about before the at least one rolling body in question reaches an end of the relevant guide paths of the damper mass and of the at least one guide component part. Accordingly, it may be possible to avoid using a noise-reducing pairing of materials also in the region of the rolling bodies and of the guide component part which could undermine an overall loadability of the guide, a moment of inertia of the rolling bodies or production of the at least one guide component part.

Additionally or alternatively, in the tuned mass vibration damper according to one embodiment example the spacer component part and the damper masses can be configured to enable the driving of the damper masses along the circumferential direction and in the opposite direction. Additionally or alternatively, the at least one guide component part, the spacer component part and the damper masses can be configured to allow a substantially symmetrical oscillation of the damper masses around their respective center positions. In this case, the spacer component part can be in a positive engagement connection with clearance which is configured such that the damper masses are driven along the circumferential direction by a rotation of the spacer component part along the circumferential direction that overcomes the clearance of the connection.

Additionally or alternatively, in a tuned mass vibration damper according to one embodiment example the spacer component part can be connected to all of the damper masses by a positive engagement with clearance such that, from a center position of any one of the totality of damper masses with respect to the spacer component part and from the center positions of the other damper masses with respect to the spacer component part, during an oscillation of the respective damper mass that overcomes clearance in all of the connections of the damper masses to the spacer component part, the spacer component part is rotated along the circumferential direction in such a way that it drives all of the rest of the damper masses along the circumferential direction.

Two objects are adjacent to one another when no object of the same type is arranged between them. Corresponding objects are directly adjacent when they adjoin one another, i.e., for example, contact one another. A mechanical coupling of two components includes both a direct coupling and an indirect coupling. A component part is seamless when it has no seam along a closed path around a predetermined direction, for example, an axial direction or an axis of symmetry, at which seam the component part is connected in itself or to another component part by a corresponding joining technique, for example, a bonding joining technique, particularly welding, soldering or gluing.

By component formed in one piece is meant a component that is made of exactly one contiguous piece of material. A component or structure made, provided or produced in one part or a component or structure made, provided or produced integral with at least one further part means that the component or structure cannot be separated from the at least one further component without destroying or damaging one of the at least two components concerned. Accordingly, a one-piece structural component part is also at least a structural component part which is formed integral with, or forms one part with, another structure of the relevant structural component part.

The word "direction" notwithstanding, the individual "directions" in the present case may not necessarily refer to a direction in the mathematical sense of a vector, but rather may be a line along which the corresponding movement takes place. A line of this type can be straight or curved. Directions which describe actual directions along a line, for example, the movement direction, are a separate case. Thus, for example, a first direction can be opposite to a second direction, but both can run along or be directed along a line which is also referred to as a "direction".

A component can have an n-fold rotational symmetry, for example, where n is a natural number greater than or equal to 2. An n-fold rotational symmetry exists when the relevant component can be rotated by (360°/n) around an axis of rotation or axis of symmetry and substantially transitions into itself with respect to shape, i.e., substantially self-maps in the mathematical sense, after a certain rotation. In contrast, in the case of a completely rotationally symmetrical configuration of a component, the component substantially transitions into itself with respect to shape, i.e., substantially self-maps in a mathematical sense, when rotated by any amount and by any angle around the axis of rotation or axis of symmetry. An n-fold rotational symmetry and a complete rotational symmetry are both referred to herein as rotational symmetry.

BRIEF DESCRIPTION OF THE DRAWINGS

Embodiment examples will be described and explained more fully in the following with reference to the accompanying drawings.

FIG. 3a is a fragmentary cross-sectional view through a tuned mass vibration damper;

FIG. 3b is a fragmentary elevational view of the tuned mass vibration damper according to an embodiment example shown in FIG. 3a;

FIG. 7a is a side view of a spacer component part of a tuned mass vibration damper;

FIG. 7b is a top view of the spacer component part from FIG. 7a;

FIG. 9a is a cross-sectional view through a spacer component part of a tuned mass vibration damper;

FIG. 9b is a top view of a further spacer component part of a tuned mass vibration damper;

FIG. 10a is a cross-sectional view through a tuned mass vibration damper;

FIG. 10b is a fragmentary elevational view of the tuned mass vibration damper shown in FIG. 10a;

FIG. 11a is a side view of a spacer component part of a tuned mass vibration damper;

FIG. 11b is a top view of the spacer component part shown in FIG. 11a;

FIG. 14a is a cross-sectional view through a tuned mass vibration damper;

FIG. 14b is a fragmentary elevational view of the tuned mass vibration damper shown in FIG. 14a;

FIG. 18a is a cross-sectional view through a tuned mass vibration damper;

FIG. 18b is an enlarged view of a connection structure and a connection recess of the tuned mass vibration damper shown in FIG. 18a;

FIG. 25a is a top view of the tuned mass vibration damper shown in FIG. 24;

FIG. 25b is a sectional view through the tuned mass vibration damper shown in FIGS. 24 and 25a;

FIG. 25c is a perspective view of the spacer component part of the tuned mass vibration damper from FIGS. 24, 25a and 25b;

FIG. 26a is a view of the damper masses of the tuned mass vibration damper according to FIGS. 24, 25a, 25b with the damper masses swiveled to the maximum extent;

FIG. 26b is a position of a rolling body in a guide path of a guide component part of the tuned mass vibration damper from FIG. 26a;

FIG. 26c is an enlarged top view of the connection structure in the connection recess of the tuned mass vibration damper from FIG. 26a;

FIGS. 27a and 27b are comparisons of the forces acting at a damper mass during an operation of the tuned mass vibration damper at a constant speed of the engine and a slow rotation of the engine, for example, when the engine is switched off;

FIG. 28b is a top view of the tuned mass vibration damper according to an embodiment example with the spacer component part shown in FIG. 28a;

FIG. 29 shows a perspective view of a spacer component part of a tuned mass vibration damper; and FIGS. 30a to 30d are elevational views of a tuned mass vibration damper in the area of a damper mass and the connection structure with different connection structure configurations.

Figure 1:
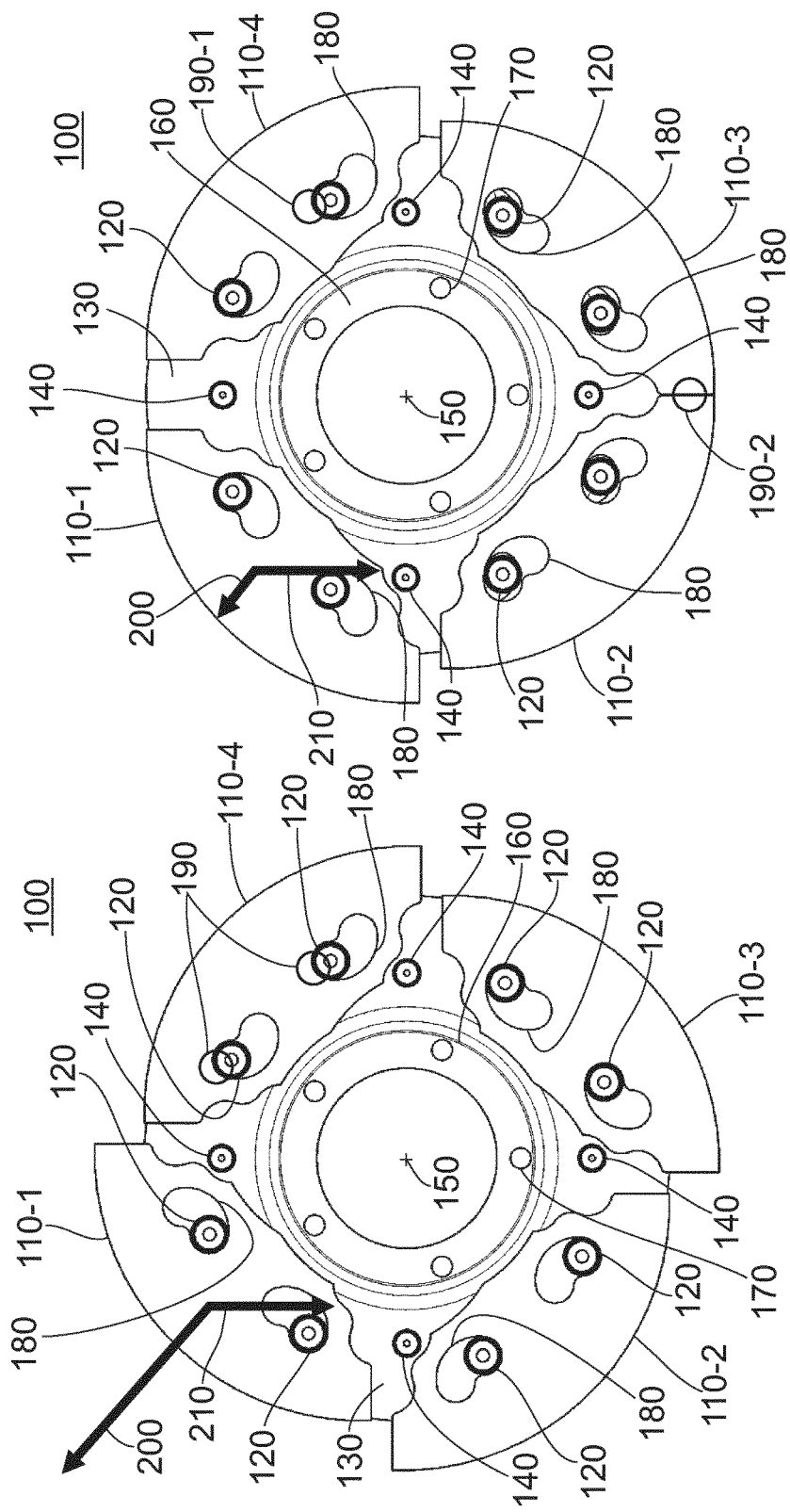
FIG. 1a is a view of the damper masses in a conventional speed-adaptive damper in full deflection.
FIG. 1b is a view of the damper masses in a conventional speed-adaptive damper without operating speed.

Identical or comparable components are denoted by identical reference numerals in the following description of the accompanying drawings. Further, collective reference numerals are used for components and objects which occur more than once in an embodiment example or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description.

DETAILED DESCRIPTION OF THE PRESENTLY PREFERRED EMBODIMENTS

As was already briefly mentioned in the introductory part, vibration dampers and, in the present case, particularly tuned mass vibration dampers are used in many technical fields, including, for example, drivetrains of a motor vehicle but also in other technical fields. Vibration dampers and tuned mass vibration dampers can be used, for example, when a rotational movement has rotational irregularities such as can occur operationally in internal combustion engines, for example. In internal combustion engines operating, for example, on the Otto engine or diesel engine principle, energy is released in bursts and, therefore, torque spikes occur in bursts which can be reflected in the generated torque and in the instantaneous speed of an engine of this type.

For example, when a starting element which serves to allow continued running of the engine even when the vehicle is stopped is connected in a drivetrain between an internal combustion engine of the type mentioned above and a transmission, it may be in the interest of the manufacturer of the vehicle in question and of his customers, at least based on considerations of driving comfort, to remove or at least reduce or dampen the rotational irregularities from the rotational movement of the crankshaft of the engine before they reach the input shaft of the transmission. To this end, vibration dampers can be used in connection with corresponding starting elements. These vibration dampers are typically based on temporarily storing energy spikes of the rotational movement, i.e., for example, torque spikes or temporary increases in speed, in energy accumulators before they can be reproduced at the input shaft of the transmission. In this connection, hydrodynamic starting elements, i.e., for example, a torque converter, also referred to as converter, as well as starting elements based on a frictionally engaging connection, or a combination of these two concepts, can be used as starting elements.

To this end, vibration dampers often have an input component part and an output component part between which the energy accumulator elements are installed and by which the transmission of rotational movement takes place. In tuned mass vibration dampers, also referred to as dampers for brevity, the torque path does not pass via the energy accumulator elements. Rather, tuned mass vibration dampers often have a connection or connection component to which the damper masses acting as energy accumulator elements are coupled. These damper masses are mounted on and guided by one or more guide component parts such that a center of gravity of the damper masses is moved radially during a deflection, i.e., an oscillation, of the relevant damper masses. In this way, the damper masses can obtain potential energy in the force field generated by the rotational movement and includes inter alia the centrifugal force of the rotational movement. Corresponding tuned mass vibration dampers are also referred to as speed-adaptive dampers.

Energy that has flowed into the damper masses temporarily can be removed therefrom again correspondingly and can be coupled into the rotational movement again at an appropriate time via the connection component part. Therefore, a tuned mass vibration damper can damp, or possibly even completely eliminate, vibration components by temporarily storing the occurring vibration energy and coupling it back into the rotational movement correspondingly.

The damper masses are often made from a metallic material, i.e., for example, a metal, an alloy or a similar metallic material which may also include non-metallic components, for example. However, depending on the operating state of a tuned mass vibration damper of this type, metallic noises may possibly result which can be annoying to the driver of a motor vehicle of this kind and to the passengers of the motor vehicle as well as to passers-by or other bystanders. Such metallic noises can occur, for example, in normal vehicle operation but also during crawling operation of the vehicle. They can also occur in the course of switching off the internal combustion engine, also referred to as engine for brevity. This is relevant precisely to automatic engine starting and stopping systems such as are used, for example, to save energy.

As will be explained later referring to FIGS. 1a and 1b, the rotational speed and therefore also the centrifugal force of the damper masses of the tuned mass vibration damper, also referred to as speed-adaptive damper, are reduced by switching off the engine in the vehicle. Starting from a determined speed, the weight forces can then exert increased influence on the position of the damper masses in a tuned mass vibration damper so that these damper masses may possibly collide with one another. This effect can produce the unwanted noises described above.

These noises can become more noticeable in that the transmission can continue to run for several seconds after the engine is switched off due to inertia. Owing to the after-running of the damper assembly, which includes the tuned mass vibration damper, the damper masses of the tuned mass vibration damper can hit one another or knock into their stops.

FIG. 1a shows a top view of a conventional tuned mass vibration damper 100 having four damper masses 110-1, 110-2, 110-3 and 110-4 which are respectively mounted on and guided by a first guide plate 130 and a second guide plate, not shown in FIG. 1a, by two rollers 120 in each instance such that the damper masses 110 can execute an oscillation for damping a vibration component of a rotational movement introduced into the tuned mass vibration damper 100. The second guide plate, not shown in FIG. 1a, is mechanically rigidly or mechanically fixedly coupled to the first guide plate 130 via four spacer bolts 140. Further, the first guide plate 130 has a flange 160 which is fixedly arranged, for example, along an axis of rotation 150 of a rotational movement that can be transmitted into the tuned mass vibration damper 100. The flange 160 is constructed as a flange structure of the first guide plate 130 and has, in addition to a corresponding arrangement by which the above-described axial offset along the axis of rotation 150 is achieved, a plurality of bore holes 170 by which the flange 160 can be mechanically connected to another assembly so as to be fixed with respect to rotation relative to it.

The first guide plate 130, the second guide plate and the damper masses 110 have guide paths 180 on which the rollers 120 roll. The guide paths 180 of the first guide plate 130 correspond to those of the corresponding guide paths 180 of the damper masses 110. Therefore, only the guide paths of the damper masses 110 are shown in FIG. 1a. In order to allow the center of gravity of the damper masses 110 to be displaced along a radial direction running perpendicular to the axis of rotation 150, for example, during a deflection of the damper masses 110, the guide paths 180 of the damper masses 110 have guide paths that are substantially mirror-symmetrical to those of the first guide plate 130 and the second guide plate which is not shown. Of course, the guide paths 180 can also correspond to one another in a different shape such that the above-described displacement of the center of gravity can be realized during a corresponding deflection of the damper masses 110.

FIG. 1a shows a situation during normal operation of a vehicle in which the above-described noises can occur as a result of the damper masses 110 striking the ends of the guide paths 180. Circles 190 show areas in which a corresponding collision between the rollers 120 and the ends of the guide paths 180 takes place. This may be the case when as a result of the occurring vibrations the damper masses 110 are excited to or tend to have an oscillation amplitude that is greater than that permitted by the design maximum oscillation angle.

Regardless of this, a corresponding noise generation can also occur during normal operation when a centrifugal force 200, a weight force 210 that both act on the same damper mass 110 is greater in magnitude.

FIG. 1b shows the conventional tuned mass vibration damper 100 from FIG. 1a in a different operating situation. In the situation shown in FIG. 1b, the centrifugal forces 200 acting on the damper masses 110 are smaller in magnitude than the weight forces 210 acting on them. A situation of this kind can occur, for example, when the speed of the transmission input shaft gradually drops to zero after switching off the engine. As the speed of the transmission input shaft decreases, the centrifugal force 200 acting on the damper masses 110 also decreases in magnitude in a corresponding manner.

In this way, it can happen that the damper masses 110 are not subject to any radial constraints or constraining forces or, if so, at least not as extensively, so that in this operating state or operating point, owing to their own weight forces 210, the damper masses can slide along the guide paths 180, also referred to as paths, or can drop. Depending on the rotational position of the tuned mass vibration damper 100, the damper masses 110 can strike an end of a guide path 180, as is illustrated, for example, by circle 190-1, or directly collide with one another as is illustrated by circle 190-2 in FIG. 1d. This can cause a rattling, audibly metallic noise which is noticeable both inside and outside of the vehicle and which is often found annoying.

For better clarity, the second guide component part, also referred to as right-hand path plate, is not shown in the diagrams in FIGS. 1a and 1b.

In order to reduce the noises occurring during operation or during different operating states, embodiment examples of tuned mass vibration dampers have a dimensionally stable spacer component part that is rotatable relative to the at least one guide component part that is included in a tuned mass vibration damper according to an embodiment example and which is in a positive engagement connection with clearance with at least three damper masses of the tuned mass vibration damper. The connections are configured in precisely such a way that, starting from a center position of the relevant damper masses with respect to the spacer component part, during an oscillation of one of the two damper masses, which overcomes a clearance in the connections of two of the damper masses with respect to the spacer component part, the spacer component part is rotated along a circumferential direction in such a way that it drives the other damper mass of the two damper masses along the circumferential direction.

The spacer component part accordingly couples the individual damper masses to one another, but is constructed as essentially one component part. Accordingly, the spacer component part can be implemented as a ring, for example, and simultaneously serves as a spacer. For this reason, the spacer component part is also referred to as spacer ring, guide ring or stop ring is some embodiment examples. The embodiment example which will now be described realizes the positive engagement connection with clearance by a tongue-and-groove joint in which the spacer component part is accordingly implemented as a tongue-and-groove ring. In this way, the damper masses can be prevented from striking the corresponding rolling bodies implemented as rollers, for example, without preventing the rollers themselves from striking the ends of the guide paths, also referred to as path curves. Accordingly, a noise can be reduced when, for example, the spacer component part has, or is made from, plastic in the relevant collision areas. The noise damping or noise reduction can result, for example, in that the force or impulse force decreases with the rate of change in momentum ($F = dp/dt = m\, dv/dt$).

It may be advisable or beneficial to use plastic because a time (t) for a change in velocity (dv) tends to be shorter when the component part has a high rigidity. However, the rigidity of a component part often depends on the elastic modulus which is typically substantially lower in plastics than, for example, in steel. For this reason, the use of a corresponding material with a lower elastic modulus than a metallic material, for example, steel, can be relevant. Accordingly, plastic, e.g., a thermosetting plastic, thermoplastic or an elastomer, i.e., for example, a rubber or a rubberized component part, can be used.

Figure 2:
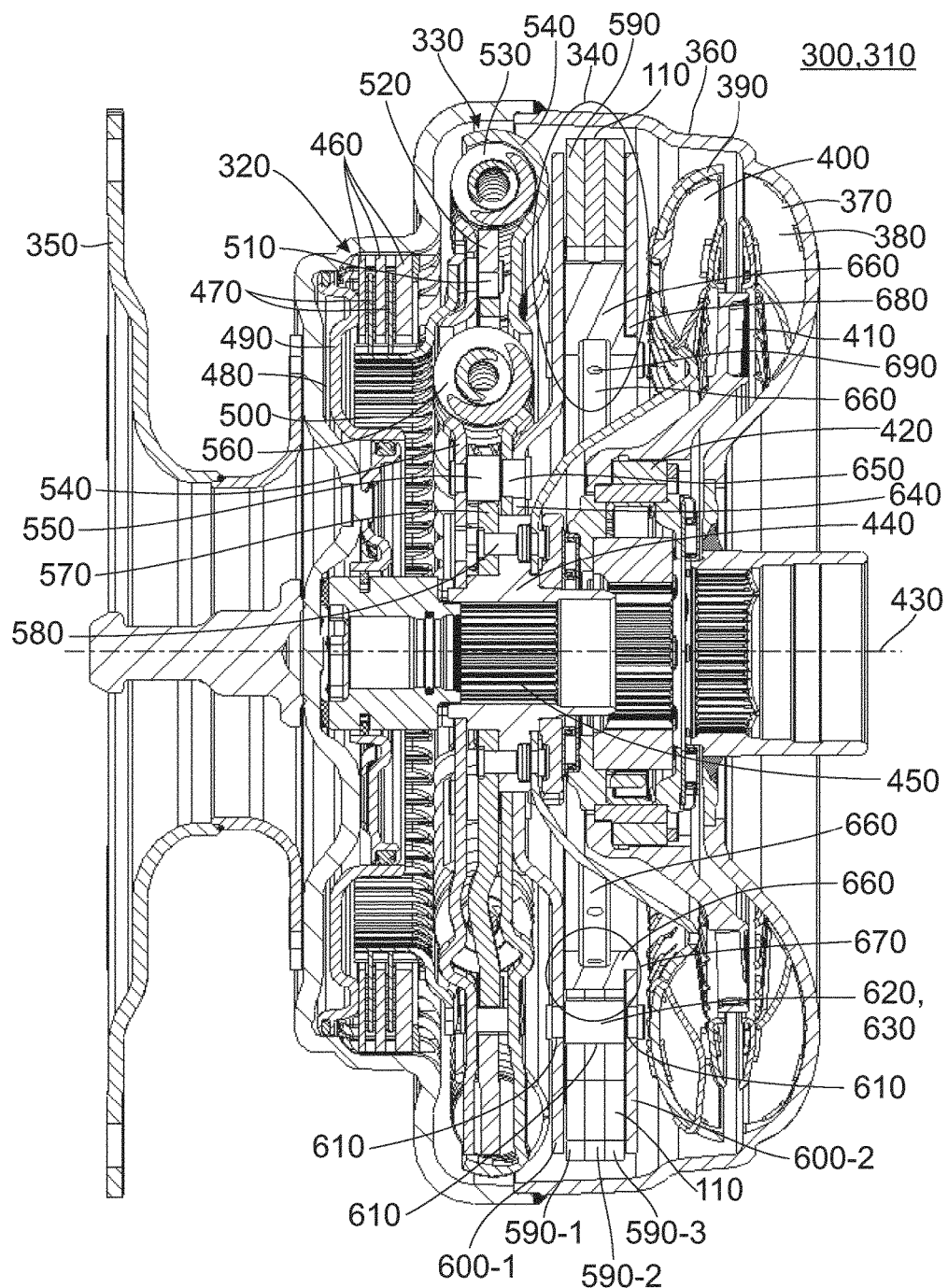
FIG. 2 is a cross-sectional view through a hydrodynamic starting element with a tuned mass vibration damper.

Beyond this, a plastic can also have a material-dependent damping which can have an additional noise-reducing effect. Likewise, plastics often have a lower (specific) gravity than many other materials, for example, steel. As will be explained more fully in the following, the spacer component part moves substantially along the circumferential direction. Accordingly, a reduction in inertia or a reduction in the moment of inertia resisting the movement can be achieved through a reduction in mass. Accordingly, the inertia of a spacer component part made of plastic can be lower, for example, than that of a corresponding component part made of steel as a result of a suitably adept choice of material and/or a suitably adept choice of geometry. Notably in the interest of reducing the total mass of a vehicle of this kind, it can be possible optionally to realize only an insubstantial increase, if any, in the own weight of a corresponding starting element with a tuned mass vibration damper according to an embodiment example, i.e., for example, a hydrodynamic converter. FIG. 2 shows a cross-sectional view through a starting element 300, to be precise, a hydrodynamic converter 310 with a lockup clutch 320, a two-stage vibration damper 330 and a tuned mass vibration damper 340 according to an embodiment example. The tuned mass vibration damper 340 is implemented in this case as a speed-adaptive damper.

The starting element 300 comprises a flexible connection plate 350 which is the input component part of the starting element 300 and can be connected to an engine output shaft, i.e., for example, the crankshaft of an internal combustion engine, so as to be fixed with respect to rotation relative to it. The flexible connection plate 350 can decouple tumbling vibrations, for example, and other mechanical vibrations from a housing 360 of the starting element 300. The flexible connection plate 350 can also bridge an axial installation space between the starting element 300 and the internal combustion engine, not shown in FIG. 2, for example, depending on the internal combustion engine that is used.

The flexible connection plate 350 is connected to the housing 360 so as to be fixed with respect to rotation relative to it, the rotational movement of the engine accordingly being transmitted thereto. The hydrodynamic components of the starting element 300 comprise an impeller structure 370 having a plurality of impeller blades 380 mechanically connected to the housing 360 so as to be fixed with respect to rotation relative to it. As a result of the rotational movement of the housing 360, a hydrodynamic medium converter oil, located in the interior of the housing 360 is accelerated and is accelerated toward a turbine wheel 390 comprising a plurality of turbine blades 400 which are connected to the turbine wheel 390, likewise so as to be fixed with respect to rotation relative to it, for example, via a positive engagement connection by crimping. The hydrodynamic components further comprise a stator wheel 410 which is mounted via a freewheel 420 so as to be rotatable around an axis of rotation 430 of the rotational movement which can be transmitted into the starting element 300. The freewheel 420 allows a free movement of the stator wheel 410 in one rotating direction and blocks the freewheel 420 in the opposite direction.

The turbine wheel 390 is connected to an output hub 440 via one or more rivet connections. This output hub 440 is the output component part of the starting element 300 and can be coupled via an internal toothing 450 to a transmission input shaft, not shown in FIG. 2, so as to be fixed with respect to rotation relative to it.

Accordingly, via the hydrodynamic couplings mentioned above, the torque can be transmitted from the flexible connection plate 350 and the fluid flow of hydrodynamic medium brought about by the impeller wheel 370 to the output hub 440 and, therefore, to the output component part of the starting element 300. However, in order to bridge the hydrodynamic converter components in the interest of increasing the efficiency of the starting element 300, this starting element 300 further has a lockup clutch 320 by which, in the present embodiment example of a starting element 300, a plurality of outer plates 460 which are in turn connected to the housing 360 so as to be fixed with respect to rotation relative to it can be brought into frictionally engaging contact with corresponding inner plates 470 in that a piston volume 480 is acted upon by pressure and accordingly presses a piston 490 against the outer plates 460. The inner plates 470 are in turn coupled to an inner plate support 500 so as to be fixed with respect to rotation relative to it. However, in order to engage and disengage, i.e., create or cancel, the frictionally engaging contact, these inner plates 470 are arranged so as to be displaceable at least partially along the axis of rotation 430, i.e., along the axial direction.

The inner plate support 500 is coupled to a two-stage vibration damper 330. Accordingly, the inner plate support 500 is coupled via a spacer rivet 510 to an outer central disk 520 so as to be fixed with respect to rotation relative to it, this outer central disk 520 contacting the first spring element 530. The outer central disk 520 is accordingly the input component part of the vibration damper 330.

Further, the first spring elements 530 make contact with two cover plates 540 adjoining the first spring elements 530 on both sides along the axis of rotation 430. The two cover plates 540 are coupled to one another and to the torsional vibration damper 340 according to an embodiment example via a further spacer rivet 550. Further, the two cover plates 540 abut second spring elements 560 which, further, contact an inner central disk 570 which is likewise connected via a rivet 580 to the output hub 440 so as to be fixed with respect to rotation relative to it.

The first spring elements 530 make up the first stage of the two-stage vibration damper 330, and the second spring elements 560 make up the second stage of the two-stage vibration damper 330. The torsional vibration damper 340 according to an embodiment example is mechanically coupled to the cover plates 540 serving as central mass so as to be fixed with respect to rotation relative to them.

The tuned mass vibration damper 340 according to one embodiment example has a plurality of, typically at least three, damper masses 110 which, as was already mentioned, are configured in precisely such a way that, depending on the rotational movement introduced into the tuned mass vibration damper 340, they can carry out an oscillation in order to damp a vibration component of the tuned mass vibration damper 340 that can result, for example, from a rotational irregularity. The damper masses 110 are arranged so as to be offset along the circumferential direction, i.e., perpendicular to the axis of rotation 430 of the rotational movement. In the embodiment example shown here, they comprise a plurality of parts, more precisely, three parts. Accordingly, in this case each of the damper masses 110 comprises three partial damper masses 590 which are arranged so as to be offset relative to one another along the axis of rotation 430. An exemplary one of these partial damper masses is designated in the upper half of FIG. 2 by reference numeral 590, and the corresponding partial damper masses 590 of the damper mass 110 are designated by individual reference numerals 590-1, 590-2 and 590-3 in the lower half of FIG. 2. The partial damper masses 590 are not rigidly or fixedly mechanically connected to one another and can therefore be regarded between each other as masses 110.

More exactly, in the embodiment example shown here, the tuned mass vibration damper 340 has four damper masses 110 which are distributed substantially equidistant along the circumferential direction and which comprise, respectively, three partial damper masses 590 which are not coupled to one another. Of course, other quantities of damper masses 110 and/or differently constructed damper masses 110 can be used in other embodiment examples. However, in this case a tuned mass vibration damper 340 according to an embodiment example has at least three damper masses 110. The individual damper masses 110 which—as was already mentioned—are distributed along the circumferential direction can be equally spaced but can also deviate from this arrangement.

They can also be constructed differently, i.e., for example, formed of one part. Also, they can have a plurality of partial damper masses 590, although the three-part configuration shown in FIG. 2 is by no means compulsory. Either fewer or more partial damper masses 590 can be used within the framework of a damper mass 110. They can also be fixedly or rigidly connected to one another insofar as they are implemented at all.

As is shown in FIG. 2, the tuned mass vibration damper 340 further has a first guide component part 600-1 and a second guide component part 600-2, which latter is arranged so as to be offset along the axis of rotation 430 with respect to the first guide component part 600-1. The guide component parts 600 are configured to movably guide the damper masses 110 in such a way that they are not only arranged in an offset manner along the circumferential direction but can also carry out the corresponding oscillations to damp a vibration component of a rotational movement.

To this end, the tuned mass vibration damper 340 shown here has at both guide component parts 600 corresponding guide paths 610 which, together with corresponding guide paths 610 in the damper masses 110, are constructed such that one or more rolling bodies 620 can roll along them and accordingly can impart the corresponding guiding of the damper masses 110 to the guide component parts 600. The rolling bodies 620 are constructed as stepped rollers 630 in this case. The guide paths 610 of the damper masses 110 communicate with the guide paths 610 of the guide component parts 600 in such a way that a radial shifting of the center of gravity of the relevant damper mass 110 takes place when the damper masses 110 are deflected from their respective center positions. They can be constructed in a substantially mirror-imaged manner, for example, as will be explained more fully in the following.

Of course, quantities of guide component parts 600 other than the two guide component parts 600-1, 600-2 shown in FIG. 2 can be implemented in other embodiment examples. For example, it can also be possible to correspondingly guide the at least three damper masses 110 with only one individual guide component part 600. Depending on the specific embodiment, it may be advisable in this case to arrange the damper masses 110 along the axis of rotation 430 on both sides of the guide component part 600. Beyond this, however, it is also possible to implement more than two guide component parts 600.

In the embodiment example shown here, the guide component parts 600 are made of a plate-like material, typically from steel plate, for which reason they are also referred to as guide plates or—in view of the guide paths 610 integrated therein—as path plates. They are implemented in this case so as to be substantially disk-shaped or annular. The first guide component part 600-1 has a flange structure 640 with a plurality of bore holes 650 by which the first guide component part 600-1 is connected to the cover plates 540 of the vibration damper 330.

The tuned mass vibration damper 340 further comprises a dimensionally stable spacer component part 660 which is configured to be rotatable around the axis of rotation 430 of the rotational movement. In this case, the spacer component part 660 is in a positive engagement connection with clearance with the damper masses 110, this positive engagement connection with clearance being configured in precisely such a way that, starting from a center position of the damper masses 110 with respect to the spacer component part 660, during an oscillation which overcomes a clearance of the relevant connections of two of the damper masses 110 with respect to the spacer component part 660, the spacer component part 660 is rotated along the circumferential direction in precisely such a way that it drives the other damper mass 110 of the two damper masses 110 along the circumferential direction. Accordingly, the damper masses 110 are guided substantially parallely by the spacer component part 660 through the corresponding clearance.

In the embodiment example shown here, the corresponding connection is realized through a tongue-and-groove connection 670 such as is indicated in the corresponding circle 670 in FIG. 2. For this reason, the spacer component part 660 is also referred to as tongue-and-groove ring, since it is also substantially annular apart from the corresponding tongue structures. The spacer component part 660 has a circumferential shoulder 680 by which the spacer component part 660 is guided through the second guide component part 600-2 in radial direction as well as in axial direction, i.e., along the axis of rotation 430.

The spacer component part 660 further has a plurality of holes or bore holes 690 which can serve to reduce weight, for example, but also for inflow and outflow of hydraulic medium in a region between the spacer component part 660 and the damper masses 110 so as to counteract a damping of the oscillation of the damper masses 110 brought about by the hydraulic medium.

Of course, spacer component parts 660 can be constructed differently in other embodiment examples as will be shown in the following description. For example, it is in no way a compulsory step to provide bore holes 690.

As will be shown in the following description, the damper masses 110 are held in position relative to one another by tongues based on the principle of a tongue-and groove joint at the spacer component part 660 which is formed as a ring. In this respect, an angular spacing of the damper masses 110 relative to one another referring to the axis of rotation 430 essentially does not change. Therefore, the damper masses 110 can be prevented from striking one another in many operating situations.

In this embodiment example, as will be shown in the subsequent FIGS. 3*a* and 3*b*, an individual damper mass 110 can also not strike the stop as a result of the gravitational force acting on it, for example, when the engine is switched off or rotates slowly for some other reasons. Owing to the substantially parallel guiding of the damper masses 110 described above, this can substantially only take place simultaneously for all of the damper masses 110 which are coupled to the spacer component part 660, i.e., all of the damper masses 110 in the present embodiment example.

However, owing to the construction selected in this case, the spacer component part 660 itself acts as a stop and not the end of the relevant guide paths, i.e. the corresponding path curves, and the damper masses 110 are mutually supported along the circumferential direction. Therefore, in the present embodiment example, a movement of the damper masses 110 along the radial direction and/or a maximum oscillation angle of the damper masses 110 are/is limited in that the spacer component part 660 comes in contact with the damper masses 110 outside of the positive engagement connection with clearance. More precisely, the spacer component part 660 is formed as an inner distance ring so that in the case of at least one of the damper masses 110 that are coupled to one another the radially inwardly directed movement is intercepted past a predetermined distance. Because of the parallel guiding, all of the damper masses 110 which are suitably connected to the spacer component part 660 are prevented from falling down in an uncontrolled manner.

FIG. 3*a* shows a cross-sectional view through the tuned mass vibration damper 340, while FIG. 3*b* shows a fragmentary elevational view of the tuned mass vibration damper 340.

FIG. 3*a* again illustrates the internal construction of the damper masses 110 with their three partial damper masses 590-1, 590-2, 590-3 and associated paths 610 of the damper mass 110 and of the two guide component parts 600-1, 600-2. Also shown again is the radial and axial support implemented by the shoulder 680. The tongue-and-groove connection 670 is also shown again.

The first guide component part 600-1 with flange structure 640 and bore holes 650 thereof is shown in the fragmentary elevational view in FIG. 3*b*. Also shown is the second guide component part 600-2 which is offset in parallel along the axis of rotation 430 and connected to the first guide component part 600-1 via spacer bolts 700.

As has already been mentioned, the guide component parts 600 also have guide paths 610 as do the damper masses 110. The geometries and arrangements of the guide paths 610 of the guide component parts 600 and damper masses 110 correspond to one another in precisely such a way that when the damper masses 110 are deflected from their center position, the center of gravity of the relevant damper mass 110 is displaced along the radial direction. To this end, the guide paths 610 have a curved portion 710 which can be elliptical segment-shaped or circular segment-shaped, for example. A side opposite the curved portion 710 in question has a corresponding indentation such that the corresponding recess forming the guide paths 610 in damper masses 110 and guide component parts 600 has a substantially kidney-shaped structure or shape in the embodiment example shown here. For this reason, the path 610 is also referred to as "kidney." However, this indentation can also be omitted. The respective recesses forming the guide paths 610 can also be shaped differently provided that they correspond to one another in such a way, for example, that the above-described change in radial spacing of the centers of gravity of the relevant damper mass 110 comes about when the damper masses 110 are shifted or deflected from their center positions.

As is shown, for example, by a comparison of the corresponding guide path 610 of damper mass 110-3 and first guide component part 600-1 which is likewise associated with damper mass 110-3, the guide paths 610 are very similar to one another with respect to geometry but are arranged in a mirror-inverted manner. Accordingly, the above-described shifting of the center of gravity of the damper masses 110 can be realized by a corresponding rolling of rolling bodies 620.

The tongue-and-groove connection 670, as shown in FIGS. 3*a* and 3*b*, is an example of a positive engagement connection with clearance. The spacer component part 660 in the embodiment example shown here has a connection structure 720, while the damper mass 110 has a corresponding connection recess 730. The connection structure 720 and the connection recess 730 are configured precisely in such a way that the connection structure 720 can engage in the connection recess 730 so as to allow the above-described guiding or driving of the damper mass 110 along the circumferential direction on the one hand but, on the other hand, to allow a radial movement of the connection structure 720 relative to the connection recess 730 or, additionally or alternatively, a rotation of the connection structure 720 relative to the connection recess 730. Since the latter are connected to the spacer component part 660 or damper mass 110 or formed integral therewith, there also results in a corresponding manner a radial movability or rotatability of the relevant component parts with respect to one another. In this case, the connection structure 720 which is formed as tongue 740 has a short distance 760-1, 760-2 from the connection recess 730 which is formed as groove 750 in the diagram, this distance 760-1, 760-2 showing the clearance in the connection.

In this case, the spacer component part 660 can move along the circumferential direction but is supported and guided radially by the shoulder 680 at the second guide component part 600-2. Further, at a radially inwardly located side, the damper masses 110 have contact regions 770-1, 770-2 which are arranged symmetric to the connection recess 730 in each instance and are concave and curved so as to allow the most extensive facial contact with the spacer component part 660 in case they impinge on it. When the spacer component part 660 is substantially a ring or an annular structure as is shown by way of example in FIG. 3*b*, the contact regions 770 can be circular segment-shaped and their radius corresponds to the radius of the spacer component part in the region of the stop at which the damper masses 110 make contact with the spacer component part. Of course, other configurations of the contact regions 770 can also be implemented in other embodiment examples if the spacer component part 660 diverges from an annular shape in other ways. For example, the spacer component part 660 and contact regions 770 can also be straight in the relevant regions or can have a different shape.

When the spacer component part 660 is made of plastic then as a result of its mechanical characteristics, e.g., the elastic modulus or its damping effect, an area pressure in the area of the contact region 770 and, therefore, noise and/or possible wear can optionally be reduced when the corresponding surface area of the contact region 770 is increased.

Figure 4A:
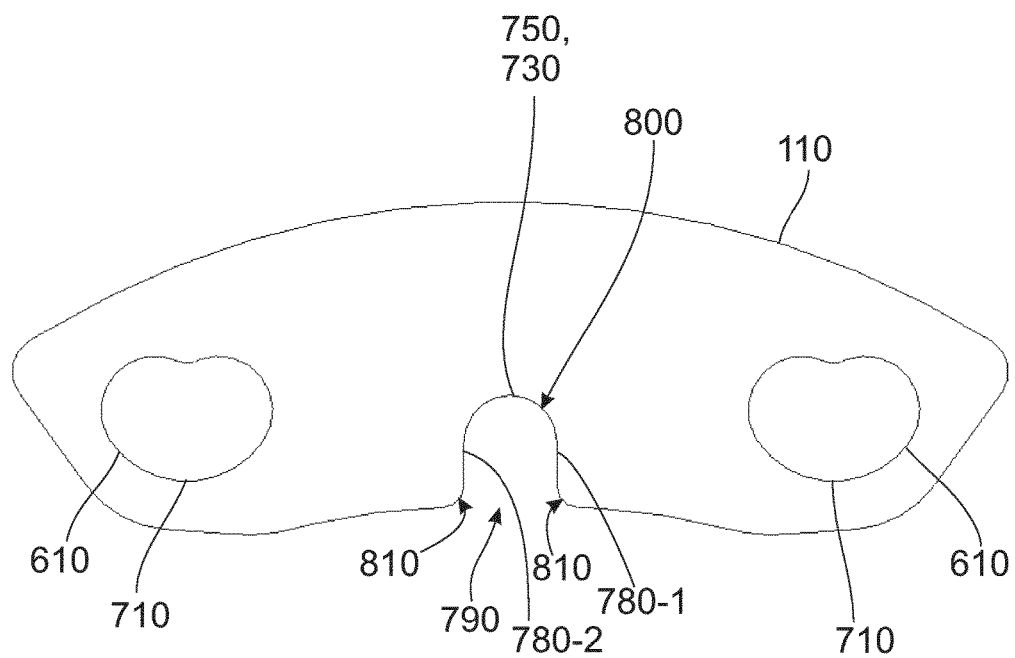
FIG. 4a is an embodiment of a damper mass of a tuned mass vibration damper.

FIG. 4a shows a side view of a damper mass 110 which shows, for example, the recesses forming the guide paths 610 with curved portions 710. Moreover, FIG. 4a also shows the groove 750, also referred to as guide groove, which provides the connection recess 730 used in this case. In this embodiment example, the connection recess 730 has two opposed straight portions 780-1 and 780-2 in which the tongue 740, not shown in FIG. 4a, can move rotatably and radially by its rounded portion, while it drives 110 along the circumferential direction when the clearance in the relevant tongue-and-groove connection 670 is overcome. In other words, the connection recess 730 together with the connection structure 720 can fix the damper mass 110 in circumferential direction. The straight portions 780 are arranged between an open end 790 and a closed end 800 of the connection recess 730. Further, in the embodiment example shown here, they extend substantially in parallel, but can also be constructed, for example, so as to converge in direction of the closed end 800. They can also be shaped so as to diverge toward the closed end 800.

The connection recess 730 further has in the region of the open end 790 at both sides a rounded portion 810 with a radius which is provided for preventing a collision or point contact with the spacer component part 660.

Figure 4B:
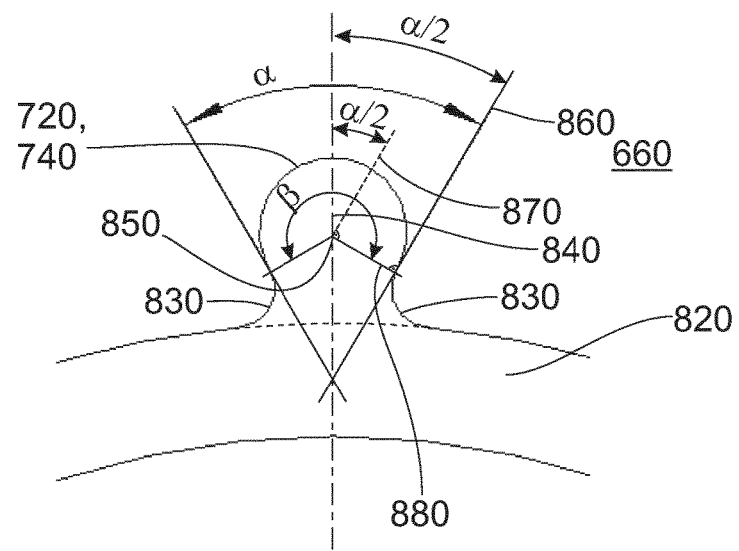
FIG. 4b is a cross-sectional view of a connection structure of a spacer component part of a tuned mass vibration damper.

To illustrate this in more detail, FIG. 4b shows a side view of the spacer component part 660 with the connection structure 720 constructed as tongue 740. This connection structure 720 has corresponding rounded portions 830 at a transition to a purely annular portion 820 of the spacer component part 660, these rounded portions 830 being integrated in this region to reduce mechanical stressing of the material of the spacer component part 660. The rounded portions 810 with their radii of the damper mass 110 are adapted precisely to the radii of the rounded portions 830 such that the damper masses 110 precisely do not make contact with the rounded portions 830, which could result in point contact or line contact with high area pressure. In this way, not only could the spacer component part 660 and damper mass 110 be subjected to considerable mechanical loading, but there could also be an impairment of the free swinging of the damper mass 110.

Further, FIG. 4b shows that the connection structure 720 has at least partially a circular and/or elliptical outer contour perpendicular to the axis of rotation 430, not shown in FIG. 4b, which extends over a predetermined aperture angle $\alpha$ or greater than 0°. Aperture angle $\alpha$ is divided into two symmetrical half-angles $\alpha/2$ relative to the radial direction 840. Starting from a center point 850, the circular or elliptical outer contour extends over an angle $\beta$ which in turn divides into two symmetrical half-angles $\beta/2$ with respect to the radial direction 840. Starting from a tangent 860 to the circular or elliptical outer contour of the connection structure 720, a parallel offset of this tangent 860 through center point 850 gives a line 870 that also forms angle $\alpha/2$ with the radial direction 840. Since the tangent 860 extends perpendicular to a radius 880 of the circular or elliptical outer contour, this is also true for line 870 so that the extension angle $\beta$ and its half-angle $\beta/2$ of the circular or elliptical outer contour in relation to the aperture angle $\alpha$ and its half-angle $\alpha/2$, respectively, gives the relationship $\beta/2=\alpha/2+90°$. In a corresponding manner, extension angle $\beta$ in relation to aperture angle $\alpha$ gives the relationship $\beta=\alpha+180°$.

If the connection recess 730 is configured to receive the connection structure 720 in such a way that it permits a rotation of the relevant damper mass 110 around aperture angle $\alpha$, it may be useful in case of the parallel configuration of straight portions 780 shown in FIG. 4 to configure the relevant circular or elliptical outer contour with an extension angle $\beta=\alpha+180°$ or more. Due to the fact that, beyond this, the connection recess 730 has the straight portions 780, the connection structure 720 can further allow a movement along the radial direction 840 relative to the connection recess 730. In this case, angle $\alpha$ should be adapted to the possible rotations of the damper masses 110 relative to the spacer component part 660 to prevent the occurrence of constraining forces as far as possible. The situation corresponds approximately to that of a round pin in a guide of parallel surfaces.

Of course, it may be advisable at this point to adapt the aperture angle or angle $\alpha$ to the possible rotations of the damper mass 110 relative to the spacer component part 660.

As has been shown in FIGS. 4a and 4b, the surfaces of the connection recess 730, also referred to as cutout, in the damper masses 110 are oriented parallel to one another. Accordingly, the rounded portion of the connection structure 720, i.e., the rounded portion of the tongue 740 of the spacer component part 660 (tongue-and-groove system), can move between these parallel surfaces 780.

The connection recesses 730 in the damper masses are formed radially inside. Accordingly, while the mass of the individual damper masses 110 can decrease compared to other possible implementations, a quantity of provided cutouts can also be reduced if necessary. Corresponding cutouts can also optionally be located farther radially outside, which could lead to a further reduction in mass or a reduced moment of inertia.

Figure 5:
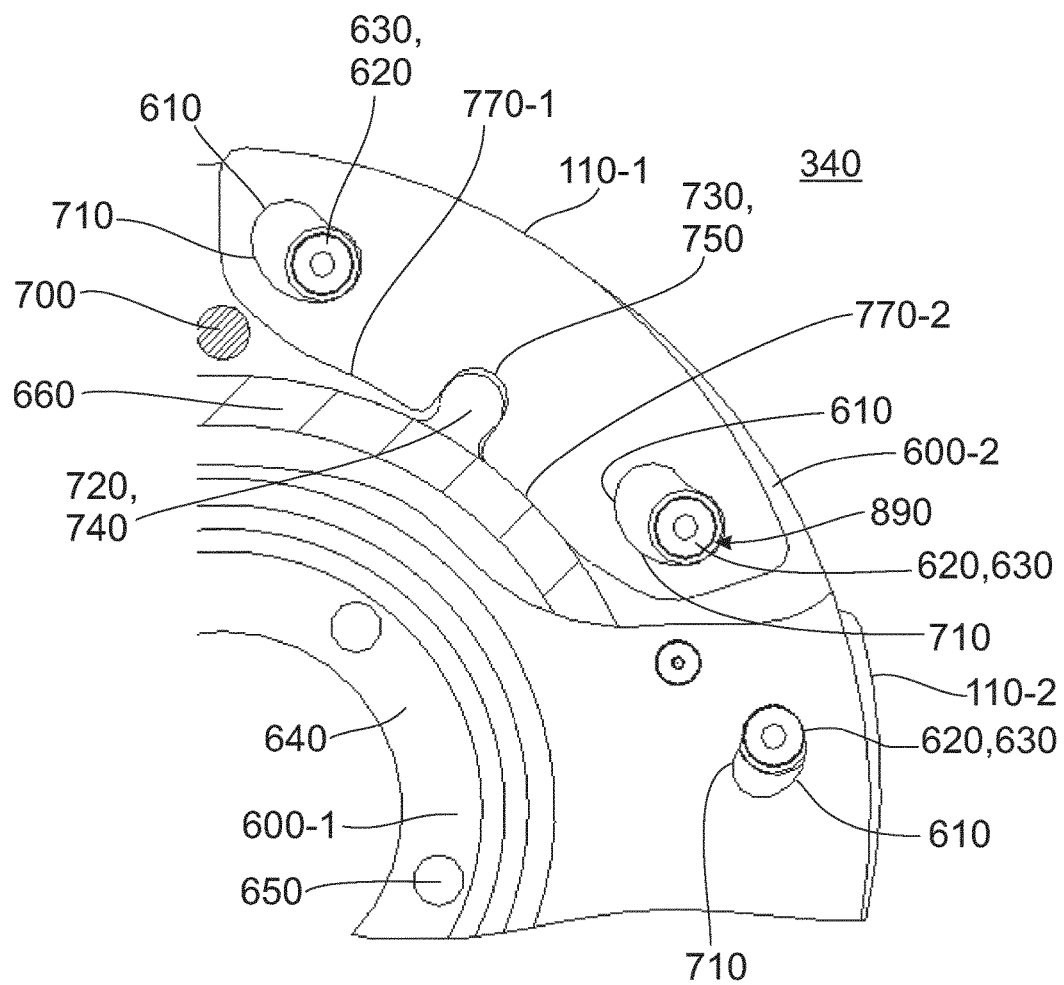
FIG. 5 is a fragmentary elevational view of a tuned mass vibration damper in a condition of maximum swivel of the damper mass.

FIG. 5 shows an enlarged view from FIG. 3b in which the tuned mass vibration damper is in an end stop position. To be more precise, FIG. 5 shows how the damper mass 110-1 strikes the spacer component part 660, which may be made of plastic, before the rolling bodies 620 strike the relevant end regions or ends 890 of the guide path 610. In other words, the damper mass 110-1 strikes the spacer component part 660, or the spacer component part 660 made from plastic, before the rolling bodies 620 strike the path ends 890 (end of path curves) of the damper mass 110 or relevant guide component parts 600. In this case, the damper masses are held by the tongue-and-groove system at a virtually or substantially constant angle relative to one another in circumferential direction.

Figure 6:
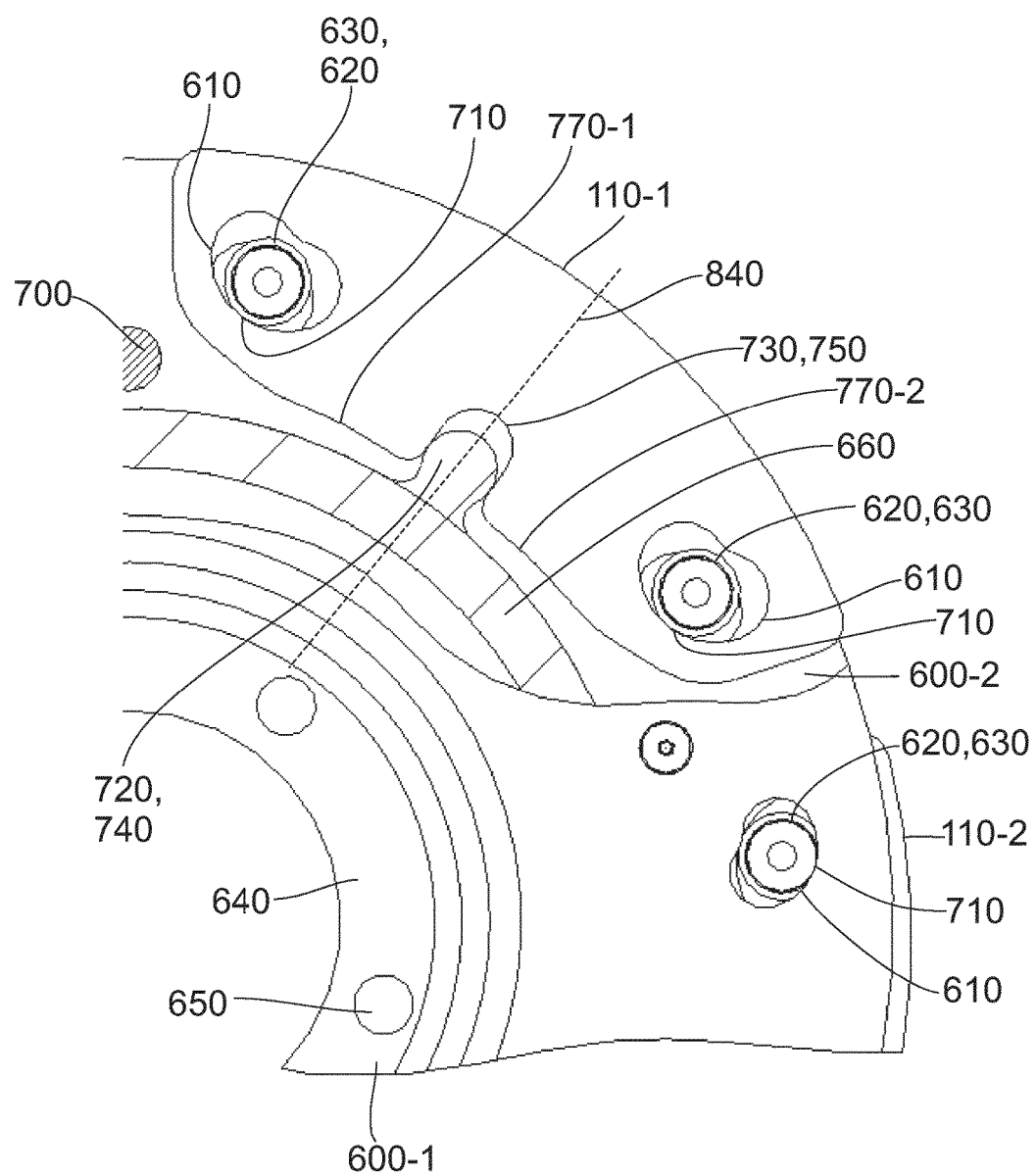
FIG. 6 is a fragmentary elevational view of the tuned mass vibration damper from FIG. 5 with the damper mass in a center position.

FIG. 6 shows a view of the tuned mass vibration damper 340 according to an embodiment example similar to that shown in FIG. 5, but in which the damper masses 110 are in a neutral position or center position. As in other embodiment examples of a tuned mass vibration damper 340, the center position allows a deflection of the damper mass 110 by the same distance or the same angle in both directions along the circumferential direction. Due to the fact that both the connection structure 720 and the damper mass 110 with its connection recess 730 are constructed so as to be symmetrical in this case, the orientation of the damper mass 110 and, therefore, also the connection recess 730 corresponds precisely to an orientation such that the radial direction 840 lies in the above-mentioned plane of symmetry of the damper mass 110 and connection structure 720 which coincide in this case.

Figure 7:
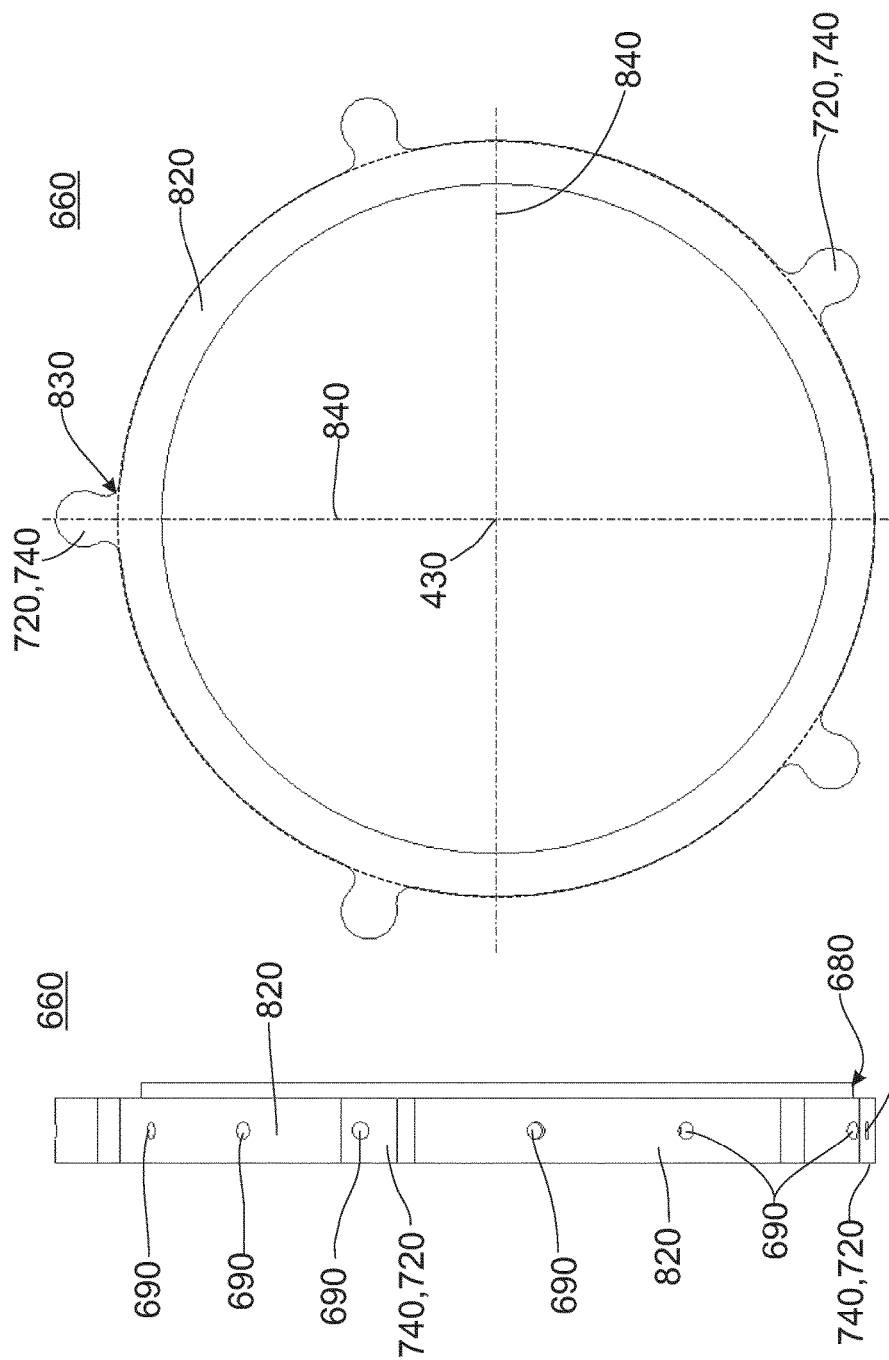

FIG. 7a shows a side view of the spacer component part 660, while FIG. 7b shows a top view in a plane perpendicular to the axis of rotation 430. FIG. 7a again shows shoulder 680 by which the radial guiding, and possibly also axial guiding, is carried out at the second guide component part 600-2, also referred to as right-hand speed-adaptive damper path plate.

FIG. 7a further shows a plurality of bore holes 690 which can be introduced in a lateral surface of the spacer component part 660, i.e., in the annular portion 820, but also in the connection structures 720, i.e., the tongues 740. However, these bore holes 690 are optional components which can be implemented in another shape or not at all.

The bore holes 690 in the region of the connection structures 720 are directed substantially radially inward and are provided so that the hydraulic medium, i.e., for example, the hydraulic medium which is contained in the interior of the starting element 300 or which can be introduced into the interior of the starting element 300, can flow out or flow in on the radially inner side during the movement of the damper masses 110 when the damper masses 110 are deflected in circumferential direction and, in so doing, also move in radial direction due to the shape of the guide paths 610. Accordingly, owing to a substantially disk-shaped configuration of the guide component parts 600, the hydraulic medium is prevented from flowing in and out through the latter, which can also be a deliberate step. Due to the fact that the guide component parts 600 are optionally used to close the lateral surfaces of the tuned mass vibration damper 340, it is possible to reduce a self-pumping effect brought about by the fact that the structures of the tuned mass vibration damper lead to a flow in circumferential direction in the hydraulic medium, which may be unwanted. The further bore holes 690 in the region of the annular portion 820 can serve, for example, to reduce weight.

FIG. 7b further shows that a total of five damper masses 110, also referred to as damper weights, are guided at a corresponding quantity of connection structures 720 by the spacer component part 660 in the embodiment example shown here. Accordingly, in this case the spacer component part 660 has a five-fold symmetry. FIG. 7b also shows the circular or elliptical outer contour perpendicular to the axis of rotation 430 with a radius such that the damper masses 110 can be rotated without generating constraining forces. Of course, the above-described aperture angle of the circular or elliptical outer contour should be adapted to the subsequent use and to the exact implementation of the tuned mass vibration damper 340 according to an embodiment example and further parameters. The connection structures 720 can accordingly carry out the positioning and guiding of the damper masses 110 relative to one another. FIG. 7b also shows the above-described rounded portions 830 in the region of the connection structures 720 for reducing stresses and other mechanical loads on the spacer component part 660.

Figure 8:
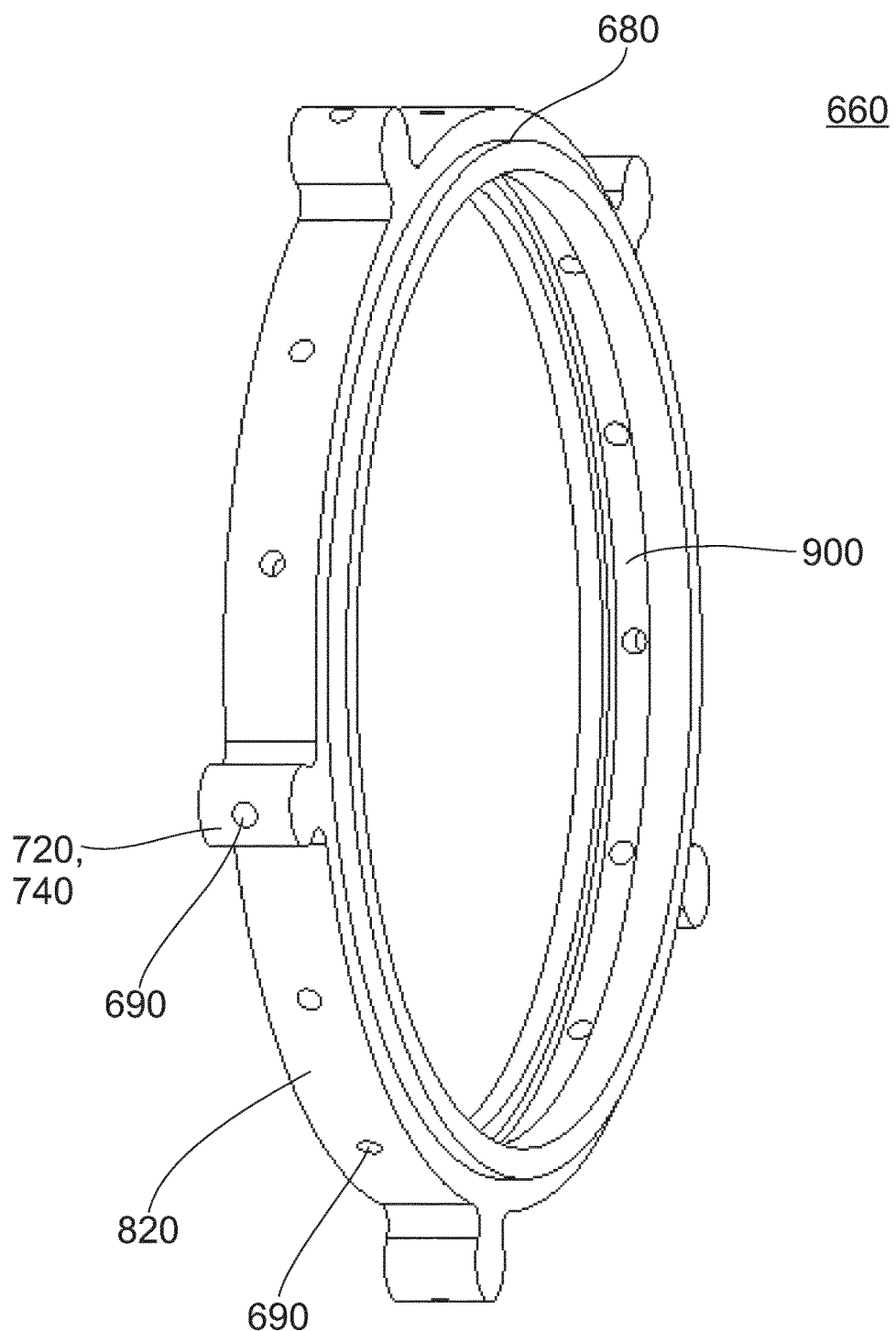
FIG. 8 is a perspective view of a spacer component part of a tuned mass vibration damper.

FIG. 8 shows a perspective view of a further spacer component part 660 such as can be used, for example, in connection with a tuned mass vibration damper 340. The embodiment of the spacer component part 660 shown here differs from the spacer component parts described above only through the addition of a groove 900 which is formed in circumferential direction of the rotational movement, completely surrounds the spacer component part 660 and is introduced in the region of the bore holes 690 in the annular portion 820. By providing groove 900, the weight of the spacer component part 660 can optionally be reduced compared to a version without such a groove 900. In other words, the groove 900 serves to reduce weight.

According to an embodiment example, through the use of a tuned mass vibration damper 340, a step for reducing the weight of a speed-adaptive damper, for example, in a torque converter can optionally also be realized at low speeds. The spacer component part 660 used for this purpose allows a substantially parallel guiding of the damper masses 110 with only a small number of additional component parts, in the present embodiment example substantially only with one additional component part, namely, the spacer component part 660. Moreover, because the spacer component part 660 is arranged radially inside as an inner spacer ring, the available installation space can also be utilized efficiently without significant deterioration in the performance of the vibration damper. Accordingly, a compromise between simplifying production, reducing noise during different operating states of the tuned mass vibration damper 340, a more efficient use of the available installation space and the actual damping of vibrations can be improved on the whole.

FIG. 9a shows a cross-sectional view through a further spacer component part 660 of a tuned mass vibration damper 340 according to an embodiment example. In this spacer component part 660, which is again constructed as an inner spacer ring with a corresponding shoulder 680 for radial and/or axial guidance thereof, the bore holes 690 for guiding the hydraulic medium and/or reducing weight and the groove 900 for reducing weight are again implemented. Thus FIG. 9a shows a bore hole 690, for example, which runs through the center of one of the connection structures 720, i.e., through a corresponding tongue 740.

To increase or enhance resistance to wear, however, the spacer component part 660 has a metal ring 910, in the region of the shoulder 680, for example, a cast metal ring 910, which is arranged in the area of contact with the second guide component part 600-2. The life of the spacer component part 660 can optionally be increased in this way.

In other words, the cast metal ring 910 serves to increase wear resistance at the point of contact of the radial and/or axial guiding of the spacer component part 660 and relevant second guide component part 600-2. The metal ring 910 can possibly be gas nitrocarburized for better adhesion to plastics. Of course, other metallic materials or other wear-reducing materials can also be used in the region of a structure of this type. Also, this need not be a ring that is specifically cast in a plastic. For example, the plastic may be applied by other joining techniques such as by an adhesive, for example. Also, the metal ring 910 need not be used as one component part, but rather may be implemented, for example, in a plurality of segments or in slotted form or as incompletely circumferential.

FIG. 9b shows a top view of a further spacer component part 660 which can be used, for example, in connection with a tuned mass vibration damper 340 according to an embodiment example. In this case, FIG. 9b shows two further optional implementation details which will be described in the following. As a first possible variation, the spacer component part 660 has cast metal plates 920 in the region of the connection structures 720, which again serve to increase resistance to wear. In contrast to the metal ring 910 shown in FIG. 9a, however, the metal plates 920 serve to increase wear resistance in the point of contact with groove 750, i.e., the connection recess 730, also referred to as guide groove. In other words, the spacer component part 660 has an optional possibility of cast metal plates 920 at the connection structures 720 for increasing wear resistance at the points of contact thereof with respect to the connection recesses 730 of the damper masses 110, not shown in FIG. 9b.

As a further optional possibility, FIG. 8b shows rubberized surfaces 930, shown in dashes in FIG. 9b, in the region of the annular portion at a lateral surface of the spacer component part 660 perpendicular to the radial directions 840. These can serve, for example, to improve damping between the spacer component part 660 and the damper masses 110 when they are arranged where the contact regions 770 of the damper masses 110 make contact with the spacer component part 660. The rubberized surfaces 930 can be implemented, for example, by a sprayed-on rubber or an EPDM (Ethylene Propylene Diene Monomer rubber) material. Of course, elastomers can optionally also be used at this location. In other words, the rubberized surfaces 930 enable improved damping of the damper masses 110 in the region of the annular portion 820 when hitting the spacer component part 660, i.e., when the damper masses 110 strike the ring in radial direction.

Figures 10A, 10B:
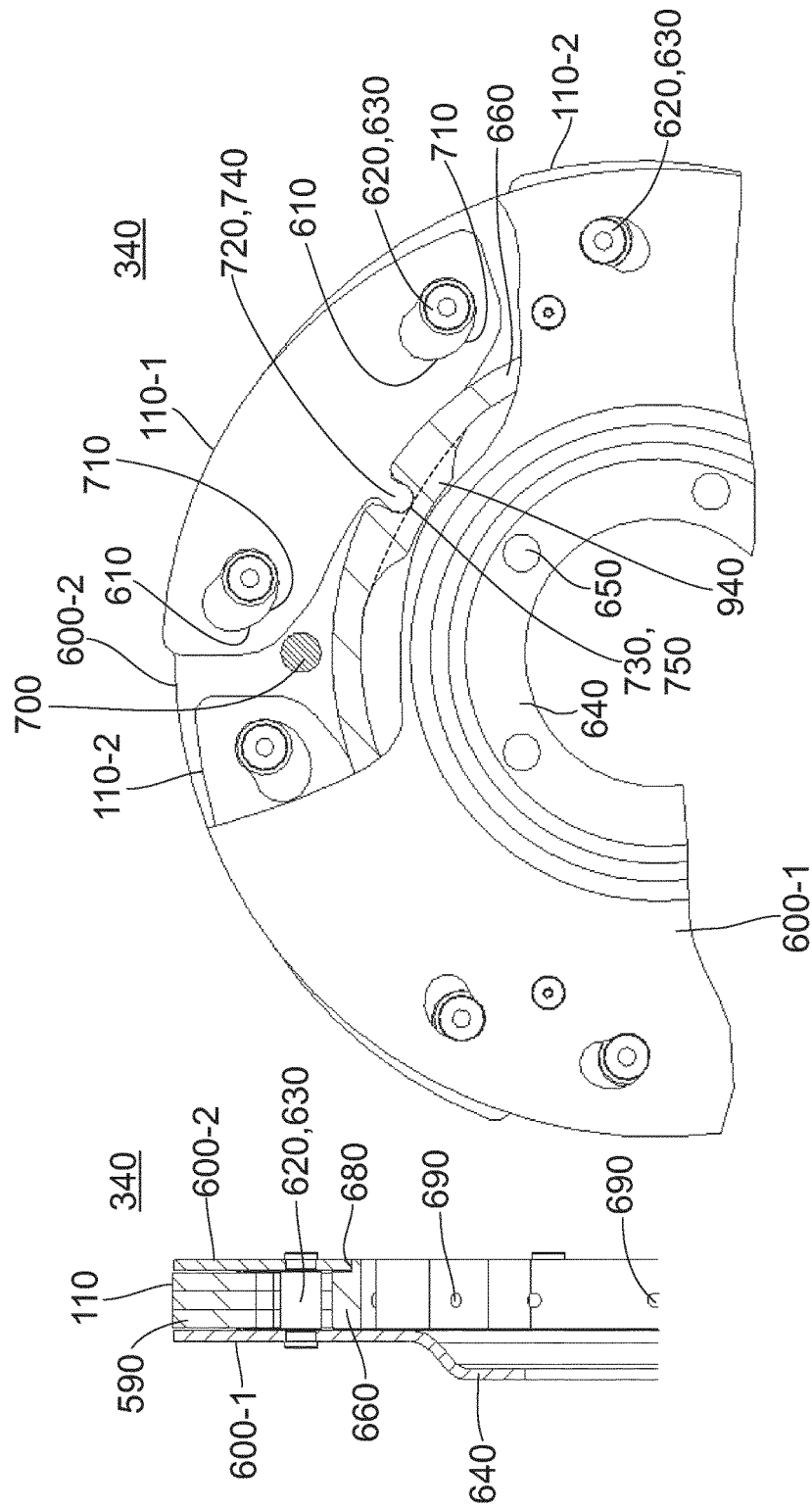

FIGS. 10a and 10b show a cross-sectional view through a tuned mass vibration damper 340 according to a further embodiment example which differs from the embodiment examples described above, particularly the embodiment example described with reference to FIGS. 3a and 3b, substantially with respect to the configuration of the spacer component part 660, connection structures 720 and connection recesses 730. In the embodiment example shown here, the connection structures 720 are no longer arranged at the spacer component part 660, but at damper masses 110. They are again implemented as tongues 740 as was described above. Correspondingly, the spacer component part 660 has corresponding connection recesses 730 in the form of corresponding grooves 750 which again allow a positive engagement connection with clearance.

In other words, the above-described tongue-and-groove combination can also be implemented inversely in this case, where the groove 750 is implemented in the spacer component part 660 constructed, for example, as plastic ring, and the tongue 740 is implemented in the relevant weight 110. Accordingly, it can be possible optionally to increase a mass of the damper mass 110.

However, to enable a sufficient mechanical stability precisely in the region of the connection recess 730 in the spacer component parts 660, it may be advisable to provide a reinforcement structure 940 farther radially inward to improve distribution of occurring forces and moments. Accordingly, it can be that the spacer component part 660 is constructed at least partially farther radially inward compared to an implementation of a spacer component part 660 described above. Use of a structure of this type can be meaningful, for example, when radial installation space radially inside the actual damper assembly with the damper masses 110 and guide component parts 600 is sufficiently large.

The connection recess 730 and the corresponding connection structures 720 can be constructed in a manner similar to or identical to that described above.

Figure 12:
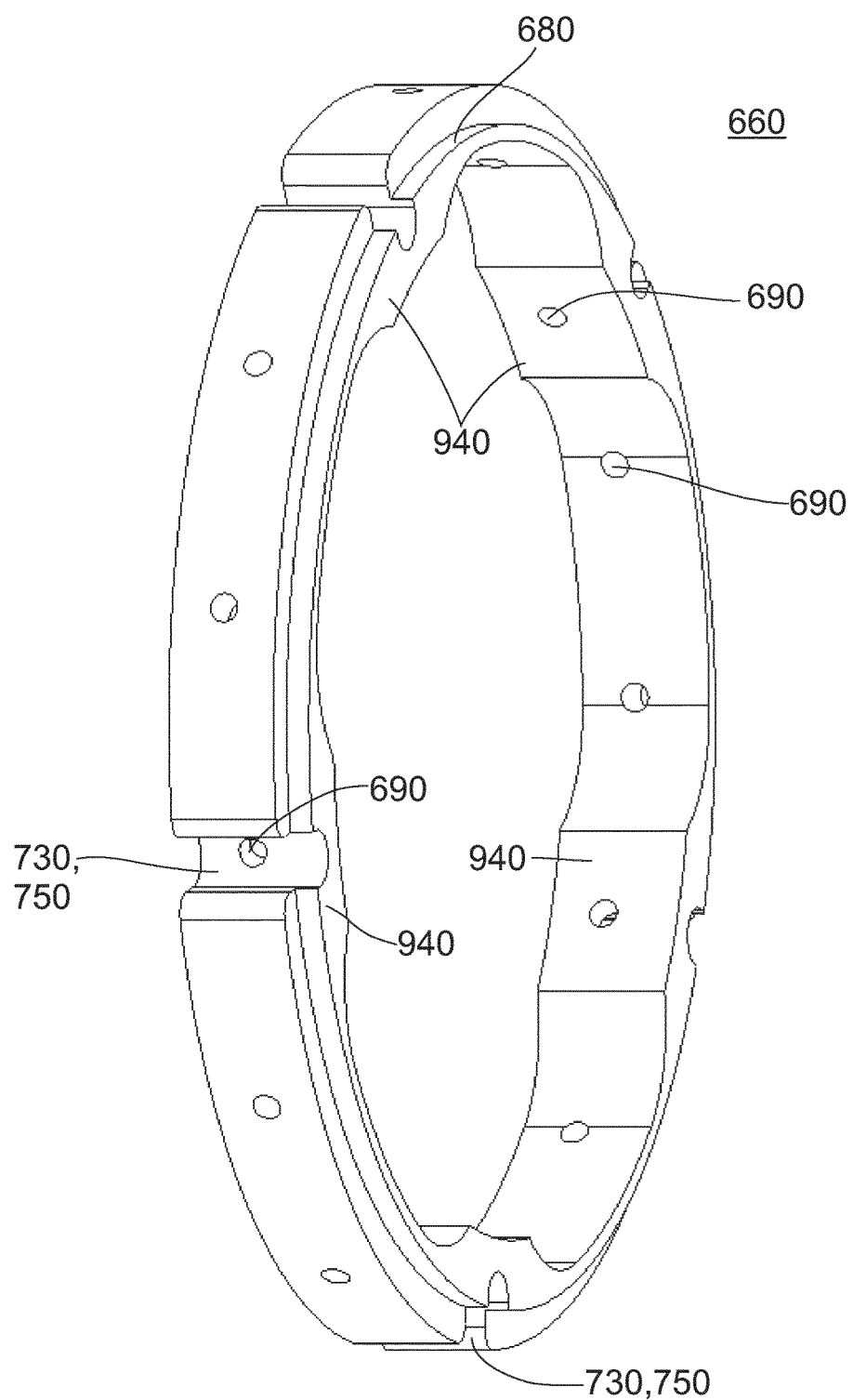
FIG. 12 is a perspective view of the spacer component part shown in FIGS. 11a and 11b.

FIGS. 11a and 11b show a side view and a top view of the spacer component part 660 shown in FIGS. 10a and 10b, while FIG. 12 shows a corresponding perspective view. In this case again, the figures show, for example, that spacer component part 660 again has the shoulder 680 for radially and/or axially guiding and comprises bore holes 690 in the area of the connection recesses 730 and in the area of the annular portion 820 for reducing weight and/or for improving the inflow and outflow of hydraulic medium.

Further, FIGS. 11b and 12 show that the connection structures 720 likewise have a circular or cylinder segment-shaped outer contour in the region of the connection recesses 730 at a radially inwardly located side.

Accordingly, a driving or guiding of the damper masses 110 collectively by only one additional component part, namely, the spacer component part 660, can also be realized through the use of the spacer ring shown in FIGS. 11a to 12 in connection with a tuned mass vibration damper 340 according to an embodiment example. Optionally, an implementation without additional axial installation space can also be carried out.

Figure 13A:
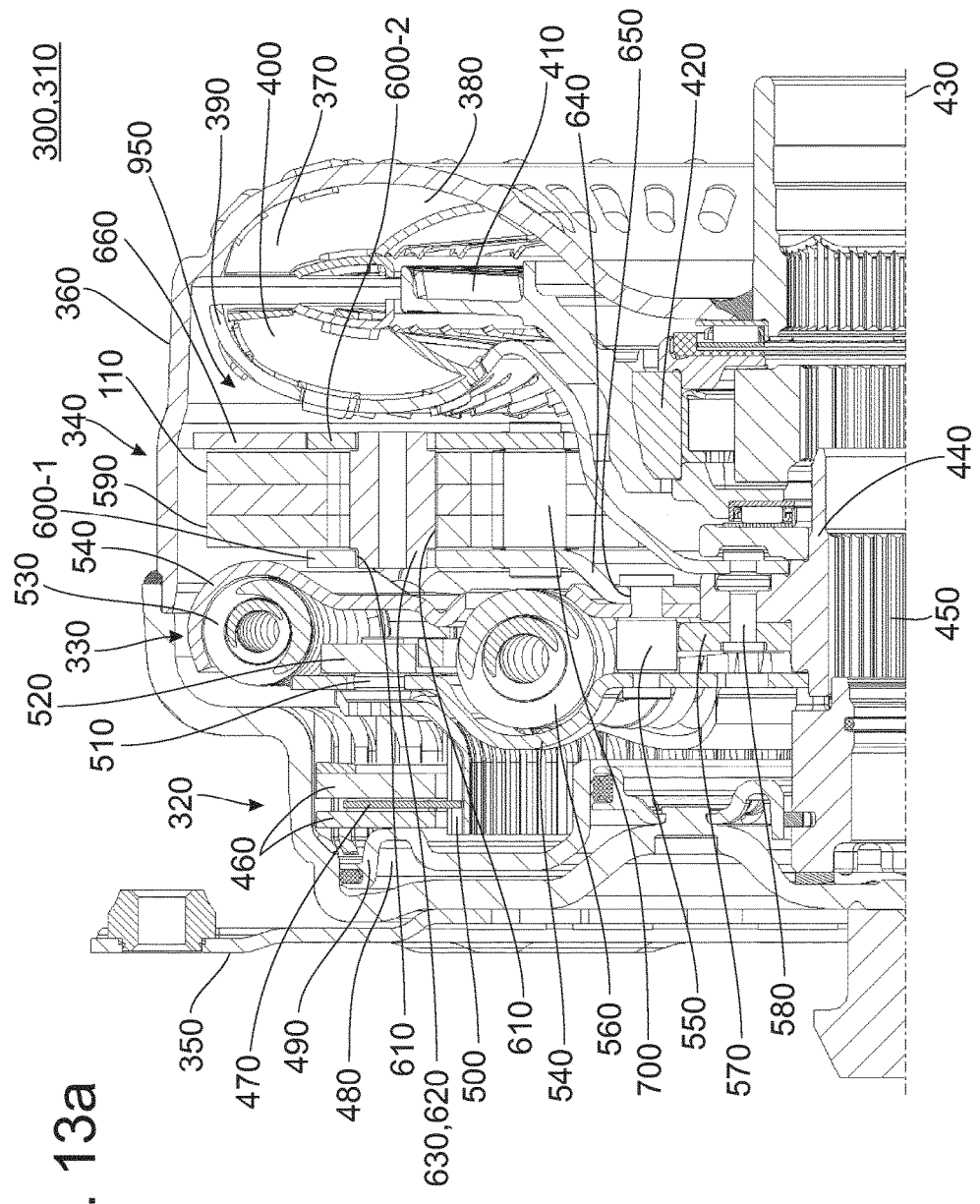
FIG. 13a is a cross-sectional view through a hydrodynamic starting element with a tuned mass vibration damper.

FIG. 13a shows a further starting element 300 according to an embodiment example which is again implemented as a hydrodynamic converter 310 and which is very similar with respect to construction to that of the starting element 300 or hydrodynamic converter 310 shown in FIG. 2. The cross-sectional view in FIG. 13a extends in a section plane similar to that in FIG. 2.

The two starting elements 300 differ from each other with respect to several specific configuration features, including, for example, the number of inner plates 470 of the lockup clutch 320. Accordingly, the starting element 300 shown in FIG. 13a has only one individual inner plate 470, which is why the number of outer plates 460 is also smaller than in the starting element 300 shown in FIG. 2. Further, the starting elements 300 differ, but particularly in the constructional configuration of the tuned mass vibration damper 340.

In the starting element 300 shown here, layout constraints prohibit the use of an inwardly located spacer component part 660 radial to the damper masses 110. Accordingly, in the present case, for reasons pertaining to installation space, no steps leading to noise reduction can be taken radially inwardly of the damper masses 110 of the tuned mass vibration damper 340. The individual damper masses 590 extend radially appreciably farther inward to the turbine wheel 390 and the rivet connection 580 thereof to the output hub 440. For this reason, a tuned mass vibration damper 340 is used in which the spacer component part 660, also referred to as spacer ring, is arranged and radially supported radially outwardly of the second guide component part 600-2. The spacer component part 660 is accordingly guided at the second guide component part 600-2 via a radial support with clearance.

As will be explained more fully in the following referring the FIG. 13b and the subsequent figures, an axial support of the spacer component part 660 between a rivet head and the damper masses 110, also referred to as flyweights, is implemented in this case. Here also, the spacer component part 660 is again used for mutual support of the damper masses 110. Accordingly, the damper masses 110 are substantially fixed relative to one another with respect to their torsional angle. In this way, it can be possible in particular to prevent the damper weights 110 from colliding with one another. Accordingly, no individual weight can enter its stop. Rather, this can only happen collectively for all of the damper masses 110. Depending on the specific implementation, a stop of this kind can be realized by a radially inwardly located ring. It may be sufficient for reasons pertaining to installation space when this ring intercepts only one damper mass 110 so that the other damper masses 110 are then also be held correspondingly by the riveting or coupling via the spacer component part 660.

As is shown in FIG. 13a, the spacer component part 660 lies radially outwardly on the second guide component part 600-2. In this case, both the spacer component part 660 and the second guide component part 600-2 are substantially disk-shaped or annular, i.e., have a substantially circular or cylindrical outer contour which is adapted one to the other with respect to radii in precisely such a way that the spacer component part 660 is radially guided through the second guide component part 600-2.

Accordingly, it can be possible that the spacer component part 660 is not constructed in axial direction, i.e., along the axis of rotation 430. Axial installation space can possibly be increased only through the rivet heads, described below, but in a region 950 in which the turbine shell or turbine wheel 390 is curved so as to provide this axial installation space. In other words, the necessary additional axial installation space in the present embodiment example results because of the shape of the turbine wheel 390.

As has already been described, the spacer component part 660 in this case also can be made of any suitable material in principle. For example, the spacer component part 660 can be made of a metallic material, i.e., for example, a stamped sheet metal, or of plastic. In normal operation, apart from the centrifugal forces caused by the rotational speed, it typically undergoes only small forces in radial direction, i.e., only small forces if any.

Figure 13B:
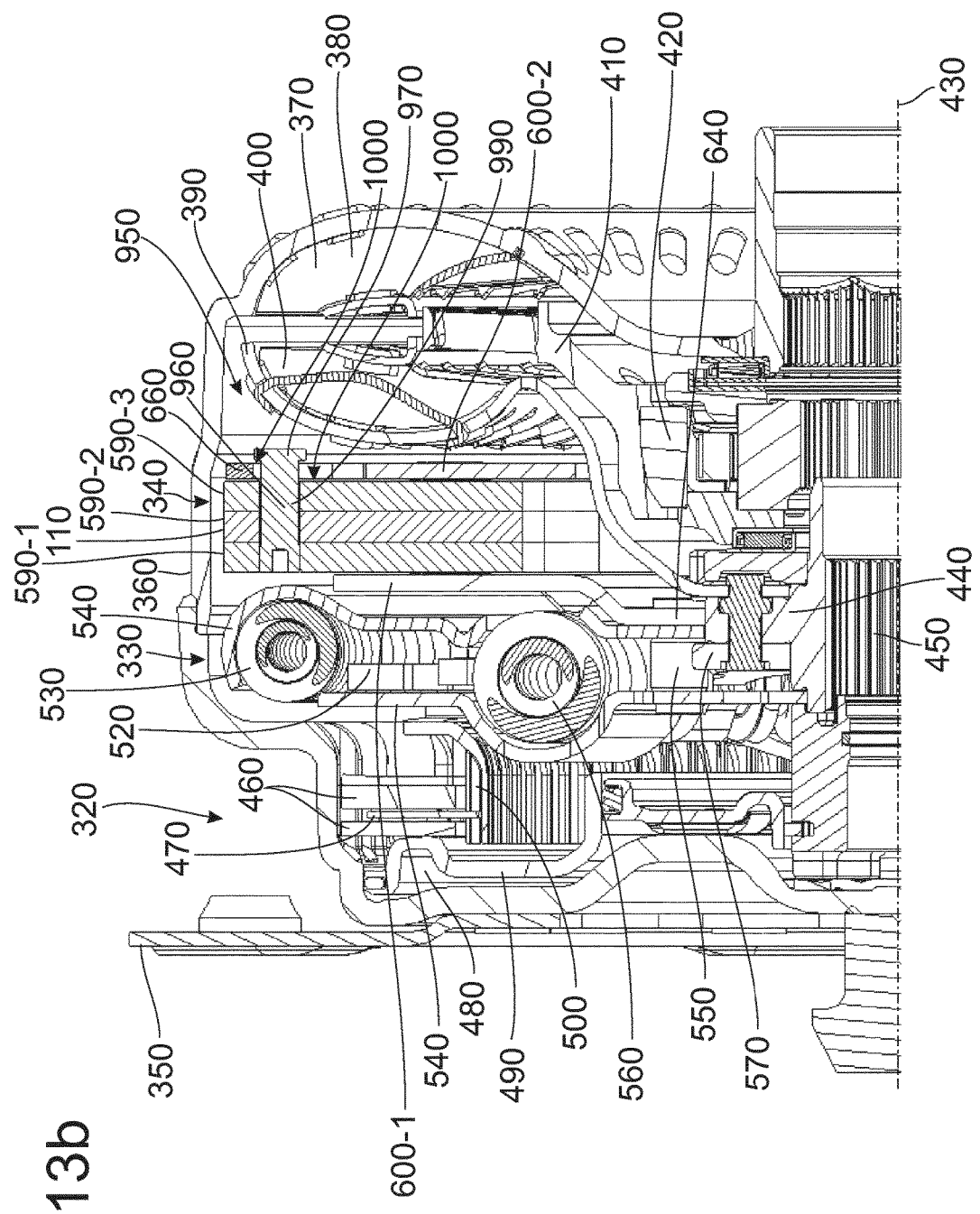
FIG. 13b is a cross-sectional view through the hydrodynamic starting element shown in FIG. 13a with the tuned mass vibration damper in a rotated position.

FIG. 13*b* shows a view comparable to that in FIG. 13*a*, but in which the tuned mass vibration damper 340 according to an embodiment example is rotated until the above-mentioned rivet 960 is visible. This rivet 960 has a rivet head 970 which is visible at an end of the rivet 960 facing the second guide component part 600-2. This rivet 960 has a rivet head 970 which is arranged at an end of the rivet 960 facing the second guide component part 600-2. Rivet 970 further has, at an end facing the first guide component part 600-1, a bore hole or a recess 980 which is constructed as a blind recess and which is guided centrally with respect to a rivet shank 990 of rivet 960.

In the areas marked by the arrows 1000, the spacer component part 660 is supported and guided axially with clearance between the damper masses 110 and the rivet head 970. The installation space results in this case in axial direction in region 950 owing to the geometry of the turbine wheel 390. In other words, the space for the rivet head 970 is on the radially outer side between the damper masses 110 and the turbine wheel 390, while only very little installation space is available radially inside the damper masses 110 in this case.

The starting element 300 shown in FIGS. 13*a* and 13*b* is configured for use in connection with an automatic engine start-stop system not least because of the substantially annular shape of the spacer component part 660, also referred to as MSA spacer ring (MSA=automatic engine start-stop system).

FIG. 14*a* shows a cross-sectional view through the tuned mass vibration damper 340 according to an embodiment example, while FIG. 14*b* shows a fragmentary sectional view as a top view of the tuned mass vibration damper 340 from FIG. 14*a*.

As is shown when FIGS. 14*a* and 14*b* are viewed in conjunction, the spacer component part 660 and the second guide component part 600-2 are both substantially annular, for which reason the spacer component part 660 can again be referred to here as spacer ring. The radii of the spacer component part 660 and second guide component part 600-2 are configured in such a way that the spacer component part 660 is radially supported at the second guide component part 600-2 with clearance.

FIGS. 14*a* and 14*b* show the damper masses 110 in a deflected state. Correspondingly, the rolling bodies 620 are in the region of the path ends 890, respectively, with respect to the guide paths 610 of the damper masses 110 and with respect to the guide paths 610 of the guide component parts 600. The damper masses are again driven in circumferential direction by positive engagement with clearance when the damper masses 110 are deflected in a corresponding manner by connection structures 720, described more exactly in the following, which are formed in this case by rivets 960, and corresponding connection recesses 730 in the spacer component part 660.

Figure 15:
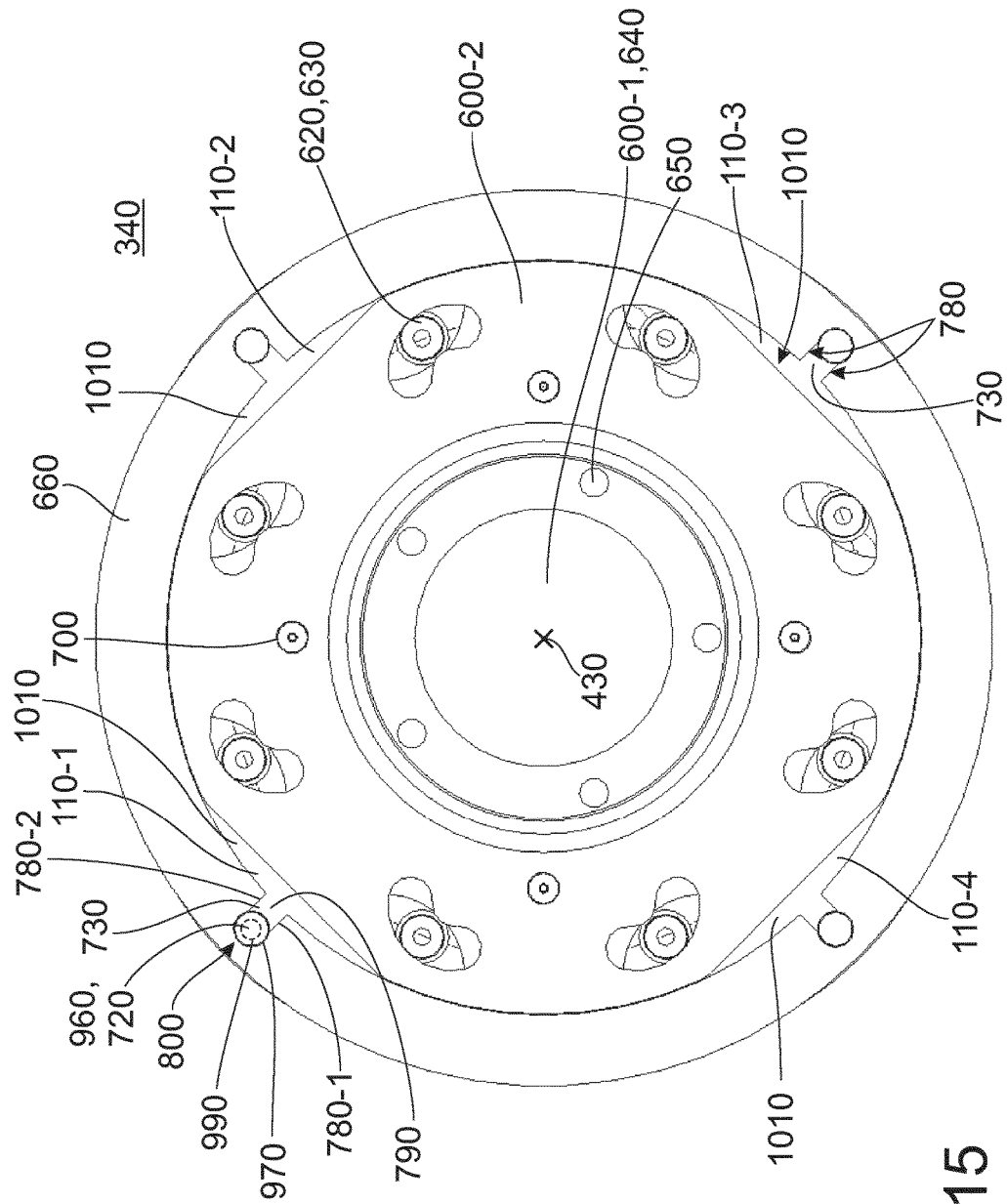
FIG. 15 is a top view of a tuned mass vibration damper in which the damper masses are arranged in a center position.

FIG. 15 shows a top view of the tuned mass vibration damper 340 according to an embodiment example as has already been shown. In this case, as is shown by the positions of the rolling bodies 620 or rollers 630, the damper masses are in their neutral position or center position. FIG. 15 shows the tuned mass vibration damper 340 from the side of the second guide component part 600-2. The first guide component part 600-1 is seen only in the region of the flange structure 640 with its bore holes 650.

FIG. 15 shows that in this embodiment example of the spacer component part 660 the connection structure 720 at least partially has a cylinder-shaped outer contour, the center axis of which extends parallel to the axis of rotation. The connection recesses 730 have an outer contour with two opposed straight portions 780-1, 780-2 which are again arranged between an open end 790 and a closed end 800 of the connection recess 730. The connection recesses 730 are in turn configured in precisely such a way that they receive the connection structures 720 and allow a rotation of the relevant damper masses 110 and a movement of the connection structure 720 along the radial direction.

In this case, the connection structures 720 are mechanically fixedly connected to the relevant damper masses 110. At least one of the guide component parts 600, in the present embodiment example, the second guide component part 600-2, is configured to limit a movement of the relevant damper mass 110 along the radial direction in that the connection structure 720 comes in contact with at least one guide component part 600. As was explained above, "mechanically fixed" in this context means a mechanical connection without clearance in all linear spatial directions. In this case, the connection structure 720 is in precisely the position to make contact with the at least one guide component part 600 along the cylinder-shaped outer contour. The connection structure 720 is formed by rivet 960 as can be seen particularly from FIG. 13*b*. The rivet shank 990 forming the cylinder-shaped outer contour of the connection structure 720 is shown as a dashed line in FIG. 15, while the view in FIG. 15 essentially shows the rivet head 970 of rivet 960.

To provide the above-described possibility for limiting the radial movement of the damper masses 110 by connection structure 720 making contact with the second guide component part 600-2, the latter has cutout 1010 which inter alia can be jointly responsible for the free running of rivet 960 and rivet head 970. Cutouts 1010 are, in this case, cut-away portions at the second guide component part 600 through which rivet 960, also referred to as bolt, i.e., the connection structure 720, can move freely in radial direction before coming in contact with the relevant guide component part in the region of the flattened portion 1020.

As has already been mentioned, the cylinder-shaped outer contour formed by the rivet shank 990 moves along the parallel, straight portions 780 of the connection recess 730. If the torsional angle of the damper masses 110 is large enough for the connection structure 720 with its cylinder-shaped outer contour to exit the area of the connection recess 730 radially inward, the cutouts 110 also represent a necessary step for preventing a premature contact with the second guide component part 600-2.

Figure 16:
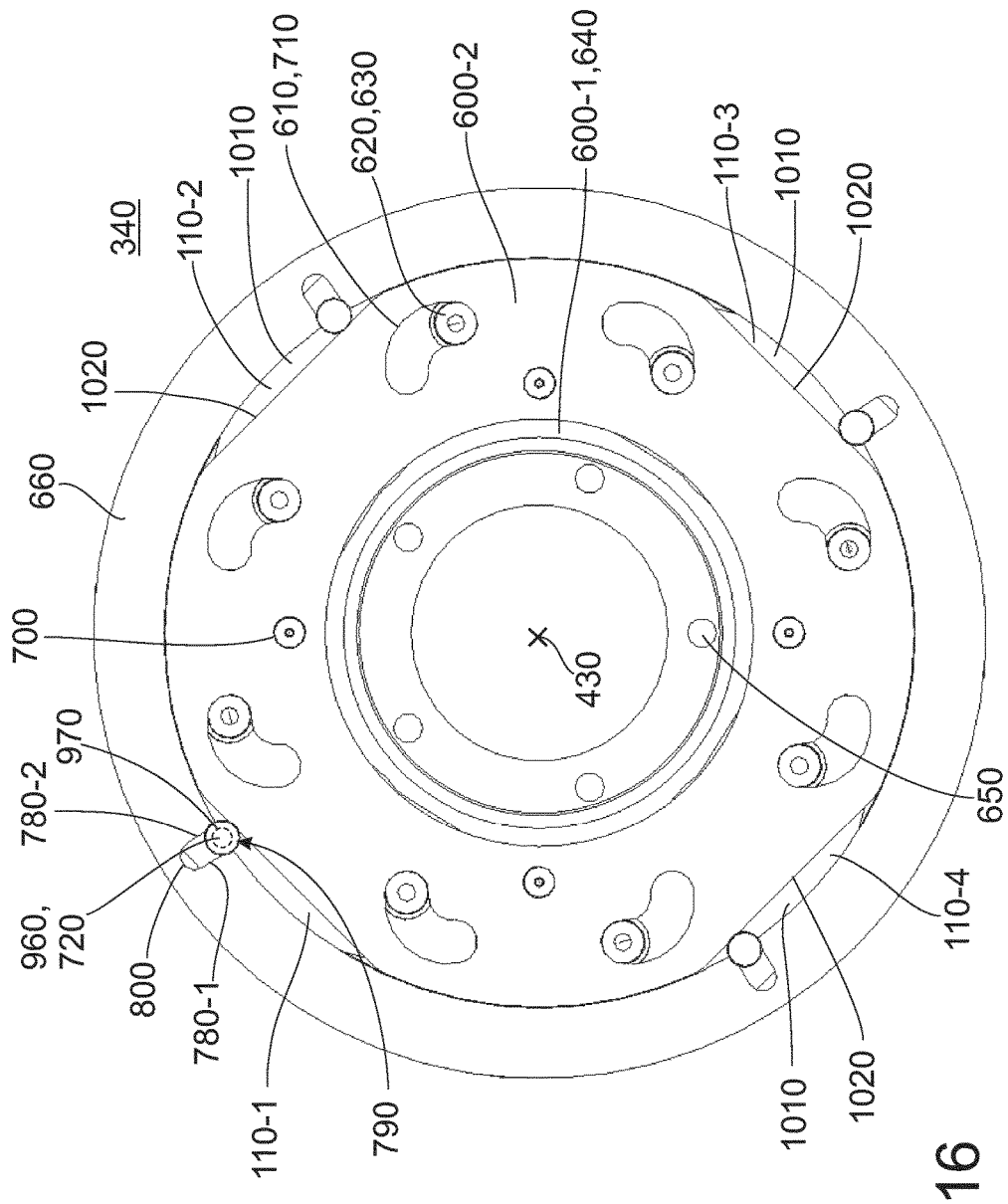
FIG. 16 is the tuned mass vibration damper shown in FIG. 15 in a condition of maximum swivel of the damper masses.

To illustrate this more precisely, FIG. 16 shows a view very similar to FIG. 15 but in which, in contrast to FIG. 15, the damper masses 110 are now in deflected condition. Accordingly, FIG. 16 shows how the connection structures 720, i.e., the rivets 960, have shifted radially inward due to the swiveling of the damper masses 110 and are arranged with their center points in the region of the open ends 790 of the connection recesses 730. In the fully deflected condition of the damper masses 110, the cylinder-shaped outer contours of the connection structures 720 formed by the rivet shanks 990 of rivets 960 make contact with the flattened areas 1020 of the second guide component part 600-2 through which the cutouts 1010 are formed.

Figure 17:
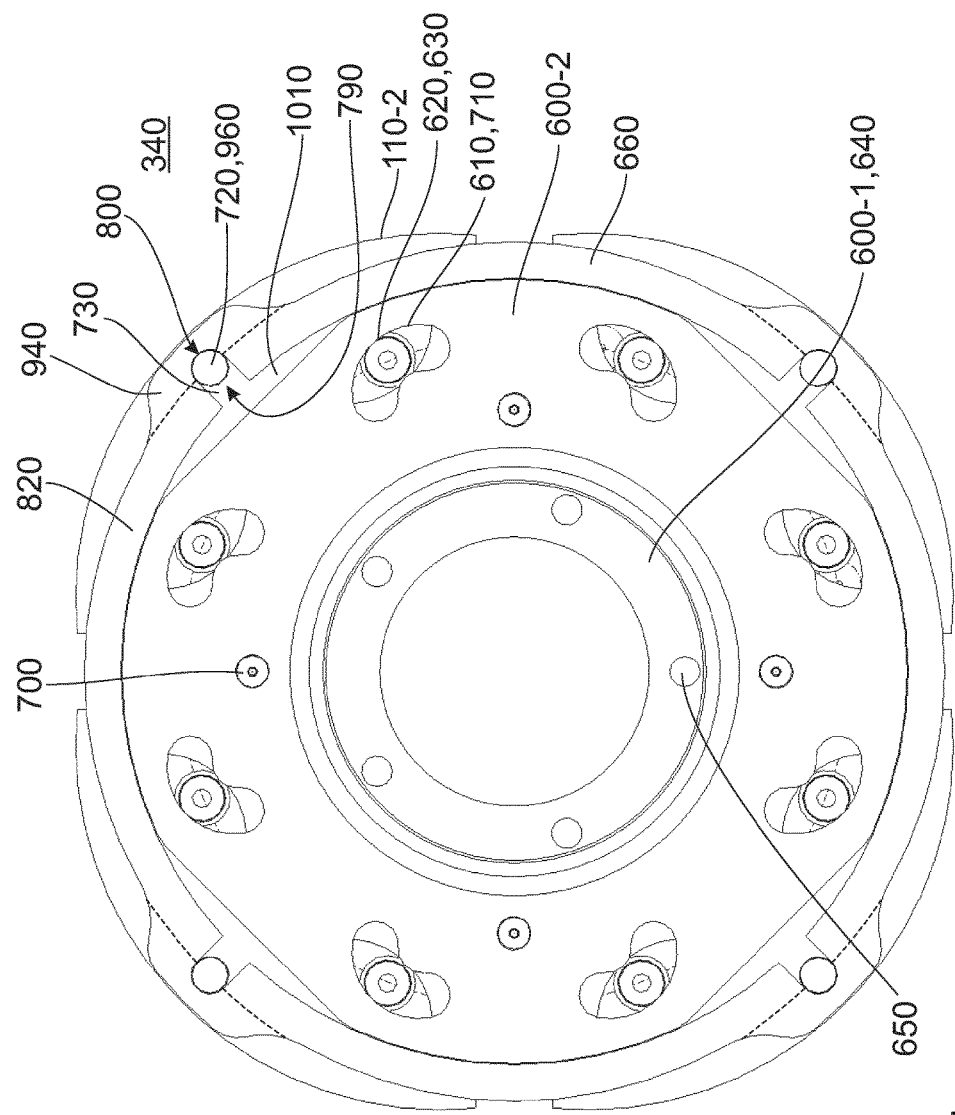
FIG. 17 is a top view of a tuned mass vibration damper.

FIG. 17 shows a view of the tuned mass vibration damper 340 according to an embodiment example similar to FIG. 15 in which a weight optimization and reduced mass moment of inertia have been carried out at the spacer component part 660. In this case too, the damper masses 110 are again in their center position, i.e., the neutral position. With this optional weight optimization and reduced mass moment of inertia, a width of the spacer component part 660 in radial direction has been reduced. However, in order to provide sufficient material in the area of the closed ends 800 of the recesses for the substantially slot-shaped connection recesses 730, the spacer component part 660 again has an annular portion 820 adjoined in the area of the closed ends 800 of the connection recess 730 by connection structures 720 which extend radially outward opposite the annular portion 820 as is indicated by a dashed line in this area.

As a result of the consequent reduction in weight or mass, it may be possible optionally to enable a faster response of the tuned mass vibration damper 340 and, therefore, of the starting element 300.

Figures 18A, 18B:
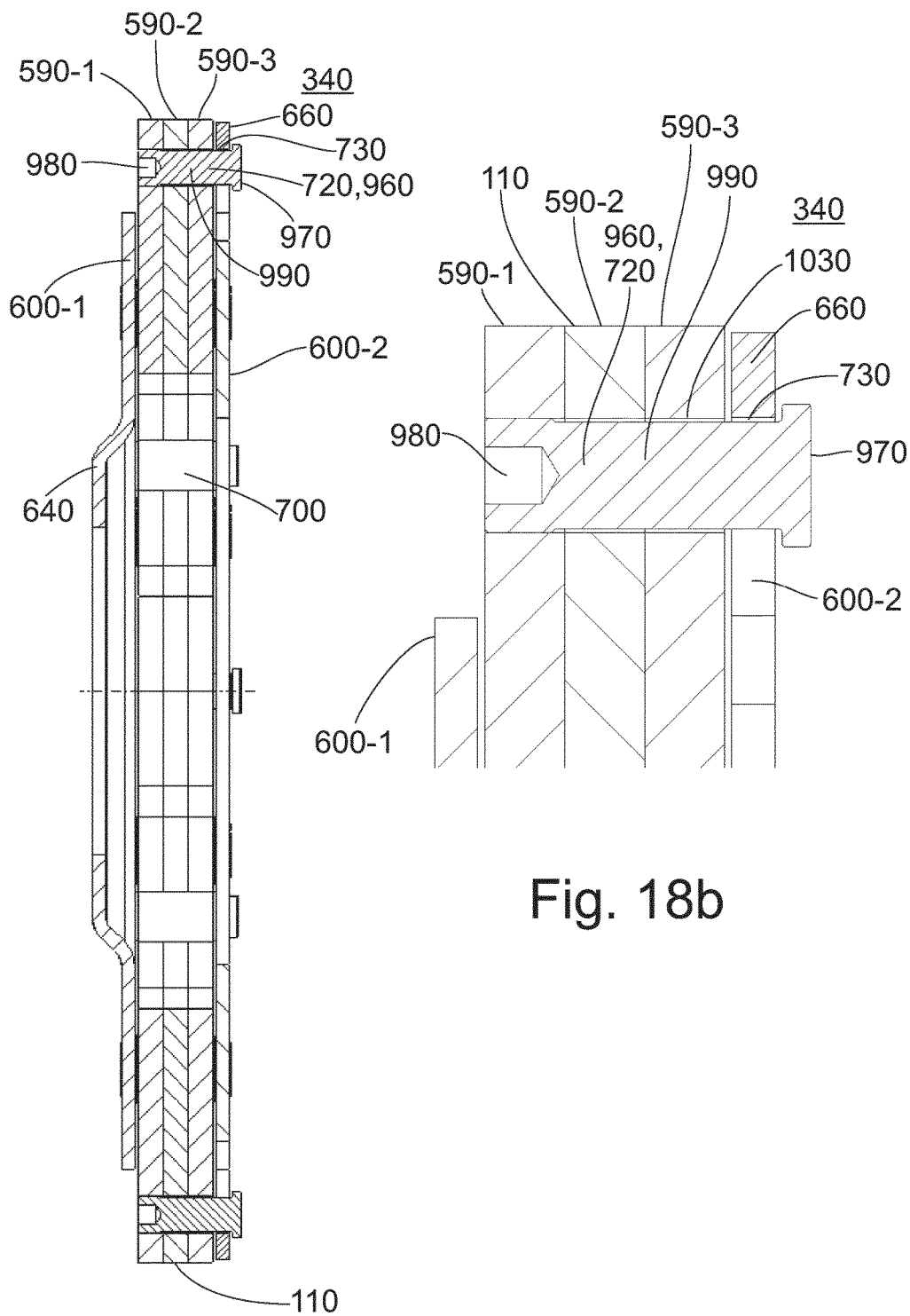

FIG. 18a shows a cross-sectional view through the tuned mass vibration damper 340 according to an embodiment example shown in FIGS. 13a to 16. FIG. 18b shows an enlarged view from FIG. 18a in the region of connection structure 720. The section planes in FIGS. 18a and 18b are selected precisely so that they show a section through the rivet 960, i.e., through the connection structure 720.

As has already been mentioned, the damper masses 110 in the embodiment example shown here are formed of three individual damper masses 590-1, 590-2, 590-3 which are supported in this sequence between the first guide component part 600-1 and the second guide component part 600-2. To allow the freest possible movement of the individual damper masses 590 of damper mass 110 in a corresponding manner, they have a bore hole 1030 with a diameter that is greater than an outer diameter of the rivet shank 990. In other words, the individual damper masses 590 have a larger bore hole than the cylinder-shaped outer contour, formed by the rivet shank 990, of the connection structure 720.

However, to allow an axial guiding of the spacer component part 660 between the rivet head 970 and the damper mass 110, or more precisely, the partial damper mass 590-3 closest to the second guide component part 600-2, with corresponding clearance so as to allow, for example, the rotation of the spacer component part 660 along the circumferential direction relative to the guide component part 600-2, the connection structure 720 in the form of rivet 960 is riveted only to the first partial damper mass 590-1.

To this end, rivet 960 has a bore hole 980 in the form of a blind bore hole which extends only in the region of the first partial damper mass 590-1. In this way, it is possible to widen rivet 960 only in this area until it enters into a frictionally engaging or positively engaging connection with the relevant partial damper mass 590-1 depending on the direction of force or the movement direction.

Accordingly, the other individual damper masses 590-2, 590-3 have clearance relative to the rivet shank 990 so that it is ensured in operation that the individual damper masses 590 are positioned on their guide paths 610 and that their position relative to one another is not predetermined by the bore hole in the individual damper masses 590. This reduces the likelihood of hooking, jamming or other interference in operation of the tuned mass vibration damper 340.

In other words, rivet 960 is only riveted in the last partial damper mass 590-1 so that the partial damper masses 590, also referred to as individual damper masses, can move relative to one another. Accordingly, all of the partial damper masses 590 can contact the rolling bodies 620 in the corresponding path contours or guide paths 610. This can prevent any constraining forces, and the positional tolerances of the bore hole 1030 for rivet 960 relative to one another and with respect to the guide paths 610 can be generous, i.e., need not be kept as narrow. It is important in this regard, however, that this implementation is merely optional.

While the implementation of bore holes 1030 reduces the mass of the partial damper masses 590 and, therefore, of the damper mass 110 in principle, but in such a way that the rivet 960 again substantially fills the bore holes 1030, the loss of mass brought about by the bore holes 1030 is substantially balanced out. Accordingly, leaving aside the slightly different diameters of the bore holes 1030, rivet shanks 990 and recess 980, even the lacking mass can be fully compensated in principle.

Figure 19:
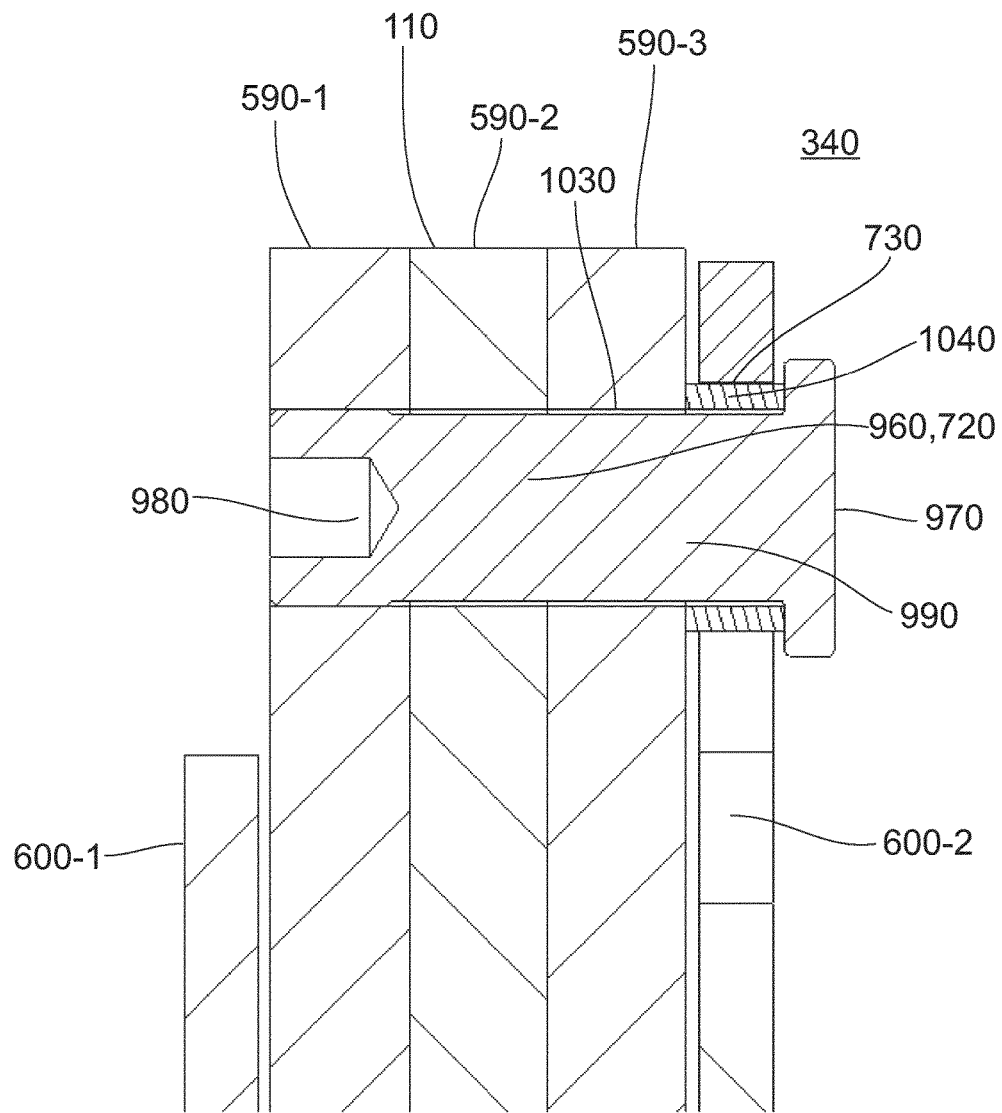
FIG. 19 is an enlarged view of a connection structure with a sleeve of a tuned mass vibration damper.

FIG. 19 shows a view of a tuned mass vibration damper 340 according to a further embodiment example that is very similar to FIG. 18b and which differs from that shown in FIG. 18b substantially in that the connection recesses 730 have a somewhat larger diameter. For example, if the connection structure 720 is made of a metallic material, i.e., the rivet 960 is made of a corresponding material, a portion of the cylinder-shaped outer contour which makes contact with the relevant guide component part 600-2 for limiting the radial movement of the damper mass 110 can be enclosed by a sleeve 1040. For example, the sleeve can be made of plastic, i.e., for example, a thermosetting plastic, an elastomer or a thermoplastic, as was described above.

Optionally, the impact of the damper masses 110 can take place via a sleeve 1040 which can be arranged over the rivet shanks 990. Accordingly, they can strike the relevant guide component part 600-2 radially before the rolling bodies 620 of the damper masses 110 can reach the relevant stops. Alternatively, of course, a radially inwardly located ring made of an appropriate material can also be integrated and intercepts the damper masses 110. Accordingly, the sleeves 1040, as plastic sleeves, can be used as angle-limiting stops and make contact with the second guide component part 660 at maximum deflection of the damper masses 110.

Figure 20:
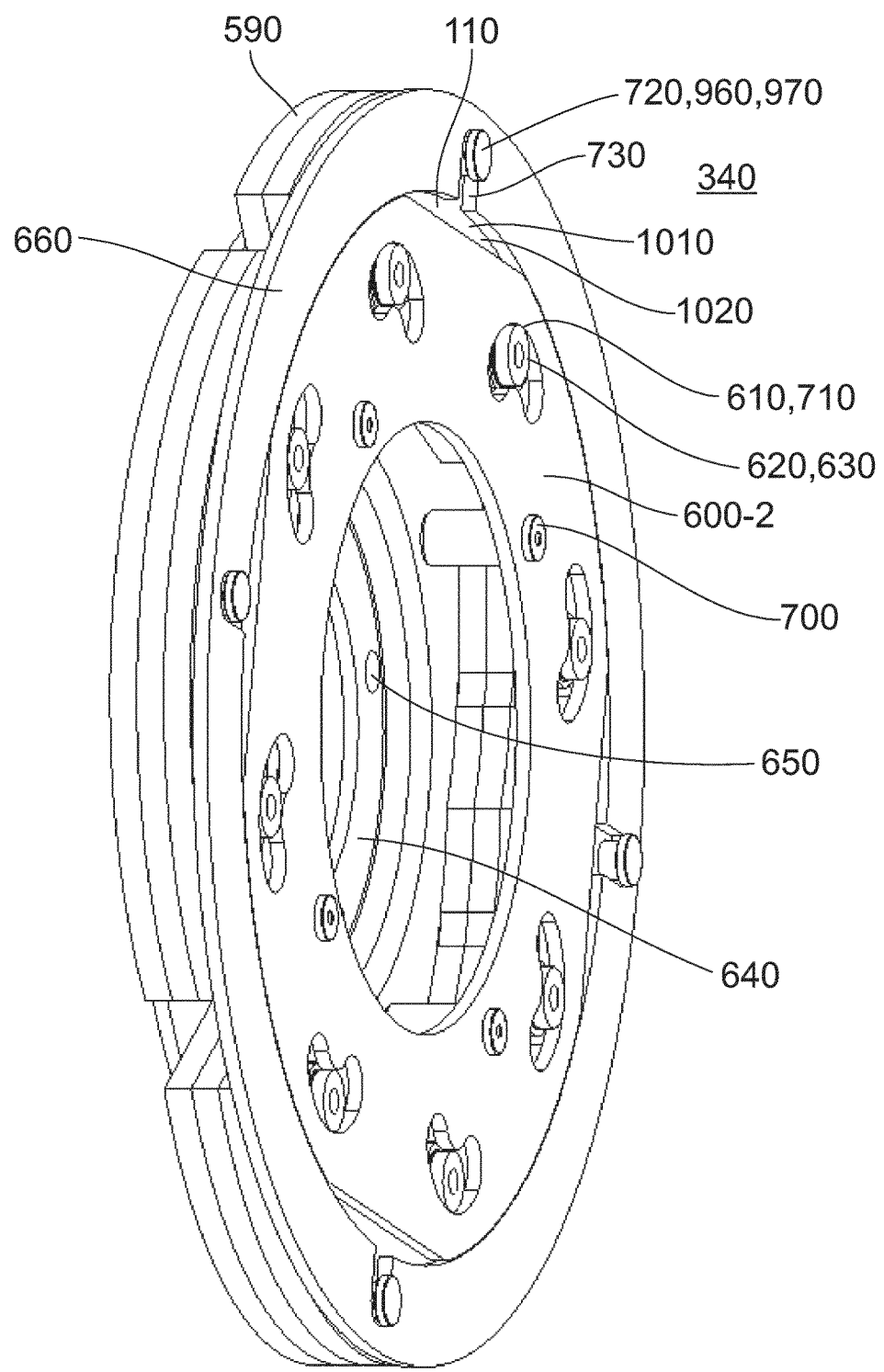
FIG. 20 is a perspective view of a tuned mass vibration damper.

Finally, FIG. 20 shows a perspective view of the tuned mass vibration damper 340 as shown, for example, in FIGS. 13a, 13b, 14a and 14b.

Figure 21:
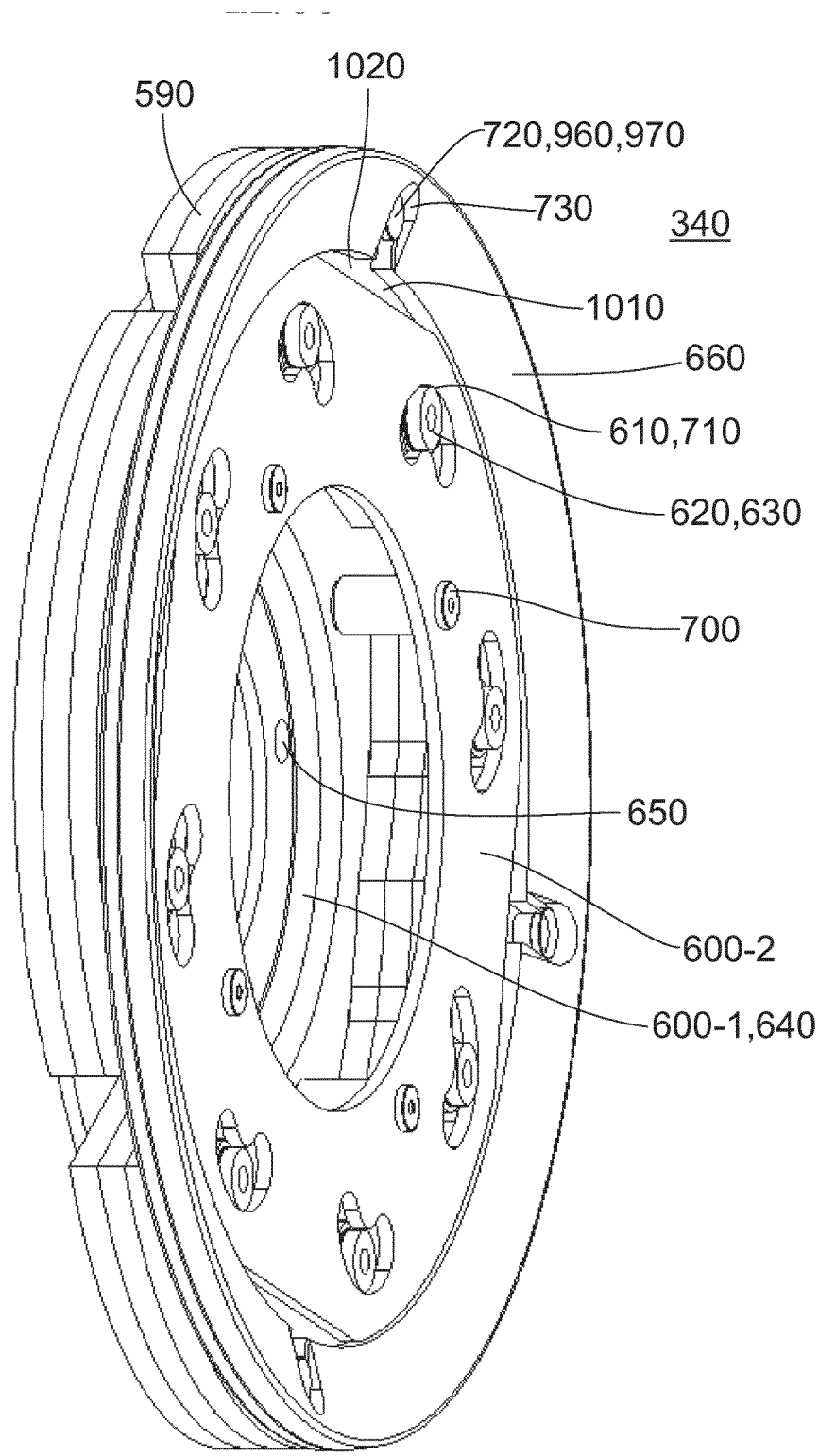
FIG. 21 is a perspective view of a tuned mass vibration damper.

Further, FIG. 21 shows a perspective view of a tuned mass vibration damper 340 according to an embodiment example in which the spacer component part 660 differs from that shown in FIG. 20 substantially in that it has a wider web in the radially outer area so as to better absorb forces induced by centrifugal force. In this case also, this construction takes advantage of the fact that region 950 in the area of the starting element 300 is not used. To this end, the spacer component part 660 is shaped out conically from the side remote of the damper masses 110. In other words, the spacer component part 660 is also adapted in this case to the free volume with respect to the turbine or turbine wheel 390 of the starting element 300.

Figure 22:
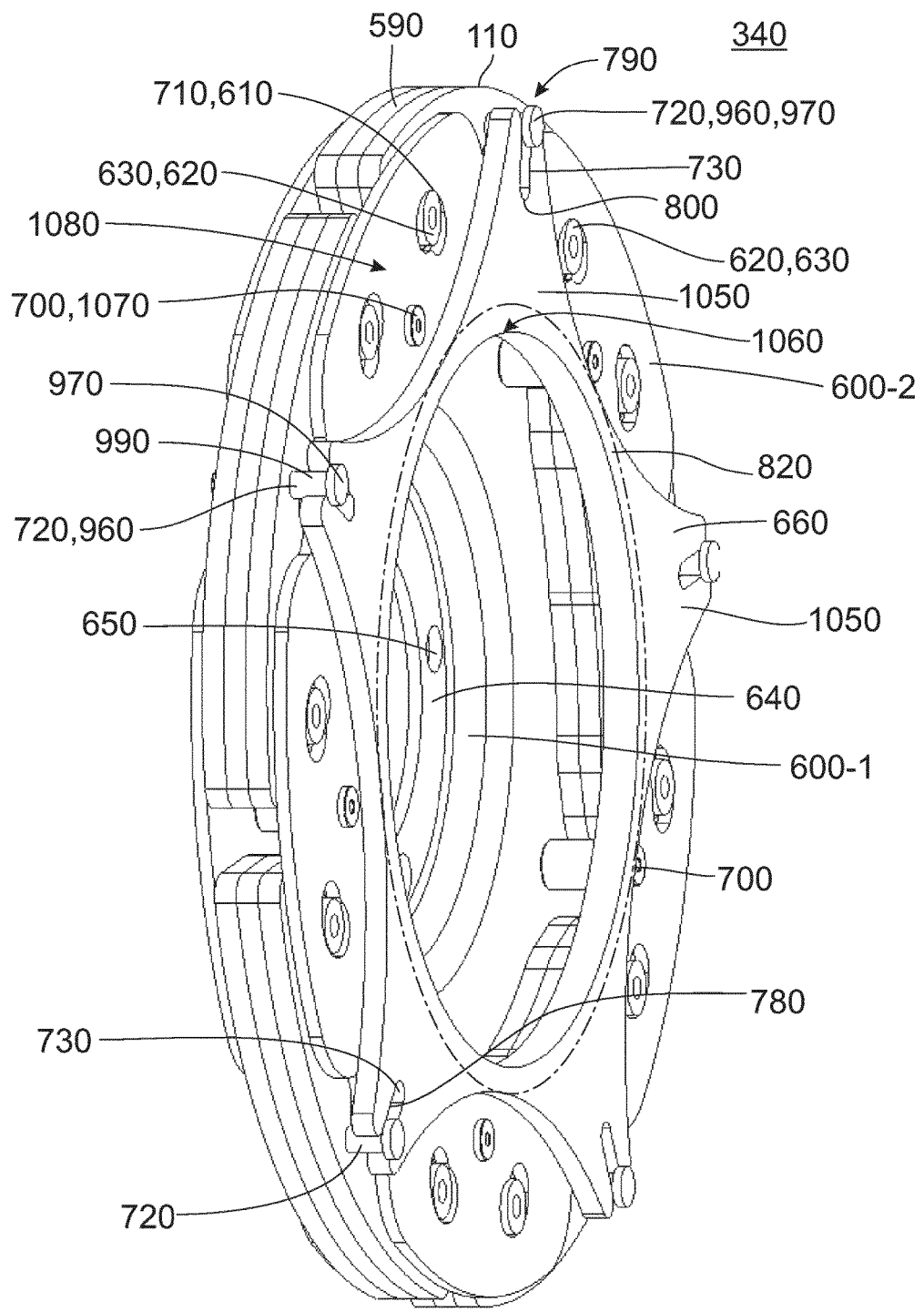
FIG. 22 is a further embodiment of a tuned mass vibration damper in which the spacer component part is formed as an inner ring.

FIG. 22 shows a perspective view of a further turbine wheel 390 with a spacer component part 660 as noise-reducing step in which the spacer component part 660 can also be implemented, with respect to its radial support, inwardly at the second guide component part 600-22. This implementation can optionally make it possible to keep the mass moment of inertia of the spacer component part 660 small because of the smaller center of gravity radius. However, this variant is somewhat longer along the rotating direction 430, i.e., in axial direction.

FIG. 22 shows the tuned mass vibration damper 340 from the side of the second guide component part 600-2. The connection structures 720 are connected to at least one of the damper masses 110, the connection structure 720 and spacer component part 660 being in the position of limiting the movement of the relevant damper mass 110 along the radial direction precisely in that the connection structure 720 makes contact with the spacer component part 660. Accordingly, the connection structure 720 in this embodiment example again has a cylinder-shaped outer contour which is formed by the rivet shank 990 of the rivet 960. The connection recess 730 is shaped here as a slot-shaped recess, the open end 790 of which faces radially outward, while the closed end 800 is oriented radially inward.

The spacer component part 660 again has a substantially purely annular portion 820 adjoined by corresponding guide portions 1050 toward the connection recesses 730. These guide portions 1050 are formed integral with, and in one piece with, the annular portion 820. As has already been mentioned, the radial guiding of the spacer component part 660 takes place in this case at a radial inner edge 1060 at the second guide component part 600-2. In contrast, the axial guiding is again ensured between partial damper mass 590 closest to the second guide component part 600-2 and the relevant rivet shank 990 of the 960.

This arrangement with guiding of the spacer component part 660 at the second guide component part on the radially inner side can indeed optionally reduce a mass inertia of the spacer component part 660, but can also lead to an increased axial installation space.

As has already been mentioned in connection with the embodiment examples described above, the connection structures 720 are guided at the substantially parallely extending straight portions 780 of the connection recess 730. In other words, the rivets 960 emerge from the damper masses 110 and are held in position relative to one another by the parallel surfaces 780 of the spacer component part 660.

To ensure free running of the damper masses 110, which are shown here in the center position, i.e., in their neutral position, and in order to prevent collisions with a rivet head 1070 of the spacer bolt 700, by which the two guide component parts 600 are connected to one another, the spacer component part 660 has corresponding cutouts 1080 which are bounded by guide portions 1050 directly adjoining them in circumferential direction on both sides. This may possibly be necessary, but at least advisable, since the spacer component part 660 can rotate relative to the guide component parts 660 in operation.

Figure 23:
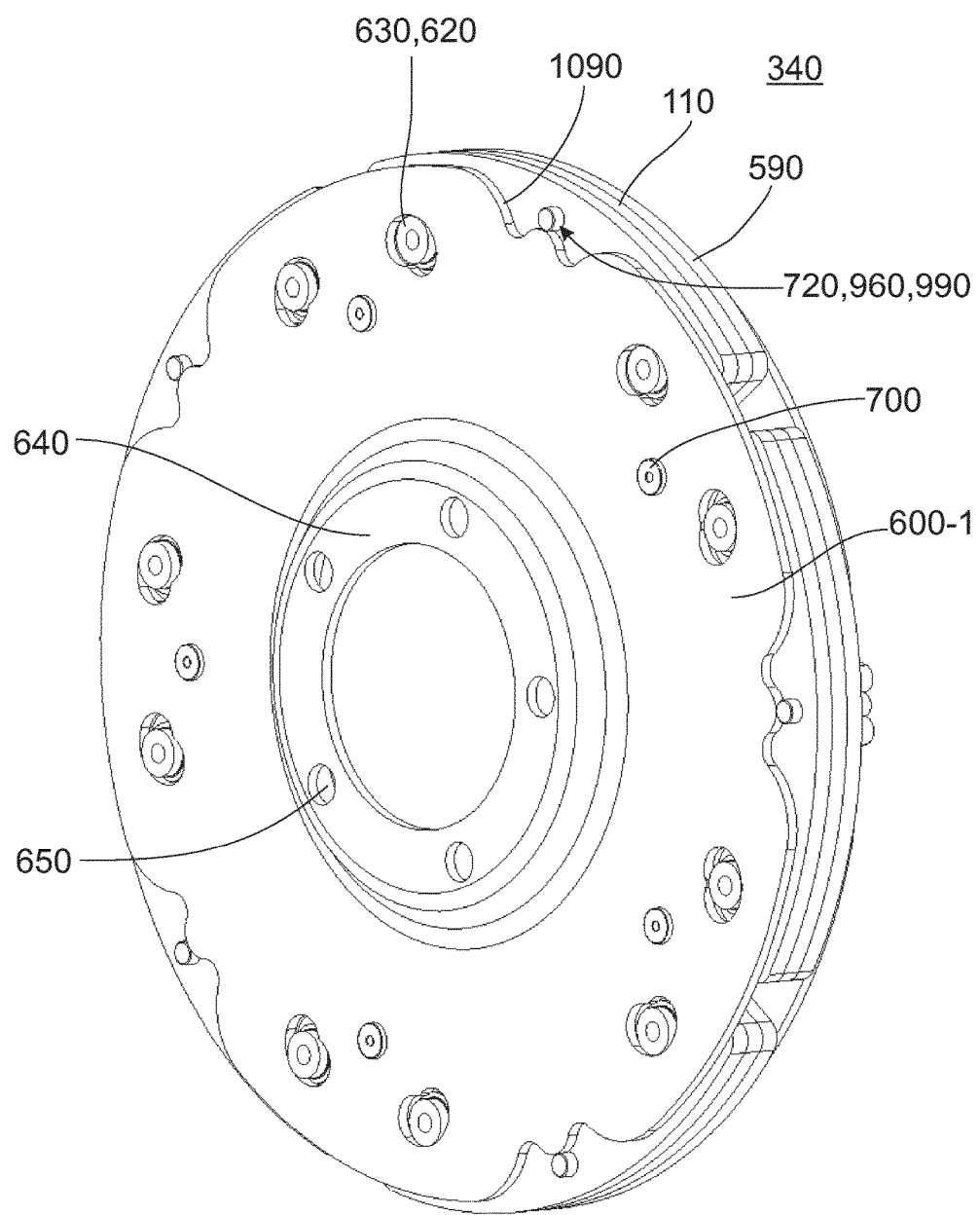
FIG. 23 is a perspective side view of a tuned mass vibration damper.

FIG. 23 shows a perspective view of the tuned mass vibration damper 340 from FIG. 22 from the side of the first guide component part 600-1. In contrast to the connection structures 720 described above, this connection structure 720, i.e., the rivet 960 and rivet shank 990, also projects beyond the damper mass 110 on the side facing the first guide component part 600-1. Accordingly, it can be possible in connection with the first guide component part 600-1 to provide additional guidance of the damper masses 110 and guide component parts 600 by incorporating a suitable further guide portion 1090. Of course, instead of a recess implementing a further guide portion 1090 of this type, a simple cutaway can also be implemented to prevent a collision between the connection structure 720, which possibly projects beyond the damper mass 110, and the first guide component part 600-1.

Figure 24:
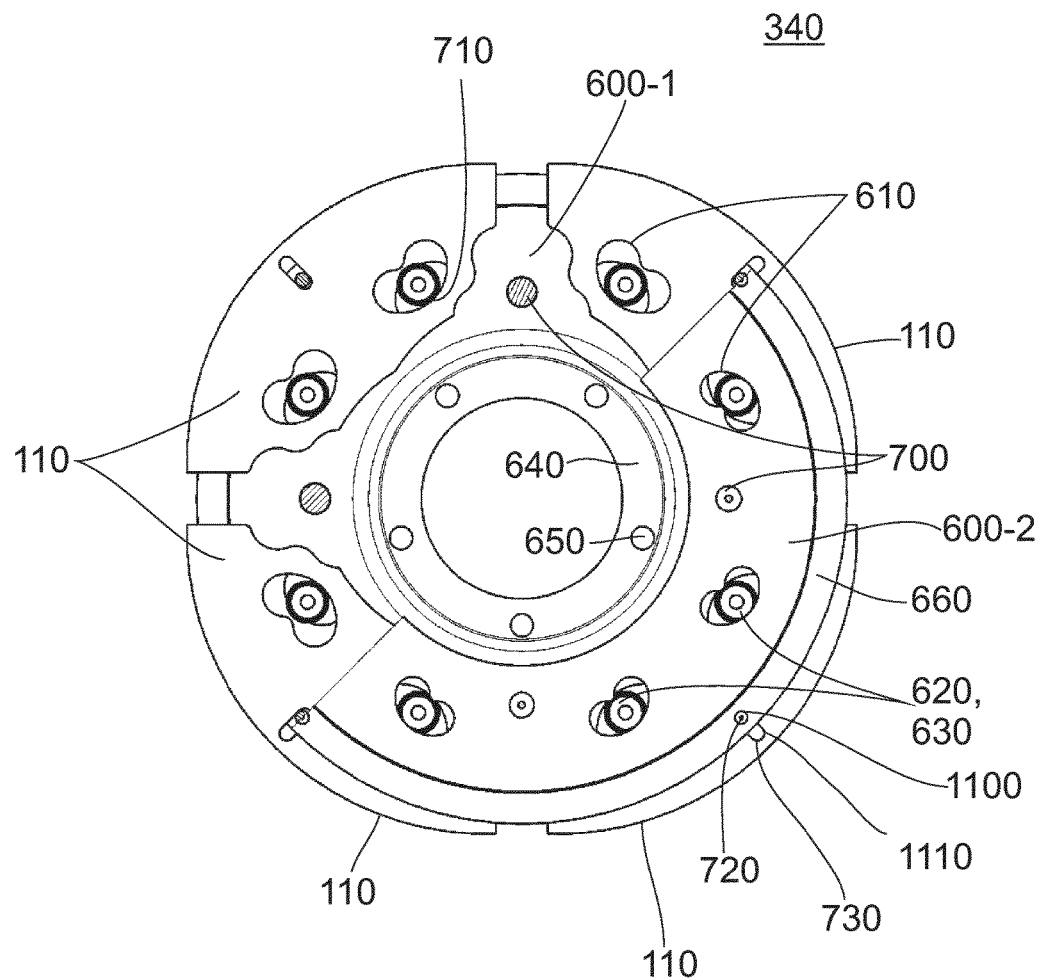
FIG. 24 is a top view of a tuned mass vibration damper.

FIG. 24 shows a top view of a further tuned mass vibration damper 340 according to an embodiment example in a fragmentary elevational view. FIG. 24 shows the sub-assembly of tuned mass vibration damper 340 with the components thereof and with the installed spacer component part 660 in the neutral position, also referred to as guide ring in view of the guiding of the damper masses 110. For better clarity, the second guide component part 600-2 and guide component part 600 are shown in section in the selected view in FIG. 24.

FIG. 24 shows, for example, the guide paths 610 of the damper masses 110 and guide component parts 600 which correspond to one another with respect to their position and orientation. Here again, for the purpose of shifting the center of gravity of the damper masses 110, the guide paths, also referred to as oscillating paths, which are kidney-shaped in this instance, are implemented in a substantially mirror-inverted manner with respect to the two above-mentioned components of the tuned mass vibration damper 340. In view of their kidney shape, the guide paths 610 are referred to as kidneys for brevity.

Without wishing to anticipate the following description, it is noted here that the spacer component part 660 comprises the connection structure 720 in the embodiment example shown in FIG. 24 and in the further embodiment example. In this case, the connection structure 720 comprises a guide portion which engages in the damper masses 110 by the connection recess 730. The connection recess 730 is constructed as an elongated hole 1110 which extends substantially in radial direction in the position of the damper masses 110 that is shown in FIG. 24. The guide portion 1100 has a cylinder-shaped outer contour which can make contact with the edges of the elongated hole 1110 in circumferential direction to allow the damper masses 110 to be driven during a rotation of the spacer component part 660.

FIG. 25a shows a top view of the tuned mass vibration damper 340 shown in FIG. 24, and FIG. 25b shows a corresponding sectional view along a direction Y-Y in FIG. 25a. Lastly, FIG. 25c shows a perspective view of the spacer component part 660. In a corresponding manner, FIGS. 25a and 25b, of course, show the guide component part 660 in installed condition.

As is shown, for example, in FIG. 25c, the spacer component part 660 has an annular portion 1120 which is mechanically connected to the connection structure 720. Beyond this, the guide component part 600 also has a further annular portion 1130 that is likewise connected to the connection structure 720. The two annular portions 1120, 1130 accordingly form a pair of annular structures offset along the axis of rotation 430 which are connected to one another by the connection structures 720. Between the two annular portions 1120, 1130, the connection structures 720 have the guide portion 1100, mentioned above, with the cylinder-shaped outer contour.

The guide component parts 600-1, 600-2 are also substantially annular or disk-shaped in this case and accordingly have a substantially circular outer contour. An outer diameter of the guide component parts 600 is adapted to an inner diameter of the annular portions 1120, 1130 of guide component part 600 so that the spacer component part 660 can lie on the outer annular surfaces of the guide component parts 600 and can accordingly be held and guided in circumferential direction and in radial direction by the guide component parts 600. Axially, the spacer component part 660 is held by the damper masses 110, which spacer component part 660, as is shown, for example, in FIG. 25a as well as in FIG. 25b, is arranged radially also for the annular portions 1120, 1130.

The subassembly of the spacer component part 660 accordingly comprises the two rings 1120, 1130 which are connected to one another by a plurality of connection structures 720, four connection structures 720 in the present embodiment example, which are also referred to as spacers, rivets or, broadly, as connection elements. The connection structures 720 function simultaneously as guide pins for the radial movement of the damper masses 110 in the tuned mass vibration damper 340.

For the purpose of implementing or realizing desired characteristics such as strength, gliding, hardness, function and other parameters, the spacer component part 660 can be produced, for example, in its entirety or partially from a plastic or a metallic material or a combination of these materials. Also, it can have a corresponding coating, i.e., can be provided with a suitable layer.

With regard to function, the spacer component part 660 resembles the spacer component parts described above. This spacer component part 660 is supported in radial direction on the guide component parts 600 and guides the damper masses 110 relative to one another in circumferential direction. The radial movement of the damper masses 110 is defined by the proportions of the elongated holes 1110, also referred to as oval cutout, of the connection recesses 730 in the damper masses 110. A free oscillation of the damper masses 110 within a defined or predetermined angular range is not impaired by the rotatable support of the spacer component part 660.

Further, the damper masses 110 of the spacer component part 660 are supported relative to one another when falling down and are accordingly held spaced apart so as to prevent the damper masses 110 from colliding, for example, after the engine is switched off. As has already been mentioned, this can produce rattling sounds which could be audible inside and outside of the vehicle.

FIG. 26a shows a view in the form of a top view of the tuned mass vibration damper 340 shown in FIGS. 24-25c. For better clarity, the second guide component part 600-2 and the annular portion 1120 of the spacer component part 660 are not shown.

In the situation shown in FIG. 26a, the damper masses 110 are at their maximum torsional angle or maximum oscillation angle. FIG. 26b shows an enlarged view of a region around the path end 890 of path 610 in the damper mass 110. FIG. 26b also shows that in this operating state the rolling body 620, which is again implemented as roller 630, also does not reach the path end 890 but is stopped before it.

This is brought about through the cooperation of the connection structure 720 and connection recess 730, i.e., the positive engagement connection with clearance between the spacer component part 660 and damper masses 110. Accordingly, at the maximum oscillation angle, the connection structure 720 is in an end position 1140 of the elongated hole 1110 or connection recess 730 as is shown in the enlarged view of area A from FIG. 26a. In other words, FIGS. 26b and 26c show that the rolling bodies 620 are stopped shortly before the stop in that the connection structure 720, also referred to as spacer, goes into the stop.

FIGS. 26a to 26c show the tuned mass vibration damper 340 with damper masses 110 at maximum deflection, i.e., in the situation where its deflection corresponds to the maximum oscillating amplitude. Before the damper masses 110 can reach their stops of their guide paths 610, an inhibiting effect is achieved between the rolling bodies 620 and the guide paths 610 of the guide component parts 600 and between the rolling bodies 620 and guide paths 610 of the damper masses 110 by the spacer component part 660.

This is brought about in that the connection structures 720 of the spacer component part 660 go into the stops of their paths, i.e., into the stops of their associated connection recesses 730, in the damper masses 110, and accordingly inhibit the radially inward movement of the damper masses 110 beyond a determined distance. The striking of the damper masses 110 at the end 890 of their guide paths 610 is accordingly damped by this inhibiting. In this operation, the spacer component part 660 describes a comparatively small angle.

The aimed-for free oscillation angle of the damper masses 110 can be determined via the substantially radial length of the elongated holes, i.e., of the connection recesses 730, in the damper masses 110. Further, an asynchronicity in the circumferential movement of the damper masses 110 can be permitted by adjusting the clearance in circumferential direction between the guide paths and connection pieces 720.

Due to the fact that a collision between damper masses 110 can be substantially eliminated through the use of the spacer component part 660, a greater damper mass, i.e., a mass of the damper masses 110, can also be realized optionally by lengthening the damper masses 110 in circumferential direction.

FIGS. 27a and 27b show a view of the above-described tuned mass vibration damper 340, as was described above, which is comparable to FIG. 25a. The second guide component part 600-2 is also not shown in FIGS. 27a and 27b for clarity. FIG. 27a shows a condition in normal operation in which the centrifugal forces 200 acting on the damper masses 110 are substantially higher in magnitude than the corresponding weight force components 210 which likewise act on the damper masses 110. Accordingly, the damper masses 110 are held radially outward and move along the guide paths 610 through the agency of the rolling bodies 620 in accordance with the prevailing excitation.

While FIG. 27a shows the condition in normal engine operation, FIG. 27b shows a condition in which the engine is switched off, but the transmission input shaft continues to run. Alternatively, the situation illustrated in FIG. 27b can also occur in crawl operation of the vehicle. During slow crawling, the transmission input shaft rotates at a lower speed than engine speed. In such a case, the weight force 210 is appreciably greater in magnitude than the corresponding centrifugal force 200, all the more so for the corresponding parallel component to the weight force 210 to the centrifugal force 200.

The situation is similar when switching off the engine. The transmission input shaft continues to run for several seconds. After a certain time, the amount of weight force 210 exceeds that of the opposed component of centrifugal force 200. In the absence of countermeasures, the damper masses would fall in an uncontrolled manner into the stops or ends 230 of the guide paths 610.

In both states, the spacer component part 660 ensures that the damper masses 110 are kept apart so that no collisions are possible. Further, the spacer component part 660 can keep the damper masses 110 in their radial position and accordingly prevent the damper masses 110 from striking the rolling body 620 in radial direction. Owing to the geometry of the guide paths 610 shown in this embodiment example, only a slight tilting of the damper masses 110 may be anticipated without a significant effect on the acoustics.

However, this could change in guide paths 610 which are configured in another manner, for example, guide paths 610 which are not kidney-shaped.

Figure 28B:
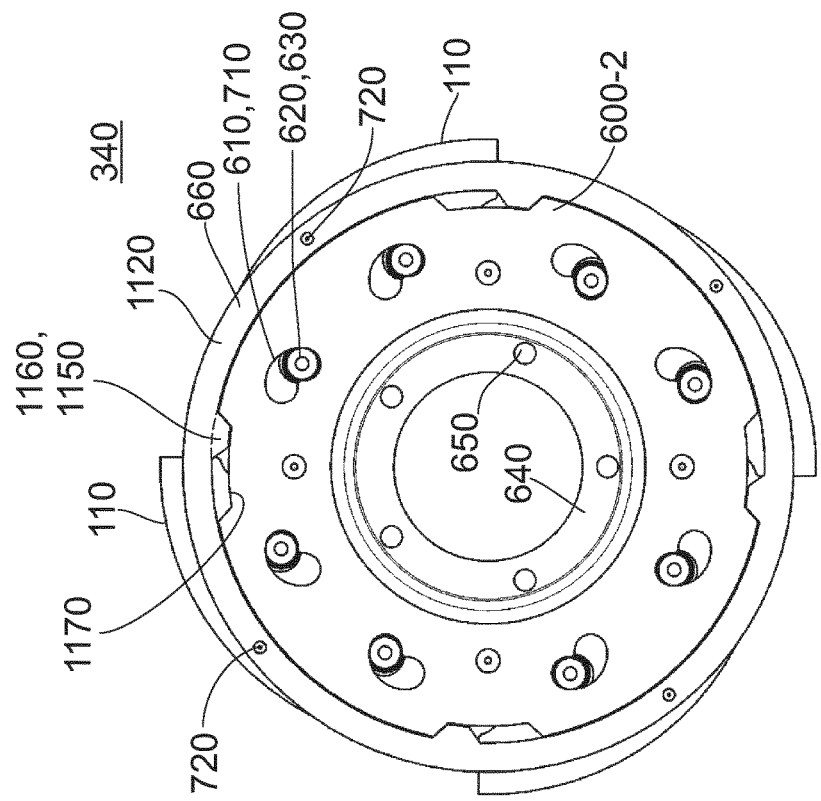
Figure 28A:
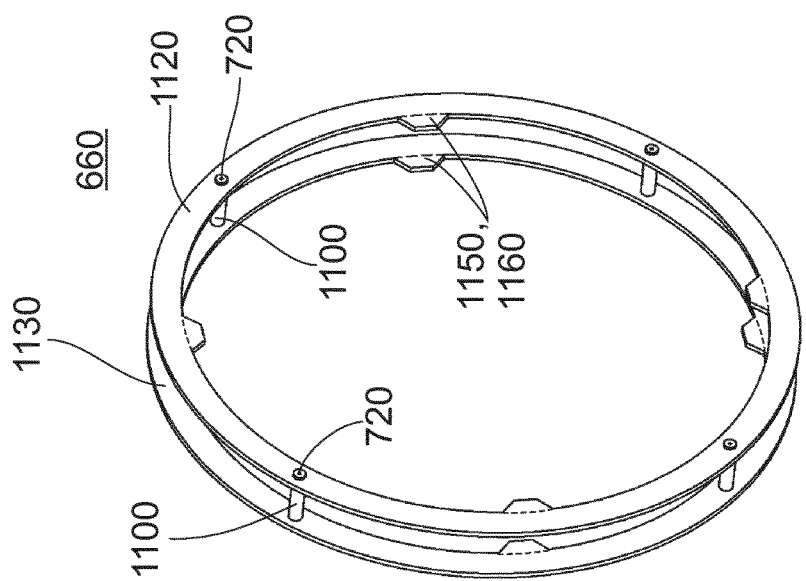
FIG. 28a is a perspective view of a spacer component part of a tuned mass vibration damper.

FIG. 28*a* shows a perspective view of a further spacer component part 660 such as can be used, for example, in another tuned mass vibration damper 340 according to an embodiment example. The corresponding tuned mass vibration damper 340 is shown in a top view in FIG. 28*b*.

The spacer component part 660 again has the annular portion 1120 and the further annular portion 1130 which are connected to one another via the connection structures 720 with their guide portions 1100. In contrast to the spacer component parts 660 shown in FIG. 25*c*, the spacer component part 660 from FIG. 28*a* has at least one stop structure 1150 at annular portion 1120 and at the further annular portion 1130, this stop structure 1150 being configured to limit a rotation of the spacer component part 660 with respect to at least one guide component part 600.

To achieve this, the stop structure 1150 of the spacer component part 660 is formed as stop projection 1160. Guide component part 600-2 and the first guide component part 600-1, which is not visible in FIG. 28*b*, each have a complementary stop recess 1170 corresponding to the stop projection 1160 of the two annular portions 1120, 1130. Stop projections 1160 are configured in precisely such a way that they engage in the complementary stop recesses 1170 and accordingly limit a rotation of the spacer component part 660 with respect to the guide component part 600 or guide component parts 600.

Figure 28C:
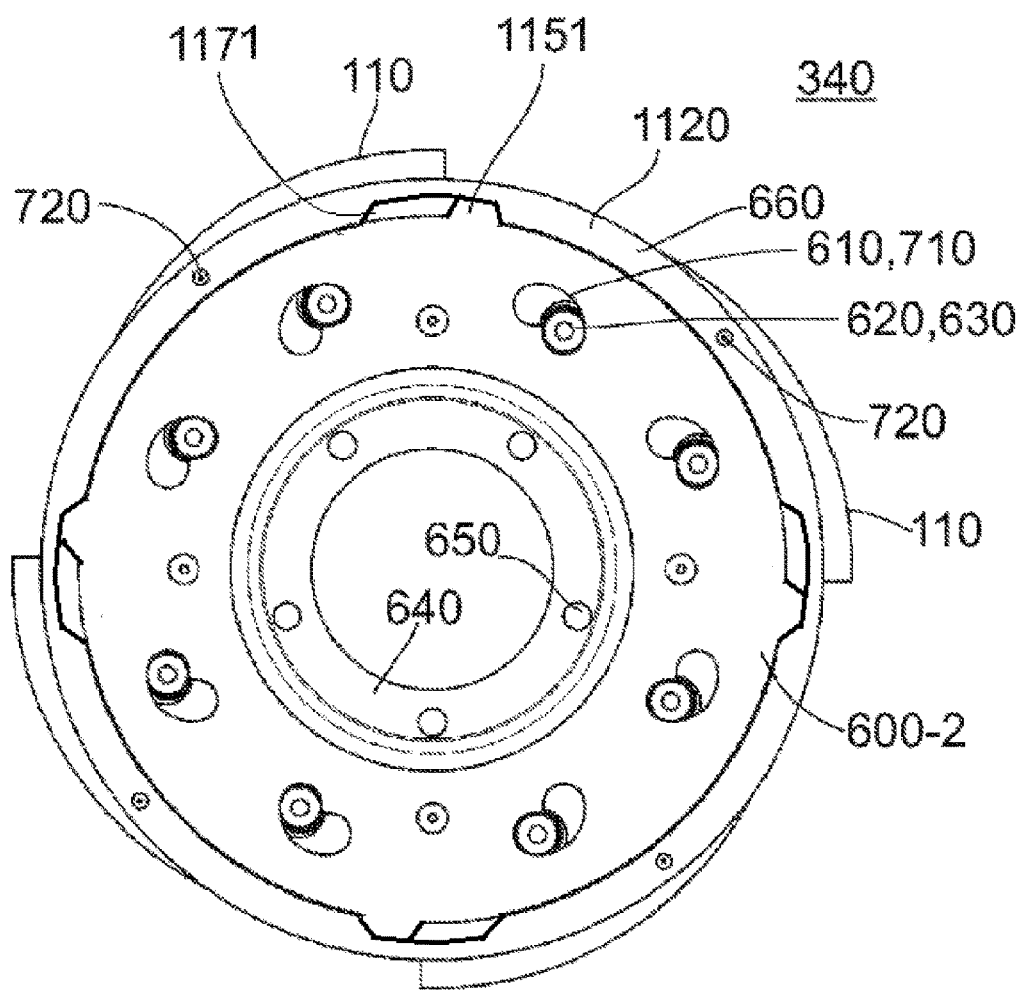
FIG. 28c is a perspective view of a spacer component part of a tuned mass vibration damper.

Of course, in other embodiment examples the arrangements of recess and projection can also be reversed. For example, the spacer component part 660 can have a stop recess 1171, while the guide component parts 600 or at least one of the guide component parts 600 can have a corresponding complementary stop projection 1151, as shown in FIG. 28*c*. Also, of course, this need not be implemented on more than one guide component part 600 in case of a tuned mass vibration damper 340 with more than one guide component part 600. However, this is an optional possibility, of course. In other words, FIG. 28*a* shows a variant of the spacer component part 660 with radially inwardly projecting noses as stop structures 1150 in the form of stop projections 1160. They are guided in corresponding cutouts or in stop recesses 1170 of the guide component parts 600.

Accordingly, the maximum oscillation angle of the damper masses 110 can be adjusted along the length of the complementary stop recesses 1170 in the guide component parts 600. This results in a further possibility for adjusting the free oscillation angle.

FIG. 28*b* shows the entire subassembly of the tuned mass vibration damper 340 with installed spacer component part 660. The subassembly is shown with damper masses 110 that are moved out all the way to the stop.

Finally, FIG. 29 shows a perspective view of a further variant of a spacer component part 660 for a tuned mass vibration damper 340 according to an embodiment example. This is a simplified configuration of the spacer component part 660 compared to the variants shown thus far. The spacer component part 660 shown here comprises two ring segment-shaped portions 1180-1, 1180-2 and further ring segment-shaped portions 1190-1, 1190-2 which are offset parallel to ring segment-shaped portions 1610 along the axis of rotation 430, not shown in FIG. 29, and connected therewith. The connection between ring segment-shaped portions 1180 and further ring segment-shaped portions 1190 is carried out via connection portions 1200 extending substantially along the axis of rotation 430.

This spacer component part 660 also comprises a plurality of connection structures 720, one of which is mechanically non-rotatably or mechanically fixedly connected to one of the ring segment-shaped portions 1180 and to one of the further ring segment-shaped portions 1190 in each instance. Of course, this and the arrangement of ring segment-shaped portions 1180 could also diverge with respect to quantity, extension and other parameters in other embodiment examples.

Accordingly, in this case the connection structures 720 and corresponding connection recesses 730 are configured to limit a corresponding movement of the relevant damper mass 110 along the radial direction by making contact with an end of the connection recesses 730. If the connection structure 720 is again made of a metallic material, the cylinder-shaped outer contour can once again be enclosed by a sleeve made of a plastic, i.e., for example, a thermosetting plastic, an elastomer or a thermoplastic, in order to low-noise pairing of materials.

FIG. 29 shows a simplified variant of the spacer component part 660 which can optionally be produced in its entirety as injection molded part within the framework of an injection molding process. One of the great advantages of the geometry of the spacer component part 660 shown here is the possible weight reduction. Also, riveting can optionally be dispensed with.

Finally, FIGS. 30*a*, 30*b*, 30*c* and 30*d*, respectively, show top views of a damper mass 110 of a tuned mass vibration damper 340 according to an embodiment example. The connection structures 720, also referred to as spacers, can be produced in different variations of the spacer component part in diverse shapes. For example, FIG. 30*a* shows a cylindrical shape, while FIG. 30*b* shows a square shape. FIG. 30*c* shows a frustum-shaped connection structure 720, while FIG. 30*d* shows a variant with rounded corner of a square receptacle. Also, a coating of the surfaces or use of sleeves made of polymer materials or elastomer materials can be realized for achieving a required damping property or sliding property.

As the last embodiment examples have shown, a spacer component part, also referred to as guide ring, can contribute to improving acoustics in speed-adaptive dampers, i.e., tuned mass vibration dampers 340 according to an embodiment example. They can be used, for example, in (hydrodynamic) converters 310 with a corresponding speed-adaptive damper, as well as in other starting elements 300, for example, starting elements 300 based on pure frictionally engaging contacts.

Through the use of an embodiment example of a tuned mass vibration damper 340, a compromise between simplifying production of a tuned mass vibration damper, reducing noises occurring during operation, efficient use of the available installation space, and the performance of the tuned mass vibration damper 340 can be improved.

The features disclosed in the preceding description, appended claims and accompanying drawings can be significant and can be implemented individually as well as in any combination for realizing an embodiment example in its various refinements.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tuned mass vibration damper, for damping a vibration component of a rotational movement, comprising:
   at least three damper masses each configured to carry out an oscillation depending on the rotational movement to damp the vibration component of the rotational movement;
   at least one guide component part configured to movably guide the at least three damper masses such that the at least three damper masses are arranged offset along a circumferential direction perpendicular to an axis of rotation of the rotational movement;
   a spacer component part that is rotatable relative to the at least one guide component part around the axis of rotation of the rotational movement and that has an engagement connection with clearance with the at least three damper masses that are configured in such a way that, starting from a center position of a respective one of the at least three damper masses with respect to the spacer component part, when one of the damper masses executes an oscillation that overcomes a clearance in connections of two of the damper masses with respect to the spacer component part, the spacer component part is rotated along the circumferential direction to drive an other damper mass of the two damper masses along the circumferential direction,
   wherein the spacer component part has a stop structure configured to limit a rotation of the spacer component part with respect to the at least one guide component part,
   wherein the stop structure of the spacer component part has one of a stop projection and a stop recess configured to engage in a respective one of a complementary stop recess and a complementary stop projection of the at least one guide component part and to limit a rotation of the spacer component part with respect to the at least one guide component part.

2. The tuned mass vibration damper according to claim 1, wherein the damper masses and the spacer component part are configured such that the at least three damper masses are rotatable with respect to the spacer component part by a predetermined angle starting from their respective center positions relative to the spacer component part.

3. The tuned mass vibration damper according to claim 2, wherein the spacer component part is connected to all of the damper masses by an engagement with clearance such that, from a center position of any one of the damper masses with respect to the spacer component part and from the center positions of the other damper masses with respect to the spacer component part, during an oscillation of a respective damper mass that overcomes a clearance of a respective damper masses to the spacer component part, the spacer component part is rotated along the circumferential direction to drive all of the rest of the damper masses along the circumferential direction.

4. The tuned mass vibration damper according to claim 1, wherein the clearances of the connections between the damper masses and the spacer component part are configured in such a way that the damper masses are guided substantially parallel to one another by the spacer component part.

5. The tuned mass vibration damper according to claim 1, wherein the at least one guide component part has at least partially a circular or cylinder surface-shaped contour extending at least partially or completely around the axis of rotation, and wherein the spacer component part is configured to be mounted radially at the circular or cylinder surface-shaped contour.

6. The tuned mass vibration damper according to claim 1, wherein at least 50% of a mass of the spacer component part is arranged one of entirely radially outwardly and inwardly of the at least one guide component part.

7. The tuned mass vibration damper according to claim 1, wherein the spacer component part is configured to at least one of:
   limit a movement of the damper masses along a radial direction, and
   limit a maximum oscillation angle of the damper masses, by making contact with the damper masses outside of the engagement connection thereto with clearance.

8. The tuned mass vibration damper according to claim 7, wherein the spacer component part is configured as one of an inner spacer ring and an outer spacer ring to intercept at least one of the damper masses during at least one of a radially inwardly directed and a radially outwardly directed movement beyond a predetermined distance.

9. The tuned mass vibration damper according to claim 7, wherein a pairing of materials of the at least one guide component part and the spacer component part making contact with one another when limiting radial movement or maximum oscillation angle is selected such that that less noise occurs compared to a pairing of metallic materials.

10. The tuned mass vibration damper according to claim 1, wherein the damper masses and the spacer component part are configured such that at least one of a maximum oscillation angle of the damper masses and a movement thereof along a radial direction is limited by the engagement connection with clearance.

11. The tuned mass vibration damper according to claim 10, wherein the engagement connection with clearance between the spacer component part and at least one of the damper masses comprises:
   a connection recess; and
   a connection structure that engages in the connection recess,
   wherein the connection structure and the connection recess are configured to at least one of:
   enable a radial movement of the connection structure and connection recess relative to one another, and
   enable a rotation of the connection structure and connection recess relative to one another.

* * * * *